US011017393B2

(12) United States Patent
Kumnick et al.

(10) Patent No.: US 11,017,393 B2
(45) Date of Patent: May 25, 2021

(54) DIRECT CONNECTION SYSTEMS AND METHODS

(71) Applicant: VISA INTERNATIONAL SERVICE ASSOCIATION, San Francisco, CA (US)

(72) Inventors: Phil Kumnick, Phoenix, AZ (US); Krishna Koganti, Cupertino, CA (US); Davidson Wuichet, San Mateo, CA (US); Lloyd Cato, Sunnyvale, CA (US); Jeffrey Kusheba, Litchfield Park, AZ (US)

(73) Assignee: Visa International Service Association, San Francisco, CA (US)

( * ) Notice: Subject to any disclaimer, the term of this patent is extended or adjusted under 35 U.S.C. 154(b) by 302 days.

(21) Appl. No.: 15/958,966

(22) Filed: Apr. 20, 2018

(65) Prior Publication Data

US 2018/0253726 A1   Sep. 6, 2018

Related U.S. Application Data

(63) Continuation of application No. 14/495,437, filed on Sep. 24, 2014, now Pat. No. 9,978,063, which is a
(Continued)

(51) Int. Cl.
*G06Q 20/40* (2012.01)
*G06Q 20/38* (2012.01)
(Continued)

(52) U.S. Cl.
CPC ............. *G06Q 20/40* (2013.01); *G06Q 20/20* (2013.01); *G06Q 20/385* (2013.01); *G06Q 20/4016* (2013.01); *G06Q 30/0222* (2013.01)

(58) Field of Classification Search
CPC ...... G06Q 20/40; G06Q 20/20; G06Q 20/385; G06Q 20/4016; G06Q 30/0222
(Continued)

(56) References Cited

U.S. PATENT DOCUMENTS 4,628,319 A   12/1986 Morwing et al.
5,812,668 A   9/1998 Weber
(Continued)

FOREIGN PATENT DOCUMENTS

AU   2009322183       12/2014
AU   2009322183 B2    12/2014
(Continued)

OTHER PUBLICATIONS

"Payment card rewards programs and consumer payment choice," by Andrew T. Ching and Fumiko Hayashi. Journal of Banking & Finance 34 (2010). pp. 1773-1787. (Year: 2010).*
(Continued)

*Primary Examiner* — Sara C Hamilton
(74) *Attorney, Agent, or Firm* — Kilpatrick Townsend & Stockton LLP

(57) ABSTRACT

Embodiments of the invention are directed to passing a plurality of communications directly from a merchant to a payment processing network. A first communication may include payment information in an authorization request, while a second transaction may include non-payment transaction data. The communications may be linked with a transaction identifier. In other embodiments, a capture file process is disclosed where capture files are generated by the payment processing network, and transactions are subsequently cleared and settled.

18 Claims, 19 Drawing Sheets

Related U.S. Application Data continuation of application No. 13/405,140, filed on Feb. 24, 2012, now Pat. No. 8,924,297.

(60) Provisional application No. 61/521,274, filed on Aug. 8, 2011, provisional application No. 61/446,856, filed on Feb. 25, 2011.

(51) Int. Cl.
*G06Q 20/20* (2012.01)
*G06Q 30/02* (2012.01)

(58) Field of Classification Search
USPC .......................................................... 705/44
See application file for complete search history.

(56) References Cited

U.S. PATENT DOCUMENTS

| | | | |
|---|---|---|---|
| 5,850,446 A | 12/1998 | Berger et al. | |
| 5,889,863 A | 3/1999 | Weber | |
| 5,943,424 A * | 8/1999 | Berger | G06Q 20/027 |
| | | | 380/29 |
| 5,978,840 A * | 11/1999 | Nguyen | G06Q 20/00 |
| | | | 705/53 |
| 5,983,208 A | 11/1999 | Haller et al. | |
| 5,987,132 A | 11/1999 | Rowney et al. | |
| 5,996,076 A | 11/1999 | Rowney et al. | |
| 6,002,767 A * | 12/1999 | Kramer | G06Q 20/02 |
| | | | 705/27.1 |
| 6,026,379 A | 2/2000 | Haller et al. | |
| 6,072,870 A * | 6/2000 | Nguyen | G06Q 20/02 |
| | | | 705/26.1 |
| 6,119,105 A | 9/2000 | Williams | |
| 6,163,772 A | 12/2000 | Kramer et al. | |
| 6,253,027 B1 | 6/2001 | Weber et al. | |
| 6,304,915 B1 | 10/2001 | Nguyen et al. | |
| 6,324,525 B1 | 11/2001 | Kramer et al. | |
| 6,363,363 B1 | 3/2002 | Haller et al. | |
| 6,373,950 B1 | 4/2002 | Rowney | |
| 7,428,507 B2 | 9/2008 | Villaret et al. | |
| 7,575,177 B2 | 8/2009 | Killian et al. | |
| 7,578,434 B2 | 8/2009 | Hansen et al. | |
| 7,628,319 B2 | 12/2009 | Brown et al. | |
| 7,693,783 B2 | 4/2010 | Balasubramanian et al. | |
| 7,805,376 B2 | 9/2010 | Smith | |
| 7,853,525 B2 | 12/2010 | Yeates et al. | |
| 7,877,325 B2 | 1/2011 | Bishop et al. | |
| 8,099,365 B2 | 1/2012 | Bhambri et al. | |
| 8,121,957 B1 | 2/2012 | Nowka | |
| 8,924,297 B2 | 12/2014 | Kumnick et al. | |
| 2003/0004797 A1* | 1/2003 | Villaret | G06Q 20/12 |
| | | | 705/37 |
| 2003/0140007 A1 | 7/2003 | Kramer et al. | |
| 2005/0283433 A1 | 12/2005 | Reid et al. | |
| 2006/0282382 A1 | 12/2006 | Balasubramanian et al. | |
| 2007/0061255 A1 | 3/2007 | Epting et al. | |
| 2008/0005018 A1 | 1/2008 | Powell | |
| 2008/0005037 A1 | 1/2008 | Hammad et al. | |
| 2008/0040276 A1 | 2/2008 | Hammad et al. | |
| 2008/0167991 A1 | 7/2008 | Carlson et al. | |
| 2009/0006203 A1 | 1/2009 | Fordyce et al. | |
| 2009/0090783 A1 | 4/2009 | Killian et al. | |
| 2009/0094123 A1 | 4/2009 | Killian et al. | |
| 2009/0094125 A1 | 4/2009 | Killian et al. | |
| 2009/0112747 A1 | 4/2009 | Mullen et al. | |
| 2009/0171777 A1* | 7/2009 | Powell | G06Q 20/20 |
| | | | 705/14.1 |
| 2009/0171778 A1* | 7/2009 | Powell | G06Q 40/12 |
| | | | 705/14.36 |
| 2009/0171845 A1* | 7/2009 | Powell | G06Q 40/02 |
| | | | 705/44 |
| 2009/0254462 A1 | 10/2009 | Tomchek et al. | |
| 2009/0271262 A1 | 10/2009 | Hammad | |
| 2010/0057554 A1 | 3/2010 | Lanford | |
| 2010/0114776 A1 | 5/2010 | Weller et al. | |
| 2010/0145855 A1 | 6/2010 | Fordyce, III et al. | |
| 2010/0174620 A1* | 7/2010 | Stringfellow | G06F 21/31 |
| | | | 705/26.1 |
| 2010/0174626 A1* | 7/2010 | Stringfellow | G06Q 20/102 |
| | | | 705/30 |
| 2011/0010234 A1 | 1/2011 | Lindelsee et al. | |
| 2011/0035266 A1* | 2/2011 | Patterson | G06Q 30/0211 |
| | | | 705/14.14 |
| 2011/0087538 A1 | 4/2011 | Bous et al. | |
| 2011/0093326 A1 | 4/2011 | Bous et al. | |
| 2011/0106609 A1 | 5/2011 | Fernandez | |
| 2011/0112918 A1 | 5/2011 | Mestré et al. | |
| 2011/0112920 A1 | 5/2011 | Mestre et al. | |
| 2011/0125565 A1* | 5/2011 | MacIlwaine | G06Q 30/02 |
| | | | 705/14.17 |
| 2011/0145081 A1* | 6/2011 | Tomchek | G06Q 30/02 |
| | | | 705/21 |
| 2011/0238539 A1 | 9/2011 | Phillips et al. | |
| 2011/0258117 A1 | 10/2011 | Ahmad et al. | |
| 2012/0011067 A1 | 1/2012 | Katzin et al. | |
| 2012/0016799 A1* | 1/2012 | Killian | G06Q 20/20 |
| | | | 705/44 |
| 2012/0221468 A1 | 8/2012 | Kumnick et al. | |
| 2015/0012346 A1 | 1/2015 | Kumnick et al. | |

FOREIGN PATENT DOCUMENTS

| | | |
|---|---|---|
| CA | 2685916 | 11/2008 |
| CA | 2685916 A1 | 11/2008 |
| JP | 2006309441 | 11/2006 |
| JP | 2006309441 A | 11/2006 |
| KR | 1020040089180 | 10/2004 |
| KR | 1020040089180 A | 10/2004 |
| KR | 20070010229 | 1/2007 |
| KR | 20070010229 A | 1/2007 |
| WO | 2008137416 | 11/2008 |
| WO | 2008137416 A1 | 11/2008 |

OTHER PUBLICATIONS

U.S. Appl. No. 12/630,702 , "Final Office Action", dated Apr. 14, 2016, 11 pages.
U.S. Appl. No. 12/630,702 , "Final Office Action", dated Mar. 12, 2015, 8 pages.
U.S. Appl. No. 12/630,702 , "Non final office action", dated Oct. 1, 2014, 7 Pages.
U.S. Appl. No. 12/630,702 , "Non-Final Office Action", dated Jul. 27, 2015, 8 pages.
U.S. Appl. No. 12/630,702 , "Office Action", dated Nov. 15, 2012, 6.
U.S. Appl. No. 12/630,702 , "Office Action", dated Apr. 25, 2012, 7.
U.S. Appl. No. 13/405,140 , "Final Office Action", dated Dec. 23, 2013, 20 pages.
U.S. Appl. No. 13/405,140 , "Non Final Office Action", dated Jun. 30, 2014, 8 pages.
U.S. Appl. No. 13/405,140 , "Non-Final Office Action", dated Jun. 14, 2013, 10 pages.
U.S. Appl. No. 14/495,437 , "Non-Final Office Action", dated Mar. 3, 2017, 27 pages.
U.S. Appl. No. 14/495,437 , "Notice of Allowance", dated Jan. 19, 2018, 18 pages.
U.S. Appl. No. 14/495,437 , "Restriction Requirement", dated Sep. 12, 2017, 6 pages.
U.S. Appl. No. 14/495,437 , "Restriction Requirement", dated Nov. 21, 2016, 8 pages.
AU2015201109 , "First Examiner Report", dated Feb. 24, 2016, 3 pages.
PCT/US2012/026640 , "International Search Report and Written Opinion", dated Jan. 2, 2013, 14.
Final Office Action dated Apr. 14, 2016 for U.S. Appl. No. 12/630,702, 11 pages.

(56) References Cited

OTHER PUBLICATIONS

Final Office Action dated Mar. 12, 2015 for U.S. Appl. No. 12/630,702, 8 pages.
Non-Final office action dated Oct. 1, 2014 for U.S. Appl. No. 12/630,702, 7 Pages.
Non-Final Office Action dated Jul. 27, 2015 for U.S. Appl. No. 12/630,702, 8 pages.
Office Action dated Nov. 15, 2012 for U.S. Appl. No. 12/630,702, 6 pages.
Office Action dated Apr. 25, 2012 for U.S. Appl. No. 12/630,702, 7 pages.
Final Office Action dated Dec. 23, 2013 for U.S. Appl. No. 13/405,140, 20 pages.
Notice of Allowance dated Jun. 30, 2014 for U.S. Appl. No. 13/405,140, 8 pages.
Non-Final Office Action dated Jun. 14, 2013 for U.S. Appl. No. 13/405,140, 10 pages.
Non-Final Office Action dated Mar. 3, 2017 for U.S. Appl. No. 14/495,437, 27 pages.
Notice of Allowance dated Jan. 19, 2018 for U.S. Appl. No. 14/495,437, 18 pages.
Restriction Requirement dated Sep. 12, 2017 for U.S. Appl. No. 14/495,437, 6 pages.
Restriction Requirement dated Nov. 21, 2016 for U.S. Appl. No. 14/495,437, 8 pages.
First Examiner Report dated Feb. 24, 2016 for AU Patent Application No. 2015201109, 3 pages.
International Search Report and Written Opinion dated Jan. 2, 2013 for International Application No. PCT/US2012/026640, 14 pages.
International Search Report and Written Opinion dated Jul. 16, 2010 for International Application No. PCT/US2009/066858, 7 pages.
Australian Office Action dated Feb. 6, 2014 for AU Patent Application No. 2009322183, 3 pages.

* cited by examiner

DIRECT CONNECTION SYSTEMS AND METHODS

CROSS-REFERENCES TO RELATED APPLICATIONS

This application is a non-provisional continuation application of and claims the benefit of and priority to U.S. patent application Ser. No. 14/495,437, entitled, "DIRECT CONNECTION SYSTEMS AND METHODS," filed Sep. 24, 2014, U.S. patent application Ser. No. 13/405,140, entitled, "DIRECT CONNECTION SYSTEMS AND METHODS," filed Feb. 24, 2012, U.S. Provisional Patent Application No. 61/446,856, entitled, "VALUE ADDED RESELLER PROGRAM," filed on Feb. 25, 2011, and U.S. Provisional Patent Application No. 61/521,274, entitled, "FLEXIBLE FILE FORMAT," filed on Aug. 8, 2011, which are herein incorporated by references in their entirety for all purposes.

BACKGROUND

As methods and devices for engaging in transactions have increased, the problems and challenges that arise for merchants, who are required to adapt their systems in order to process transactions with a multitude of acquirer entities, have also increased.

There are many acquirers that work with payment processing networks to facilitate transactions. Some of these acquirers have specific guidelines and standards for the format of the authorization logs and captures files that they receive from various entities in the payment networks. For example, if a merchant wants to be able to accept payment from consumers using a multitude of payment methods, each from a different acquirer using a different payment processing network, the merchant must adapt their systems, establish a connection between its own systems and the systems of each acquirer, and format its messages to the specifications of each acquirer.

Merchants who are limited in their resources may find it financially and technically difficult to purchase new systems or technologically difficult to adapt their current systems to meet the requirements of each and every acquirer.

Further, there is a need to simplify existing payment processing systems, while at the same time, provide for enhanced functionality.

Embodiments of the invention address the above problems, and other problems, individually and collectively.

BRIEF SUMMARY

Embodiments of the present invention are directed to systems and methods for processing a transaction through a payment processing network configured to process and transmit transaction data to a multitude of payment networks and debit gateways on the merchant's behalf and without the merchant directly interacting with a plurality of acquirer computers.

One embodiment of the invention is directed to a method comprising receiving a first communication comprising an authorization request message and a second communication comprising non-payment transaction data at a server computer. The authorization request message and the non-payment transaction data can be associated with the same transaction identifier. The method may also comprise processing the authorization request message by the server computer and processing the non-payment transaction data by the server computer.

Another embodiment of the invention is directed to a method comprising receiving from an access device associated with a merchant, non-payment transaction data and data relating to an authorization request message. The authorization request message is received through a first communication and the non-payment transaction data is received through a second communication. The authorization request message and the non-payment transaction data are associated with the same transaction identifier. The method may further comprise formatting the authorization request message and the non-payment transaction data by the server computer, and transmitting by the server computer the formatted authorization request message to an issuer computer.

Another embodiment of the invention of the invention is directed to a server computer comprising a processor and a non-transitory computer-readable storage medium. The computer readable medium comprises code executable by the processor for implementing a method. The method comprises receiving a first communication comprising an authorization request message and a second communication comprising non-payment transaction data. The authorization request message and the non-payment transaction data are associated with the same transaction identifier. The method may also comprise processing the authorization request message, and processing the non-payment transaction data.

Another embodiment of the invention is directed to a server computer comprising a processor and a non-transitory computer-readable storage medium comprising code executable by the processor for implementing a method. The method comprises receiving from an access device associated with a merchant, non-payment transaction data and data relating to an authorization request message. The authorization request message is received through a first communication and the non-payment transaction data is received through a second communication. The authorization request message and the non-payment transaction data are associated with the same transaction identifier. The method may also comprise formatting the authorization request message and the non-payment transaction data and transmitting the formatted authorization request message to an issuer computer.

Another embodiment of the invention is directed to a method. The method comprises generating, by a computer, a plurality of acquirer capture files for a plurality of different acquirers using different data formats. The method also comprises transmitting the capture files to the plurality of different acquirers.

Another embodiment of the invention is directed to a computer comprising a processor; and a computer readable medium coupled to the processor, wherein the computer readable medium comprises code, executable by the processor for implementing a method. The method also comprises generating, by a computer, a plurality of acquirer capture files for a plurality of different acquirers using different data formats, and transmitting the capture files to the plurality of different acquirers.

Another embodiment of the invention is directed to a method. The method comprises receiving a communication comprising non-payment transaction data at a server computer, wherein non-payment transaction data is sent through a communication channel that is present between a merchant computer and the server computer, and wherein the communication channel does not pass through an acquirer. The method also includes processing the non-payment transaction data by the server computer.

Another embodiment of the invention is directed to a server computer comprising a processor, and a computer readable medium coupled to the processor, wherein the computer readable medium comprises code, executable by the processor for implementing a method. The method comprises receiving a communication comprising non-payment transaction data at a server computer, wherein non-payment transaction data is sent through a communication channel that is present between a merchant computer and the server computer, and wherein the communication channel does not pass through an acquirer. The method also includes processing the non-payment transaction data by the server computer.

Another embodiment of the invention is directed to a method of operating a payment processing network server computer. The method comprises the payment processing network server computer receiving from a merchant computer directly and without involving an acquirer computer, a first communication comprising an authorization request message, and a second communication comprising non-payment transaction data. The authorization request message and the non-payment transaction data can be associated with the same transaction identifier. The method also comprises processing the authorization request message by transmitting the authorization request message to an issuer computer directly and without involving a further payment processing network, receiving an authorization response message from the issuer computer, matching the authorization response message to the associated authorization request message by matching transaction identifiers for the two messages, and transmitting the authorization response message to the merchant from which it received the authorization request message directly and without involving an acquirer computer. The method also comprises processing the non-payment transaction data.

Another embodiment of the invention is directed to a method of operating a server computer, the method comprising the server computer receiving from an access device associated with a merchant, non-payment transaction data and data relating to an authorization request message. The authorization request message is received through a first communication and the non-payment transaction data is received through a second communication. The authorization request message and the non-payment transaction data are associated with the same transaction identifier. The method may further comprise formatting the authorization request message and the non-payment transaction data by the server computer, and transmitting by the server computer the formatted authorization request message to an issuer computer.

Another embodiment of the invention is directed to a payment processing network server computer. The payment processing network server computer comprises a means for receiving from a merchant computer directly and without involving an acquirer computer, a first communication comprising an authorization request message, and a second communication comprising non-payment transaction data. The authorization request message and the non-payment transaction data can be associated with the same transaction identifier. The payment processing network server computer also comprises a means for processing the authorization request message by transmitting the authorization request message to an issuer computer directly and without involving a further payment processing network, receiving an authorization response message from the issuer computer, matching the authorization response message to the associated authorization request message by matching transaction identifiers for the two messages, and transmitting the authorization response message to the merchant from which it received the authorization request message directly and without involving an acquirer computer. The payment processing network server computer also comprises a means for processing the non-payment transaction data.

Another embodiment of the invention is directed to a computer comprising a means for generating a plurality of acquirer capture files for a plurality of different acquirers using different data formats and a means for transmitting the capture files to the plurality of different acquirers.

Another embodiment of the invention is directed to a method comprising receiving a communication comprising non-payment transaction data at a server computer, wherein non-payment transaction data is sent through a communication channel that is present between a merchant computer and the server computer, wherein the communication channel does not pass through an acquirer. The method further comprises processing the non-payment transaction data by the server computer.

Another embodiment of the invention is directed to a server computer comprising means for receiving from an access device associated with a merchant, non-payment transaction data and data relating to an authorization request message. The authorization request message is received through a first communication and the non-payment transaction data is received through a second communication. The authorization request message and the non-payment transaction data are associated with the same transaction identifier. The server computer also comprises means for formatting the authorization request message and the non-payment transaction data and transmitting the formatted authorization request message to an issuer computer.

Another embodiment of the invention is directed to a server computer comprising means for receiving a communication comprising non-payment transaction data at a server computer, wherein non-payment transaction data is sent through a communication channel that is present between a merchant computer and the server computer, wherein the communication channel does not pass through an acquirer. The server computer also comprises a means for processing the non-payment transaction data by the server computer.

These and other embodiments of the invention are described in further detail below with reference to the Figures and the Detailed Description.

Figure 1:
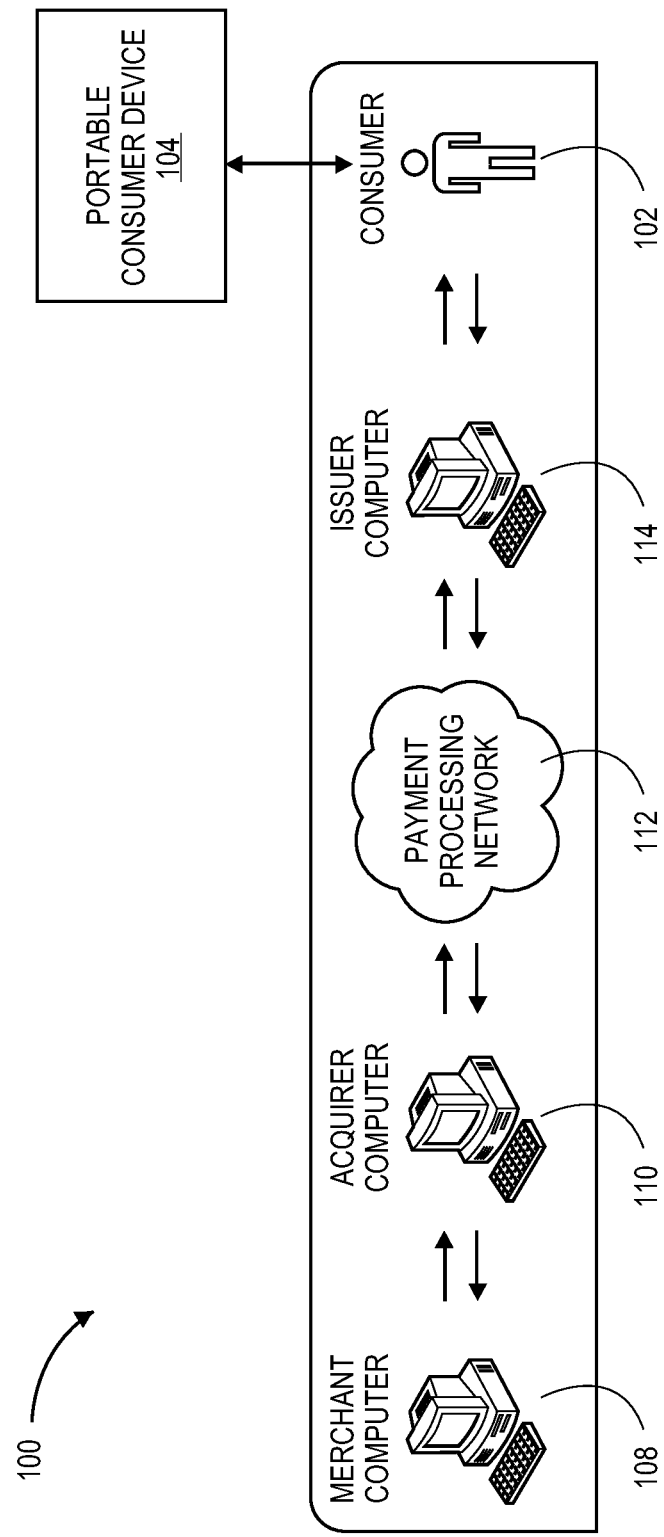
FIG. 1 shows a system diagram of a payment processing system.

Prior to discussing embodiments of the invention, some descriptions of some terms may be helpful in understanding embodiments of the invention.

The term "authorization request message" may include a message sent from a merchant requesting that an issuer authorize a financial transaction. An authorization request message may comply with ISO 8583, which is a standard for systems that exchange electronic transactions made by consumers using payment devices. An authorization request message according to other embodiments may comply with other suitable standards. In embodiments of the invention, an authorization request message may include, among other data, a Primary Account Number (PAN) and expiration date associated with a payment device (e.g. credit/debit card) of the consumer, amount of the transaction (which may be any type and form of a medium of exchange such a money or points), and identification of a merchant (e.g. merchant ID). Typically, an authorization request message is generated by a server computer (if the transaction is an e-commerce transaction) or a Point of Sale (POS) device (if the transaction is a brick and mortar type transaction) and is sent to an issuer via a payment processing network and an acquirer.

The term "non-payment transaction data" may include any suitable type of data that is not typically present in an authorization request message. In some embodiments, non-payment transaction data may include data that is related to a particular transaction conducted using an authorization request message, but does not include data which is provided in the authorization request message itself. For example, SKU (stock keeping unit) data may be associated with a transaction and an authorization request message, but it is not present in the authorization request message. In other embodiments, non-payment transaction data may include data that is not specifically related to a transaction conducted using an authorization request message. For example, non-payment transaction data may comprise a general coupon that can be sent from the merchant to a central server computer. That general coupon may not be specifically associated with a transaction conducted with an authorization request message. Some examples of non-payment transaction data that may be sent in a non-payment transaction data message includes, but is not limited to, chargeback data, shopping cart data, coupon redemption codes, and enrollment information. Also, in some embodiments, non-payment transaction data could include image and video files that cannot be embedded in standard ISO messaging.

The term "access device" as used can refer to a device that can initiate a payment transaction. In some embodiments, an access device can be a device that can interact with a portable consumer device (e.g., a payment card) during a transaction. In embodiments of the invention, the access device can transmit both ISO and XML transaction-related messages to a payment processing network. According to embodiments of the invention, the access device can be in any suitable form. Examples of access devices include point of sale (POS) devices, cellular phones, PDAs, personal computers (PCs), tablet PCs, handheld specialized readers, set-top boxes, electronic cash registers, automated teller machines (ATMs), virtual cash registers, kiosks, security systems, access systems, and the like. If the access device is a point of sale terminal, any suitable point of sale terminal may be used including card or phone readers. The card or phone readers may include any suitable contact or contactless mode of operation. For example, exemplary readers can include RF (radio frequency) antennas, magnetic stripe readers, etc. to interact with the portable consumer devices.

Embodiments of the present invention are described using Extensible Markup Language (XML). XML is a widely used markup language that defines a set of rules for encoding documents in a format that is both human-readable and machine-readable. Using a markup language, such as XML, may be advantageously used between the merchant and the payment processing network, since XML is a widely used and standardized means of annotating and passing information using current network technologies. However, embodiments of the invention are not restricted to use of XML and may also be implemented using any other markup language, such as YAML, JSON, etc., that allows annotating a document in a way syntactically distinguishable from the text. In some implementations of embodiments of the invention, other means of organizing and sharing data, such as passing information using well defined data structures and employing known network and programming protocols in the art may also be used.

A "merchant computer" may include any suitable computational apparatus operated by a merchant. Examples of merchant computers may include an access device or an internet merchant computer.

The term "payment processing network" may include a network of suitable processing entities (e.g., computers) that can have the ability to route transactions. have information related to an account associated with a portable consumer device such as a debit or credit card.

The payment processing network may have or operate at least a server computer and may include a database. The database may include any hardware, software, firmware, or combination of the preceding for storing and facilitating retrieval of information. Also, the database may use any of a variety of data structures, arrangements, and compilations to store and facilitate retrieval of information. The server computer may be coupled to the database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The payment processing network may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system which performs clearing and settlement services.

Payment processing network may use any suitable wired or wireless network, including the Internet.

The term "server computer" may include a powerful computer or cluster of computers. For example, the server computer can be a large mainframe, a minicomputer cluster, or a group of servers functioning as a unit. In one example, the server computer may be a database server coupled to a Web server.

The term "formatting" may refer to the conversion of data files and data messages (e.g. authorization request messages, non-payment transaction data messages, capture files, etc.) from one file format to a suitable format for transmission to payment processing networks or acquirer computers. It may also refer to the creation of a data file or the like according to a specific format. In some embodiments of the invention, a suitable file format is an XML format.

The term "transaction identifier" may include a specific identifier associated with a financial transaction used to uniquely identify the financial transaction during processing of the financial transaction. The transaction identifier can be used to correlate or associate the non-payment transaction data message from a financial transaction with the authorization request message for the same financial transaction, as the two messages may be sent at different times. Suitable transaction identifiers may comprise numbers, letters, and combinations thereof. They may also be of any suitable length.

The term "common data format" may include a suitable file format for the capture files that are transmitted from a merchant access device or computer to a payment processing network. In embodiments of the invention, the common data format is an XML format.

The term "initial capture files" may include a file that is generated and sent by the merchant access device or other computer apparatus to the payment processing network. The initial capture files may contain data, at least for clearing and settlement processing. In embodiments of the invention, the initial capture files are transmitted in a common data format (e.g. XML format).

The term "acquirer capture files" may include files generated by a payment processing network or other computer apparatus from initial capture files received from a merchant access device or computer. The payment processing network generates acquirer capture files for a plurality of different acquirers based on preferences or rules for format and reception of capture files established by each acquirer. In embodiments of the invention, the acquirer capture files may be in the same format or may be in different formats.

The term "database of acquirer information" can include a database containing acquirer preferences and rules for formatting for and receiving capture files from the payment processing network.

The term "clearing and settlement process" may include a process of reconciling a transaction. A clearing process is a process of exchanging financial details between an acquirer and an issuer to facilitate posting to a party's account and reconciliation of the party's settlement position. Settlement involves the delivery of securities from one party to another. Clearing and settlement can occur simultaneously. In embodiments of the invention, as part of the clearing and settlement process, a payment processing network receives a plurality of initial capture files from a merchant computer or merchant access device, and generates a plurality of acquirer capture files for a plurality of acquirer computers.

I. Multi-Communications Systems and Methods

Embodiments of the invention can be directed to a method comprising receiving a first communication comprising an authorization request message and a second communication comprising non-payment transaction data from a merchant at a server computer in a payment processing network. The first and second communications can pass from the merchant to the payment processing network, without passing through an acquirer computer. The authorization request message and the non-payment transaction data are associated with the same transaction identifier. The method also comprises processing the authorization request message by the server computer. The method also comprises processing the non-payment transaction data by the server computer.

Since the first communication comprising the authorization request and the second communication comprising the non-payment transaction data pass directly from a merchant computer or merchant access device to a payment processing computer, it eliminates the need for the merchant computer to directly connect to each individual acquirer computer of a plurality of acquirer computers. This can increase processing speed, can allow merchants to manage fewer connections, and can also allow for the ability to provide additional types of data to the payment processing network. The payment processing network or a server computer residing therein, can perform processing that was not previously possible.

Illustratively, when a consumer engages in a transaction with a merchant, a merchant access device or computer transmits an authorization request message through a direct connection to a payment processing network. This authorization request message may include payment information such as an account number, a transaction amount, a service code, an expiration date, etc. The purpose of the authorization request message may be to simply obtain authorization for the transaction from an issuer of an account of the consumer. At the same time or at some other time, the merchant access device or merchant computer may also transmit a non-payment transaction data message comprising additional non-payment transaction data such as SKU (stock keeping unit) data to the payment processing network. Both of the authorization request message and the non-payment transaction data message may include the same transaction identifier indicating that they are related (e.g., an alphanumeric data string such as "A1382LM").

The server computer in the payment processing network receives the authorization request message and performs additional processing. For example, the server computer can parse the authorization request message to determine whether to route the message to an issuer or to another payment network or debit gateway. The appropriate issuer, payment network or debit gateway receives the authorization request message and transmits an authorization response message back to the payment processing network. This authorization response message is then sent back to the merchant access device or merchant computer so that the merchant knows whether or not the transaction is approved.

The server computer in the payment processing network can receive the non-payment transaction data message. This message could contain, for example, the SKU numbers of the products that the consumer purchased in the transaction. For example, the consumer may have purchased toothpaste and a facial cream, and the SKU numbers for those items may be sent to the payment processing network in the non-payment transaction data message. The server computer could then analyze the information in the non-payment transaction data message and may provide a discount to the transaction, in real time, by comparing the SKU numbers for the purchased products against a list of discounts that may have been pre-stored at the payment processing network for that consumer. In some cases, the above-described authorization request message linked to the received SKU numbers by using the transaction identifier. The authorization request message could be modified to reduce the purchase price by the discounted amount, before it is forward to the issuer computer for approval. For instance, the purchased toothpaste may cost $4, and the consumer's existing discount from a pre-existing loyalty program run by the payment processing network may be $1. Instead of sending an authorization request message to the issuer for $4, the authorization request message for $3 could be sent to the issuer for approval. Such discounting by the payment processing network is not possible in the case of messages between the merchant computer and the payment processing network server passing through an acquirer computer because if the acquirer does not have knowledge of the discount it cannot apply the discount to the value amount in the authorization request message passed to the payment processing network, and also because acquirer computers are not configured to handle authorization response messages that indicate a different amount to the corresponding authorization request. An effect of this is that discount offers can be provided and discounts effected by the payment network without requiring the handling of coupons etc. by cardholders or merchants. Further, the traditional communication path between the payment processing network and the merchant is not designed to carry large amounts of data between the merchant, the payment processing network, and the issuer.

Note that the additional data provided by the merchant access device and/or the merchant computer is not limited to the type of information that is provided in this specific example, and that other variations and embodiments are described in further detail below.

Note also that the "first communication" and the "second communication" can be sent to a server computer at different points in time (e.g., one day apart), and at the same time (e.g., simultaneously). They can be sent over the same communication channel or different communication channels. They may be part of the same message or they may be different messages. For example, in one embodiment, the first communication and the second communication may be two portions of the same XML file, or they may be different XML files. In the former case, the payment processing network may receive the first and second communications in one file, but then may separate out the first and second communications so that they can be processed differently. For example, only the first communication may be converted to an ISO message that is sent to an issuer in some embodiments, while the second communication stays in an XML format for further processing by the payment processing network.

A. Systems

Example embodiments are typically implemented in the context of a payment transaction. Therefore, prior to further discussing the use of a payment processing network to handle transaction processing with an acquirer, a brief description of standard transaction processing prior to the invention will be presented.

An exemplary system 100 for standard transaction processing can be seen in FIG. 1. The system 100 includes a merchant computer 108 and an acquirer computer 110 communicatively coupled to the merchant computer 120. In a typical transaction, a consumer 102 may purchase goods or services at a merchant associated with the merchant computer 108 using a portable consumer device 104. The acquirer computer 110 can communicate with an issuer computer 114 via a payment processing network 112.

The consumer 102 may be an individual, or an organization such as a business that is capable of purchasing goods or services.

The portable consumer device 104 may be in any suitable form. For example, suitable portable consumer devices can be hand-held and compact so that they can fit into a consumer's wallet and/or pocket (e.g., pocket-sized). The portable consumer device 104 can include a processor, and memory, input devices, and output devices, operatively coupled to the processor. Specific examples of portable consumer devices include cellular or wireless phones, personal digital assistants (PDAs), pagers, portable computers, smart cards, and the like. The portable consumer devices can also be debit devices (e.g., a debit card), credit devices (e.g., a credit card), or stored value devices (e.g., a pre-paid or stored value card).

In a typical transaction, the consumer 102 purchases a good or service at the merchant associated with the merchant computer 108 using the portable consumer device 104 such as a credit card or mobile phone. For example, the consumer 102 may swipe the credit card through a POS terminal or, in another embodiment, may take a wireless phone and may pass it near a contactless reader in a POS terminal.

An authorization request message may then be forwarded by the merchant computer 108 to the acquirer computer 110. After receiving the authorization request message, the authorization request message may then be sent to the payment processing network 112. The payment processing network 112 may then forward the authorization request message to the issuer computer 114 associated with the portable consumer device 104.

After the issuer computer 113 receives the authorization request message, the issuer computer 113 may send an authorization response message back to the payment processing network 112 to indicate whether or not the current transaction is authorized. The payment processing network 112 may then forward the authorization response message back to the acquirer computer 110. The acquirer computer 110 may then send the response message back to the merchant computer 108.

After the merchant computer 108 receives the authorization response message, the merchant computer 108 may then provide the authorization response message for the consumer 102. The authorization response message may be displayed by the POS terminal, or may be printed out on a receipt.

At the end of the day, a normal clearing and settlement process can be conducted by the payment processing network 112. In some embodiments, clearing and settlement can occur simultaneously.

Figure 2:
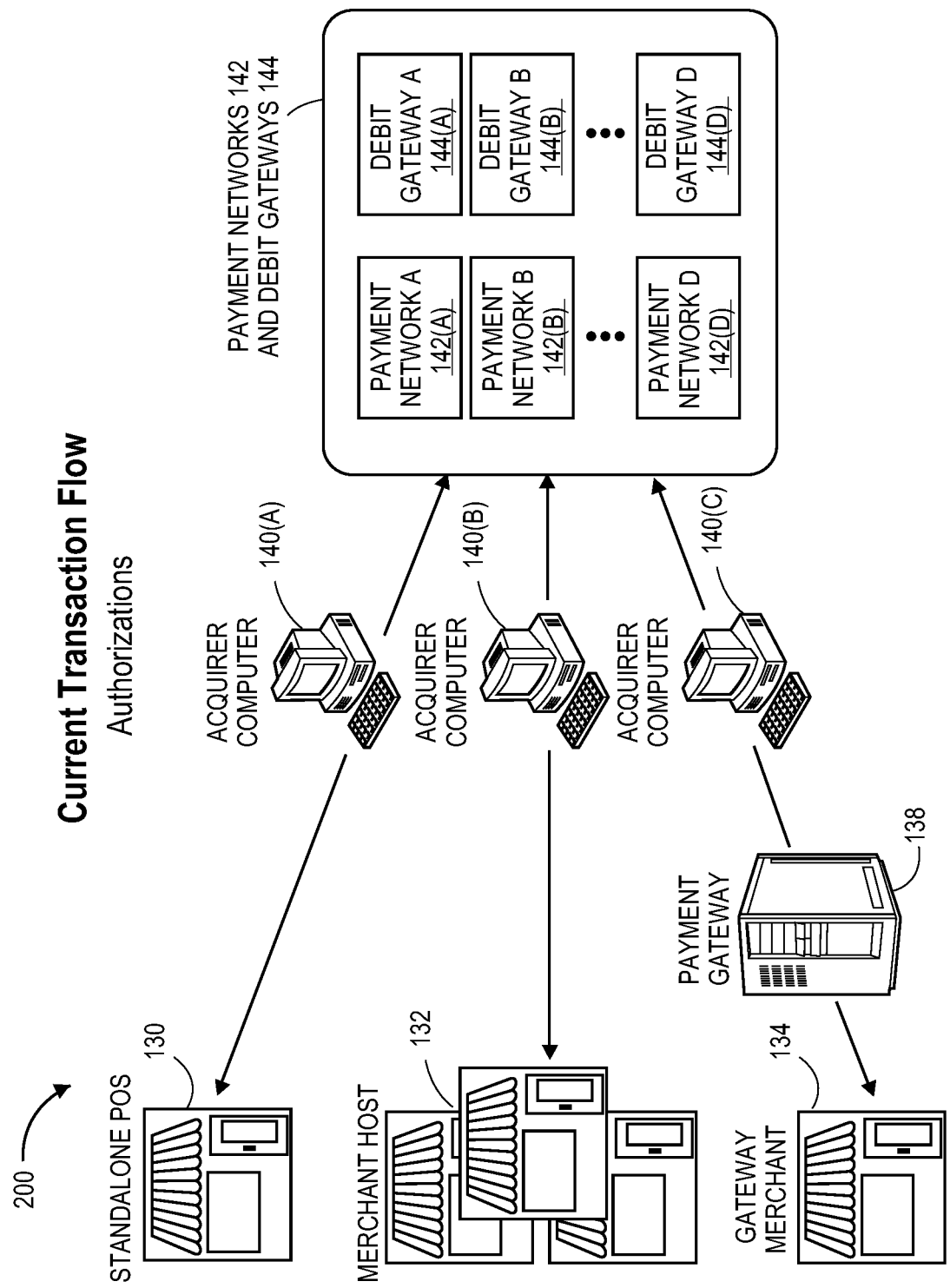
FIG. 2 shows a system diagram of a system with a plurality of acquirer computers.

FIG. 2 shows another overview of an exemplary system 200 for authorization processing in standard transaction processing. The system 200 includes a standalone merchant point-of-sale 130, a merchant host 132, a gateway merchant 134, a payment gateway 138, a plurality of acquirer computers 140(A)-140(C), and a plurality of payment networks 142(A)-142(D) and debit gateways 144(A)-144(D).

In standard transaction processing, each of the merchant systems (130, 132, and 134) have a connection to an acquirer computer 140(A)-140(C). The acquirer computers 140(A)-140(C) receive authorization request messages from the merchant systems such as the merchant point-of-sale 130, the merchant host 132, and the gateway merchant 134, and transmits them to the appropriate payment networks 142 or debit gateways 144. In embodiments of the invention, the merchant host 132 transmits an authorization request message to the acquirer computer 140(B). In some embodiments of the invention, the merchant host 132 transmits the authorization request message through a merchant data center that then transmits the authorization request message to the acquirer computer 140(B). In embodiments, the gateway merchant 134 transmits an authorization request message through a payment gateway 138 to the acquirer computer 140(C). Exemplary payment networks 142 may include MasterCard, JCP, American Express, Diners Club International and Discover. Exemplary debit gateways 144 include Pulse, Star, Shazam, NYCE, Maestro, Ak. Option, NETS, AFFN, Quest, Credit Union 24, and Accel Exchange.

Figure 3:
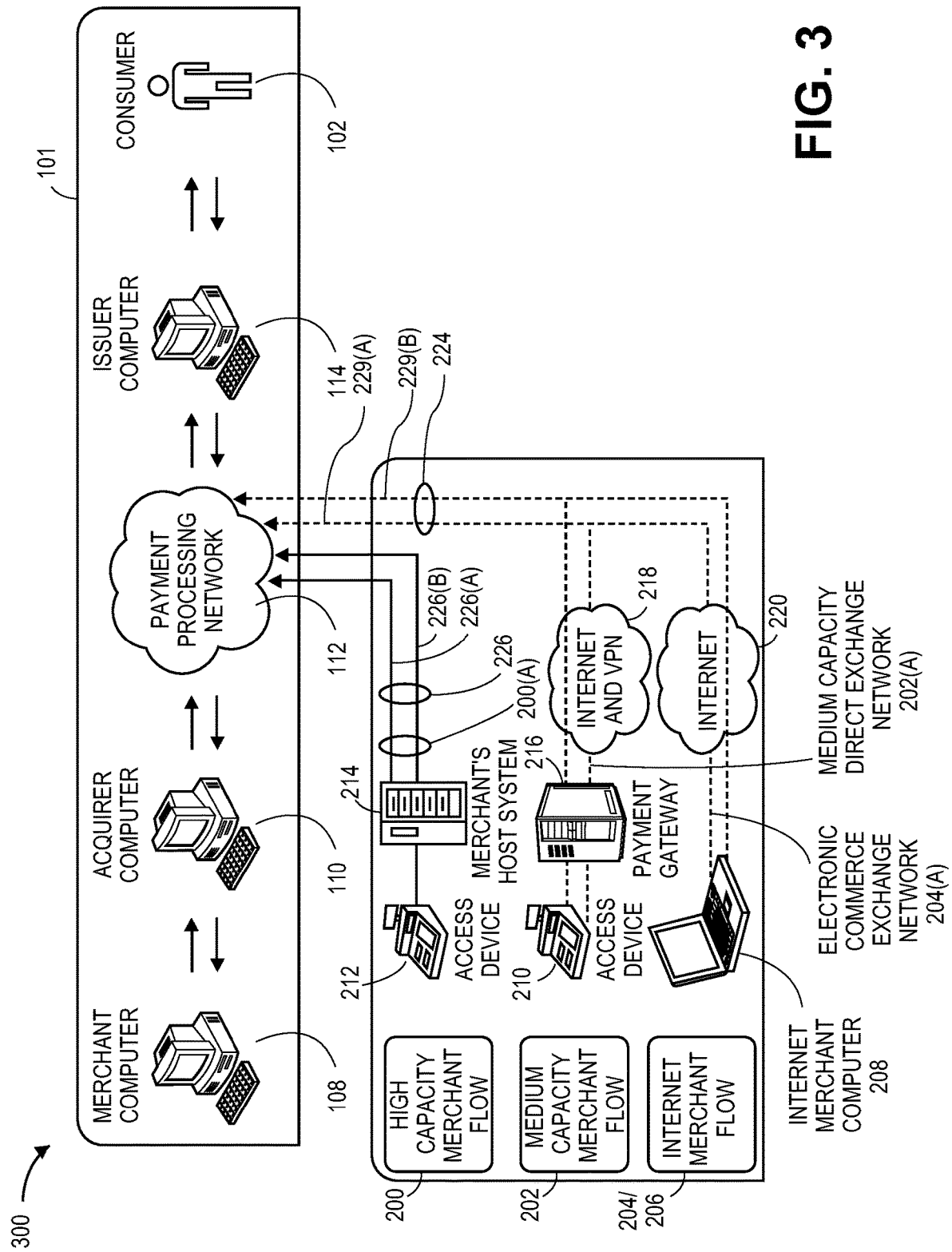
FIG. 3 shows a system diagram according an embodiment of the invention.

An exemplary system 300 for processing transactions according to embodiments of the invention is shown in FIG. 3. For simplicity of illustration, a certain number of components are shown is shown in FIG. 3. It is understood, however, that embodiments of the invention may include more than one of each component. In addition, some embodiments of the invention may include fewer than all of the components shown in FIG. 3. Also, the components in FIG. 3 may communicate via any suitable communication medium (including the internet), using any suitable communication protocol.

The system 300 includes a merchant computer 108 and an acquirer computer 110 communicatively coupled to the merchant computer 120. In a typical transaction, a consumer 102 may purchase goods or services at a merchant access device 210/212 or internet merchant computer 208 associated with the merchant computer 108. The acquirer computer 110 can communicate with an issuer computer 114 via a payment processing network 112. Elements 108, 110, 112, 114, and 102, in box 101, can correspond to a traditional payment infrastructure.

The merchant computer 108 may process transactions through one of three flows: a high capacity merchant flow 200, a medium capacity merchant flow 202, or an internet merchant flow 204. Some embodiments may include all three flows, some of the flows, or additional flows not described herein.

Figure 4:
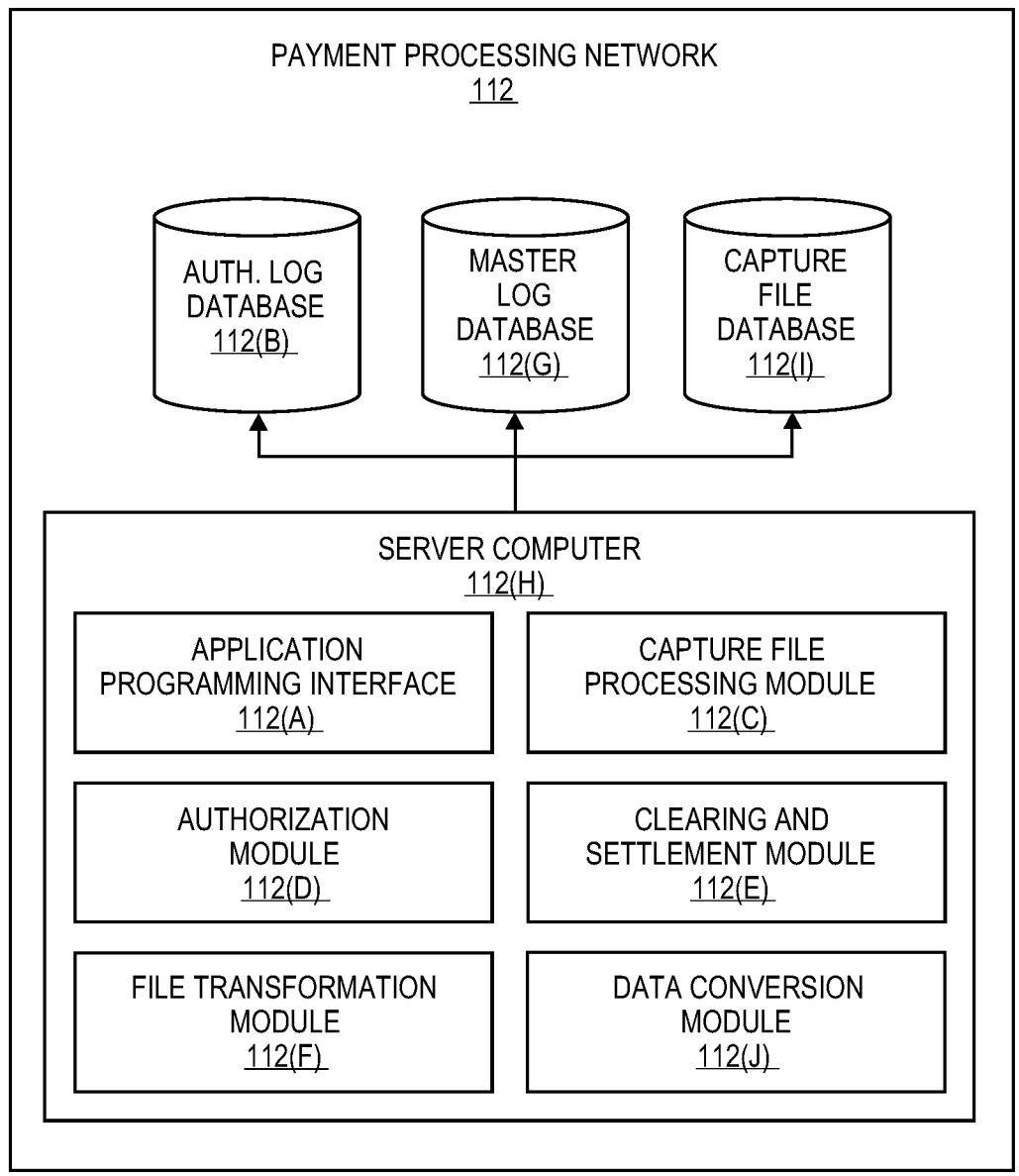
FIG. 4 shows a block diagram of components of a payment processing network according to an embodiment of the invention.

As depicted in FIG. 4, the payment processing network 112 may comprise a server computer 112(H) comprising an application programming interface 112(A), a capture file processing module 112(C), an authorization module 112(D), a clearing and settlement module 112(E), a file transformation module 112(F), and a data conversion module 112(J). The various modules may be embodied by computer code, residing on computer readable media.

The server computer 112(H) may be operatively coupled to one or more databases. The one or more databases may comprise an authorization log database 112(B), a master log database 112(G), and a capture file database 112(I).

The authorization module 112(D) processes authorization request messages and determines the appropriate destination for the authorization request messages. The authorization log database 112(B) contains records of authorization. The data contained in the authorization log database 112(B) can be transmitted to participating acquirers by subscription. The data contained in the authorization log database 112(B) can be in a plurality of file formats (e.g. TC33 POS Data, Raw Data, and POSA files).

The clearing and settlement module 112(E) handles the clearing and settlement of transaction made on payment processing network cards. An example of the clearing and settlement module is Base II, which provides clearing, settlement, and other interchange-related services to VISA members.

The data conversion module 112(J) can convert authorization request messages from one format to another format. In embodiments of the invention, the authorization request messages are transmitted by the merchants in XML, and the data conversion module 112(J) converts the message into an ISO format (e.g. ISO 8583) prior to sending them to issuers.

The various other modules and databases shown in FIG. 4 are described in further detail later in this application.

Figure 5:
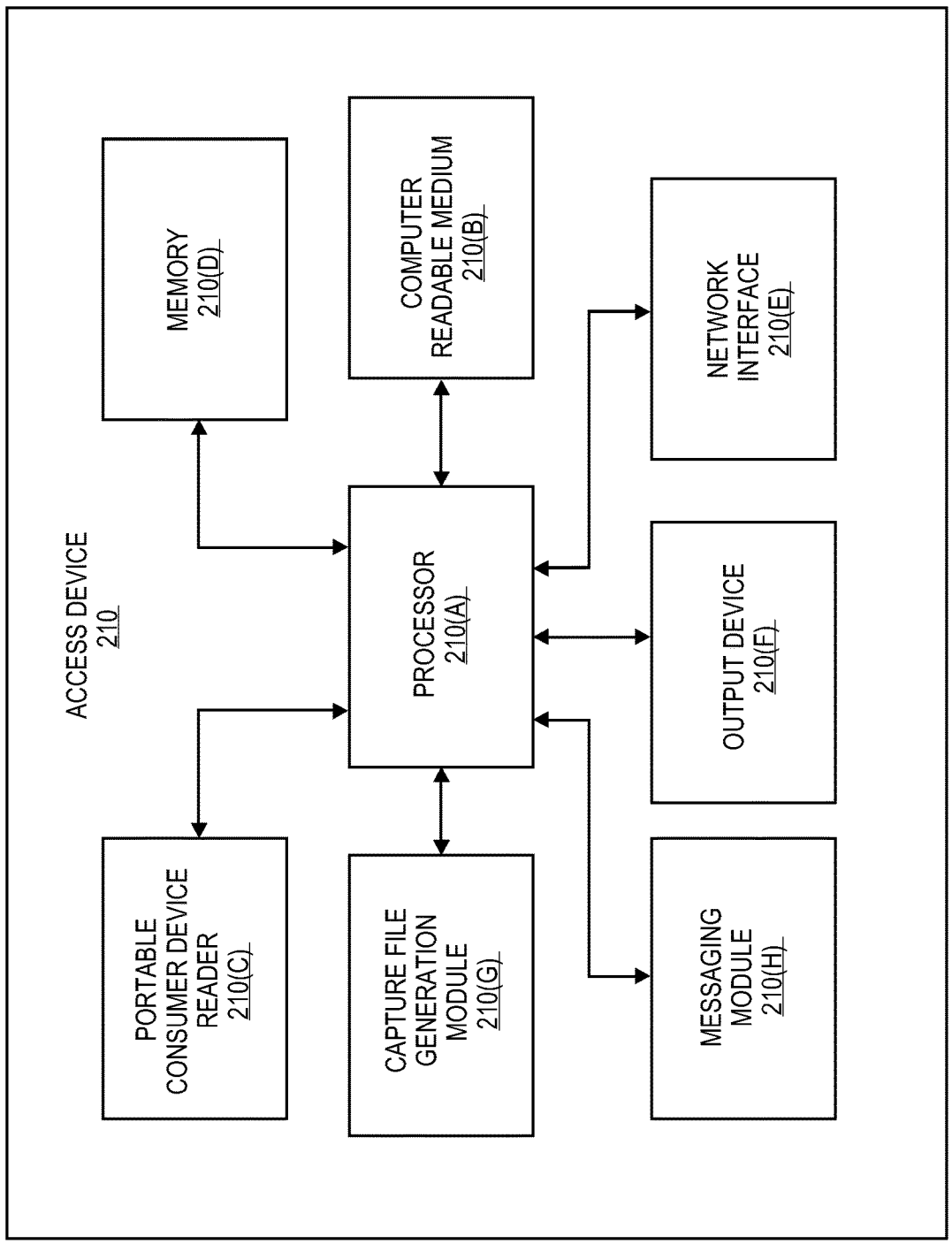
FIG. 5 shows a block diagram of components of a merchant access device according to an embodiment of the invention.

FIG. 5 shows a block diagram showing basic components that may reside in an exemplary access device 210. See FIG. 3. Access device 212 (or a computer operated by the consumer 102 accessing the internet merchant computer 208) can be configured in the same manner. An exemplary access device 210 may comprise a processor 210(A). It may also comprise a computer readable medium 210(B), a portable consumer device reader 210(C), a memory 210(D), a network interface 210(E), an output device 210(F), a capture file generation module 210(G), and a messaging module 210(H), all operatively coupled to the processor 210(A). A housing may house one or more of these components. Exemplary portable consumer device readers 210(C) can include RF (radio frequency) antennas, magnetic stripe readers, etc. that interact with the portable consumer device. Suitable output devices 210(F) may include displays and audio output devices. Exemplary computer readable media may include one or more memory chips, disk drives, etc.

The capture file generation module 210(G) can allow the access device 210 to generate capture file data messages for transaction that were conducted with the access device 210. In embodiments of the invention, the capture file generation module 210(G) generates capture files in a common data format. In some embodiments, the common data format is an XML format.

The messaging module 210(H) can generate authorization request messages, where the authorization request message includes a request to charge a consumer a predetermined amount of money to pay for a transaction, and non-payment transaction data messages that are transmitted to the payment processing network 112 for authorization processing.

The computer readable medium 210(B) can store code or instructions for allowing the capture file generation module 210(G) and messaging module 210(H) to operate as described herein. The instructions can be executed by the processor 210(A). The computer readable medium 210(B) can comprise code or instructions for generating an authorization request message, by the messaging module 210(H), generating a non-payment transaction data message, sending the authorization request message and non-payment transaction data message to a payment processing network 112 for authorization processing, and receiving an authorization response message, wherein the authorization response message indicates whether or not the charge is authorized or not authorized, and if the authorization response message indicates that the charge is authorized, completing the transaction with the consumer. The computer readable medium 210(B) can further comprise code or instructions for generating capture file messages by the capture file generation module 210(G) for transactions that are processed through the access device 210.

The network interface 210(E) can allow the access device 210 to send and receive messages from the merchant computer 108 and the payment processing network 112.

Returning now to FIG. 3, there can be a number of different flows including a high capacity merchant flow 200, a medium capacity merchant flow 202, and an Internet merchant flow 204. The high capacity merchant flow 200 can transmit large amounts of data, while the medium capacity merchant flow 202 can transmit medium to low amounts of data. They are typically associated with physical point of sale transactions. The internet merchant flow 204 is directed to Internet transaction flows. Each of these flows and the components used in these flows are described in further detail below.

The high capacity merchant flow 200 includes an access device 212, a merchant's host system 214, and a second communication path 226. The second communication path 226 may include one or more second communication channels. The second communication path 226 can be composed of at least two separate communications, including a first communication 226(A), which can be an authorization request message for a transaction, and a second non-payment transaction communication 226(B), which can contain additional data associated with the transaction. In some embodiments, the first communication and the second communication occur over the same communication path or channel. In other words, the authorization request message and the non-payment transaction data message can be routed on a single channel. In yet other embodiments, the first communication and the second communication occur over different communication channels.

In some embodiments, the high capacity merchant flow 200 can utilize a high capacity direct exchange network 200(A). An exemplary high capacity direct exchange network 200(A) is a merchant direct exchange (MDEX) platform service. An MDEX is geared toward high-volume merchants and utilizes ISO 8583 messaging. In some embodiments, the high capacity direct exchange network 200(A) transmits data in XML format. In other embodiments, the high capacity direct exchange network 200(A) is capable of authorization processing and file transfer capabilities.

Using an Internet-based protocol (IP) connection from the merchant computer 108 to the payment processing network 112 (e.g. VisaNet), MDEX accepts and routes authorizations for all card and transaction types. This results in merchants only needing to support one message format (e.g. Visa ISO 8583). The payment processing network 112 would provide any necessary translations or conversions of data to different formats for downstream recipients of the data.

The medium capacity merchant flow 202 includes an access device 210, a payment gateway 216, and a first communication path 224. The medium capacity merchant flow 202 utilizes a medium capacity direct exchange network 202(A) that connects the access device 210 through an Internet and VPN 218 to the payment processing network 112. A virtual private network (VPN) is a network configured within a public network (e.g. the Internet) to provide remote users an access to a central organizational network.

The first communication path 224 can carry two separate communications including a first authorization request communication 224(A), and a first non-payment transaction data communication 224(B). In some embodiments, the first communication and the second communication occur over the same communication channel. In other words, the authorization request message and the non-payment transaction data message can be routed on a single channel. In yet other embodiments, the first communication and the second communication occur over different communication channels.

In some embodiments, the payment gateway 216 can be a value-added reseller (VAR) gateway. A VAR is an entity that adds features or services to an existing product, and may resell it as an integrated product. Typically, a VAR is used to integrate systems and/or software. This allows the payment processing network 112 to more easily provide merchant information and value-added services to a merchant computer 108. In some embodiments, the payment gateway 216 is not present and the access device 210 connects directly to the payment processing network 112 through the Internet and VPN 218.

The internet merchant flow 204 includes an internet merchant computer 208 and the first communication path 224. The internet merchant flow 204 utilizes an electronic commerce exchange network 204(A) that connects through the Internet 220 using the first communication path 124 to transmit messages to the payment processing network 112. As described above, the first communication path 224 can comprise two separate communications including a first authorization request communication 224(A), and a first non-payment transaction data communication 224(B), which can be used to carry additional data associated with a transaction.

In some embodiments of the invention, the high capacity direct exchange network 200(A) can be merged with the medium capacity direct exchange network 202(A). Linking the two exchange networks would enable a merchant computer to transmit some transactions over one network, and others over the other network, dependent on transaction volume and traffic. In embodiments such as these, the high capacity direct exchange network 200(A) and the medium capacity direct exchange network 202(A) are linked through a VAR.

In embodiments of the invention, the first communication and the second communication pass over a direct exchange network to the server computer 112(H) at approximately the same time. In these embodiments, for example, the authorization request message and the non-payment transaction data message are transmitted to the payment processing network 112 at the same time. Both messages contain the same transaction identifier allowing them to be identified and associated with each other. That is, since the authorization request message and the non-payment transaction data message can be received at the payment processing network at different times, it can link the two messages by use of the transaction identifier so that appropriate processing can take place.

In other embodiments of the invention, the first communication and the second communication pass over a direct exchange network to the server computer 112(H) at different times. In these embodiments, for example, the authorization request message and the non-payment transaction data message are transmitted to the payment processing network 112 at different times. Both messages contain the same transaction identifier allowing them to be identified and associated with each other.

In some cases, a protocol translation may need to occur between different platforms. The payment gateway 216 can perform this function for any of the network access platforms. For example, if the internet merchant flow 204 is used, the transaction information can be sent from an internet merchant computer 208 or an access device through the payment gateway 216 for translation and then to the appropriate platform via the Internet. Once this information is properly translated and forwarded to the appropriate platform associated with the payment processing network 112, the payment processing network 112 can perform the functions of the acquirer computer 110 and issuer computer 114.

The data transmitted along the first communication path 224 and the second communication path 226 is communicated between a merchant access device 210 and 212 or an internet merchant computer 208, and a payment processing network 112. The data transmitted along the first communication path 224 and the second communication path 226 can be in any data format. In embodiments of the present invention, the data format is an XML format.

In a transaction utilizing embodiments of the invention, the consumer 102 purchases a good or service at a merchant access device 210/212. If the high capacity direct exchange network 200(A) is used, the merchant access device 210/212 can send an authorization request message and a non-payment transaction data message directly to the payment processing network 112. For example, the messages will be sent by the merchant's host system 214 along the second communication path 226.

If the medium capacity direct exchange network 202(A) or the electronic commerce exchange network 204(A) is used, the merchant access device 210/212 sends an authorization request message and a non-payment transaction data message over the Internet 218 or 220, along the first communication path 224. The messages may be sent through the payment gateway 216 before being received by the payment processing network 112.

The authorization request messages and non-payment transaction data messages sent using any of the previously described flows 200, 202, or 204, are received at a payment processing network 112. The payment processing network 112 communicates with an issuer computer 114, associated with the portable consumer device used in the particular transaction. As noted above, although only one issuer computer 114 is shown, in other embodiments there may be a plurality of issuer computers.

The issuer computer 114 receives the authorization request message and transmits an authorization response message approving or declining the transaction. The authorization response message is received by the payment processing network 112, which matches the authorization response message to the associated authorization request message, and forwards the authorization response message back to the merchant access device 210 or 212, or to the internet merchant computer 208.

At the end of the day, a clearing and settlement process can be conducted by the payment processing network 112. In some embodiments, clearing and settlement can occur simultaneously.

Figure 6:
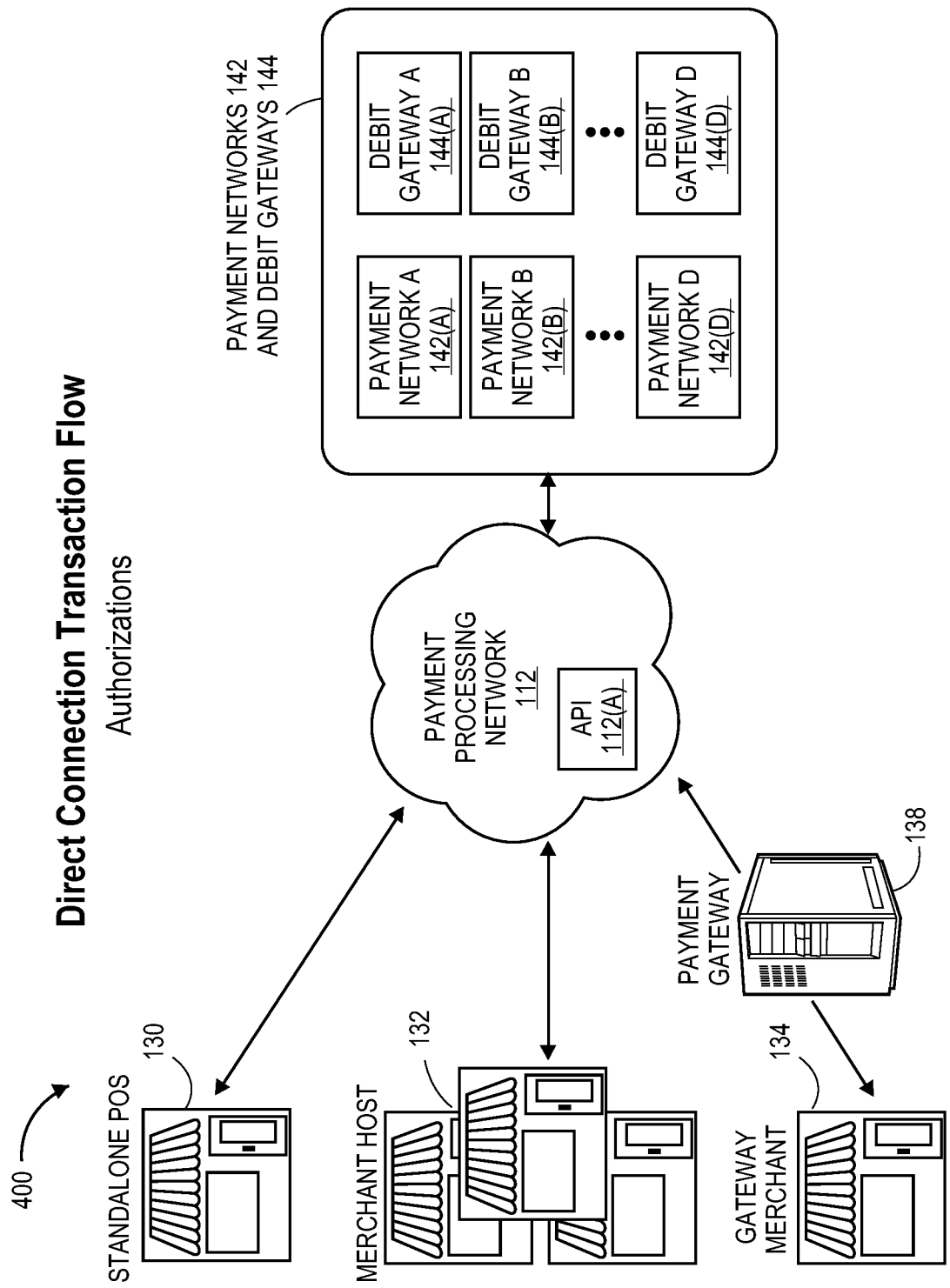
FIG. 6 shows a system diagram according to an embodiment of the invention.

FIG. 6 is a high level diagram of an exemplary system 400 for authorization processing utilizing an embodiment of the present invention. Authorization request messages and non-payment transaction data message can be transmitted to a payment processing network 112 for transmission to a plurality of payment networks 142 and debit gateways 144, without having to pass through an acquirer computer. The system 600 includes a standalone merchant point-of-sale 130, a merchant host computer 132, a gateway merchant 132, a payment gateway 138, a payment processing network 112, and a plurality of payment networks 142 and debit gateways 144. Each of the merchant systems (130, 132, and 134) has a direct connection to payment processing network 112 through an application programming interface (API) 112(A). The payment processing network 112 receives authorization request messages and non-payment transaction data messages from the merchant systems (130, 132, and 134) and transmits them to the appropriate payment networks 142 or debit gateways 144. In embodiments of the invention, the merchant host 132 transmits an authorization request message to the payment processing network 112. In some embodiments of the invention, the merchant host 132 transmits the authorization request message through a merchant data center that then transmits the authorization request message to the payment processing network 112. In embodiments, the gateway merchant 134 transmits an authorization request message through a payment gateway 138 to the payment processing network 112. In embodiments of the present invention, the merchant systems (130, 132, and 134) do not have to transmit authorization request messages and non-payment transaction data messages through a plurality of acquirer computers (as shown in FIG. 2).

Comparing the diagrams in FIG. 2 and FIG. 6, it is clear that the system shown in FIG. 6 is much less complex for a merchant to use and maintain.

Figure 7:
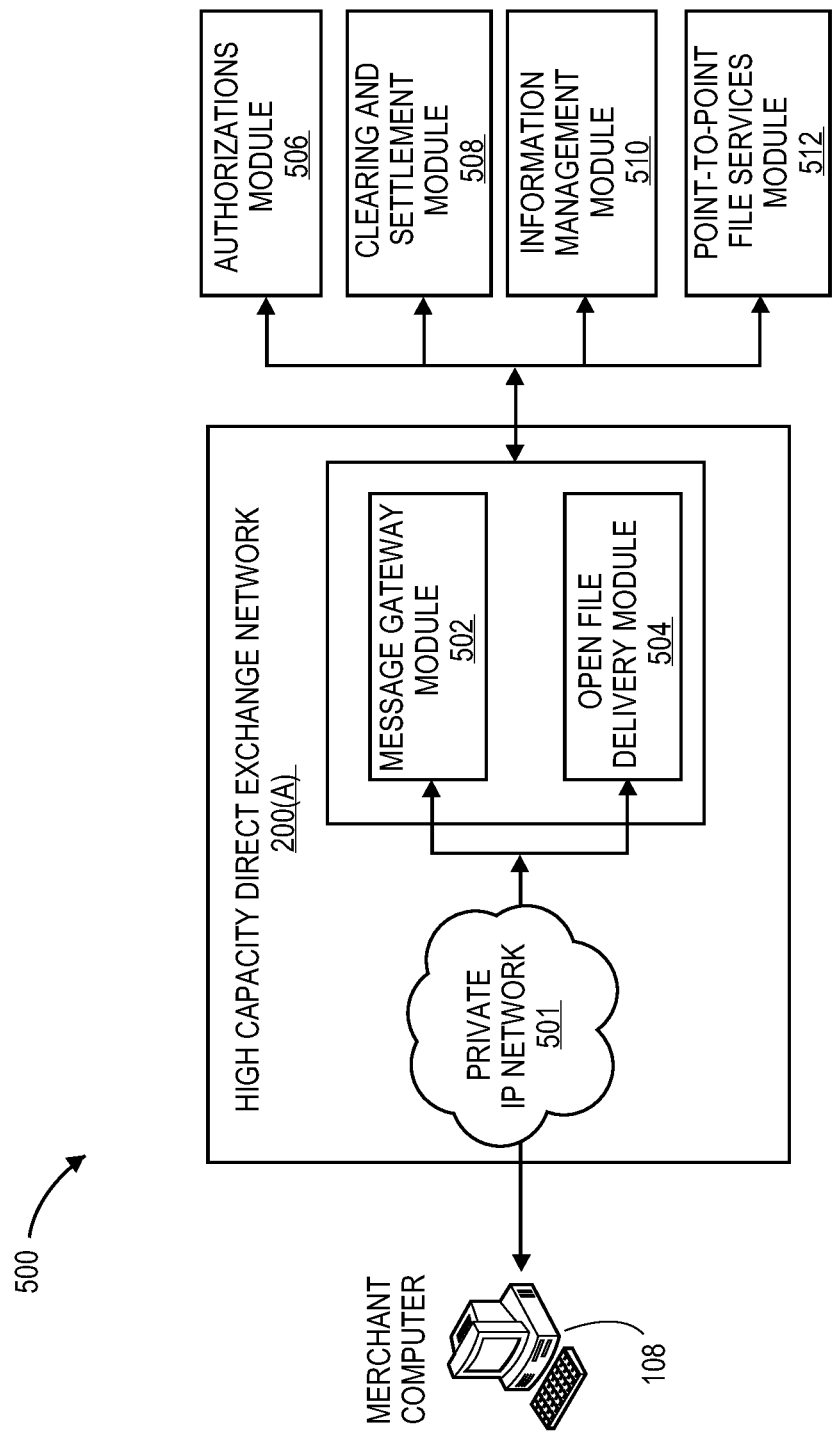
FIG. 7 shows a system diagram including a high capacity direct exchange network, according to an embodiment of the invention.

FIG. 7 depicts an example of the high capacity merchant flow 200. The merchant computer 108 can connect directly to the high capacity direct exchange network 200(A) via a private IP network 501. The high capacity direct exchange network 200(A) can utilize the message gateway module 502 and the open file delivery (OFD) module 504 to perform any number of functions. The message gateway 502 facilitates the routing of messages and transactions between endpoints and processing facilities. The message gateway 502 is also used to extend out to value-added services. Exemplary services are represented as modules: authorizations module 506, clearing and settlement module 508, information management module 510, and point-to-point file service (PPFS) module 512. These modules can reside outside of the high capacity direct exchange network 200 (A). For example, they can reside on a computer readable medium in a server computer in a payment processing network. In other embodiments, they can be located in a computer readable medium in a server computer in the high capacity direct exchange network 200(A).

The high capacity direct exchange network 200(A) can support both authorization request message processing and file transfer capabilities and can route both the payment processing network brand and non-payment processing network brand transactions. The high capacity direct exchange network 200(A) provides a direct link between a merchant and the payment processing network using second communication channel 226 for authorization processing and file delivery.

The open file delivery module 504 can manage clearing and settling file exchanges and data that is received in batch files that are used for a capture file and other value-added services. The open file delivery module 504 can transform or reformat a file from one file format to another as well aggregate, disaggregate, and merge file data from a single endpoint or multiple endpoints. Transforming, or reformatting, is managed by the open file delivery module 504 without the need for changes to the file at either the source of the destination endpoint, saving endpoints from having to develop reformatting capabilities in their own systems. In some embodiments, the format can be an XML format. The point-to-point file services provided by the open file delivery module 504 allows merchants to securely transfer proprietary, payment-related data to a plurality of high capacity direct exchange network 200(A) endpoints, eliminating the need for multiple connections. Also, for example, a merchant can send its end-of-day clearing files to its acquirer or can sends rewards data to its clearinghouses through the high capacity direct exchange network 200(A).

The message gateway module 502 can facilitate the authorization processing. The message gateway module 502 supports all payment processing network 112 message types. For example, message gateway module 502 can support authorization only (dual message), where the message contains just enough information necessary to authorize transactions and the clearing can be accomplished through either a completion or a clearing and settlement message. Another example includes full service messaging (full financial/single message), which contains all information necessary to authorize and clear simultaneously. The data fields used can vary depending on the message type. The message gateway module 502 can manage the real-time authorization flow between the merchant computer 108 and the payment processing network 112. The message gateway module 502 can also operate as a switch for all payment transactions, controlling traffic between all payment processing network participants. The message gateway module 502 can perform message translation for non-payment processing network brands. Additionally, the message gateway module 502 provides flexible content message format. For example, the content message format can be based on, e.g., Visa ISO 8583, the bit map can serve as a table of contents, the format can contain only fields that are relevant to the specific transaction, and the format can contain both packed and character data.

Figure 8A:
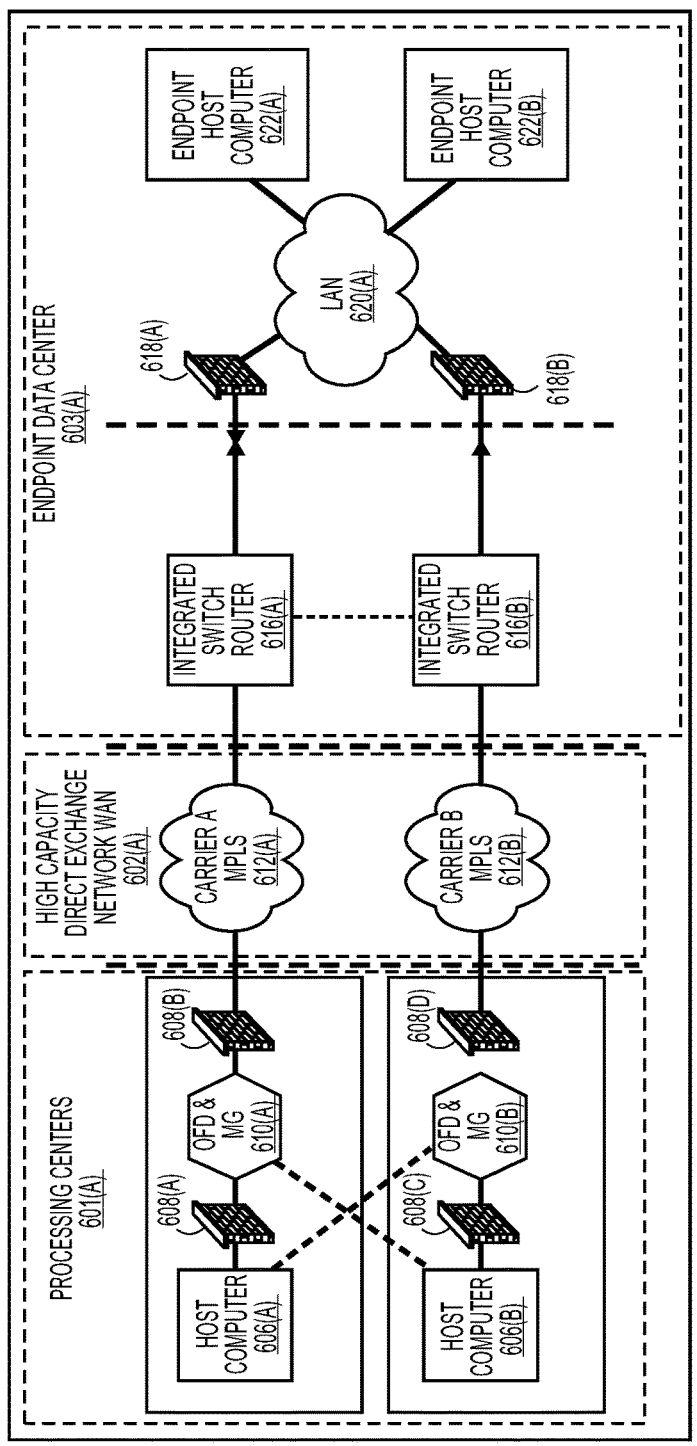
FIGS. 8A and 8B show high level diagrams of system configurations in accordance with the invention.

FIG. 8A depicts a network infrastructure for use with the high capacity direct exchange network 200(A). The network infrastructure includes a processing center 601(A), a high capacity direct exchange network wide area networks (WANs) 602(A), and an endpoint data centers 603(A). Processing center 601(A) is composed of host computers 606(A) and 606(B), firewalls 608(A-D), and open file delivery (OFD) and message gateway (MG) modules 610(A) and 610(B). Data is transmitted from the processing center to the endpoint data center across the high capacity direct exchange network wide area networks (WANs) 602(A) and 602(B) using Carrier A multiprotocol label switching and Carrier B multiprotocol label switching (MPLS) 612(A-C). MPLS is a mechanism in high-performance telecommunications networks that directs data from one network node to the next.

In embodiments, data is transmitted by one or more host computer 606(A) and 606(B) through firewalls 608(A) and 608(C) to open file delivery (OFD) and message gateway (MG) modules 610(A) and 610(B), which provide value-added services that are transmitted through additional firewalls 608(B) and 608(D) to Carrier A MPLS 612(A) and Carrier B MPLS 612(B). Carrier A MPLS 612(A) and Carrier B MPLS 612(B) direct the data to integrated switch routers 616(A) and 616(B) in an endpoint data center 603(A). The data passes through endpoint firewalls 618(A) and 618(B) through a local area network (LAN) 620(A) and out to endpoint host computers 622(A) and 622(B). In embodiments, the endpoint firewalls are optional.

Figure 8B:
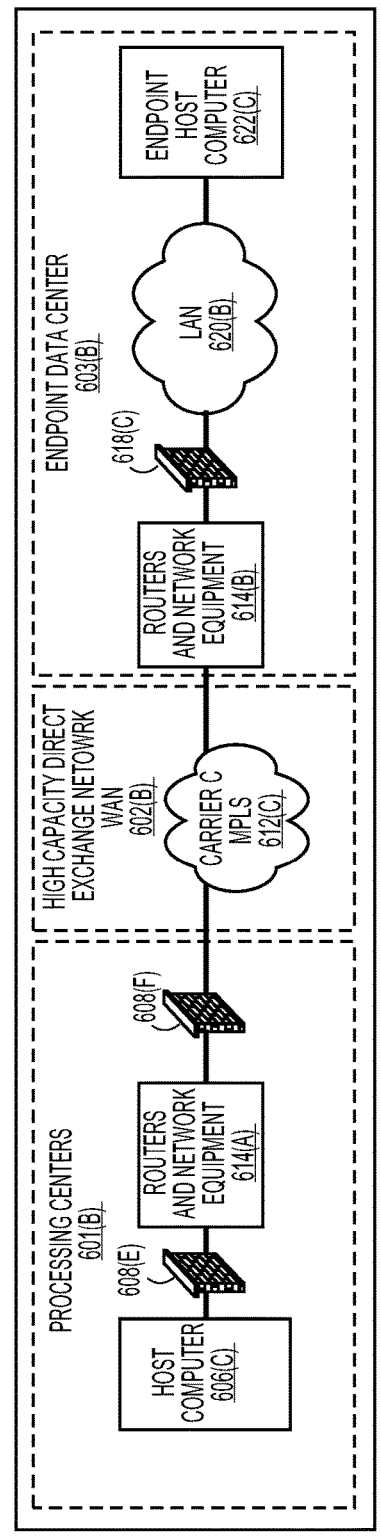

FIG. 8B depicts a network security infrastructure for use with the high capacity direct exchange network 200(A). The network infrastructure provides access control through redundant firewalls 608(E) and 608(F) in front of the payment processing network's host computers 606(C), routers and network equipment 614A), an MPLS 612(C) on the payment processing network's side of the network, and payment processing network-supplied routers and network equipment 614(B) at the endpoint's connection to the network. In embodiments, the endpoint firewall 618(C) is optional.

As discussed above, the architecture of the present technology allows a merchant computer 108 to directly connect to a payment processing network 112, allowing the payment processing network 112 to provide more value-added services to a merchant. The value-added services can include any services that a payment processing network 112 can perform for the benefit of the merchant, including, but not limited to:

Rewards and Rebate Services

Referring again to FIG. 3, in some embodiments, the payment processing network 112 can receive the first and second communications including payment and non-payment transaction information directly through one of the exchange networks 200(A), 202(A), and 204(A), and can then determine whether there are any rewards or rebates that can be applied to the transaction. If there are rewards or rebates, the payment processing network 112 can send that information to the merchant computer 108 via one of the exchange networks 200(A), 202(A), and 204(A) and process those rewards or rebates on behalf of the merchant. The non-payment transaction information that may be in a communication to the payment processing network may comprise, for example, a rebate identifier (e.g., a rebate number or form), or rewards account number of balance.

Loyalty and Coupon Processing

In some embodiments, the payment processing network 112 can receive product SKU data from the merchant computer 108 through one of the exchange networks 200(A), 202(A), and 204(A) during a transaction, and the payment processing network 112 can then find a coupon associated with the SKU and apply it to the transaction (e.g., in the form of a statement credit on a card account). The payment processing network 112 can subsequently request the payment for the discount from the product manufacturer on behalf of the merchant so that the merchant can more efficiently receive the payment.

In some embodiments, processing the non-payment transaction data comprises generating and transmitting a coupon to a communication device operated by a consumer. For example, if the non-payment transaction data indicates that the consumer purchased an item from a particular merchant, the payment processing network can identify a coupon associated with that merchant and send it to a consumer's communication device (e.g. smart phone, PDA, etc.).

Alert Services

In some embodiments, the payment processing network 112 can receive the transaction information directed through one of the exchange networks 200(A), 202(A), and 204(A) and can then directly provide the merchant computer 108 with any alerts that may be triggered by the transaction information. In some embodiments, the non-payment transaction information may comprise information regarding an alert status (e.g., is the consumer registered to receive alerts) or alert preferences (e.g., how the alert is to be sent to the consumer). In such embodiments, the alert preferences or alert data may be stored by the merchant or in the consumer's portable consumer device.

Shipping Services

In some embodiments, for internet merchant computers 208, the payment processing network 112 can receive the non-payment transaction information through one of the exchange networks 200(A), 202(A), and 204(A). If a product needs to be shipped, the payment processing network 112 can forward the transaction information to a shipper via one of the exchange networks 200(A), 202(A), and 204(A) who can subsequently ship the product purchased online, thereby eliminating the need for the merchant to send the shipping information to the shipper.

Data Security Services

In some embodiments, the payment processing network 112 can push data security upgrades for POS terminals directly to the merchant through one of the exchange networks 200(A), 202(A), and 204(A). For example, the payment processing network 112 can receive the transaction information through one of the exchange networks 200(A), 202(A), and 204(A) and can determine whether there is any risk associated with the transaction. If there is any risk, the payment processing network 112 can inform the merchant computer 108 via one of the exchange networks 200(A), 202(A), and 204(A).

Data Analytics

In some embodiments, the payment processing network 112 can receive and store transaction information for the transactions during a period of time (e.g. one month) via one of the exchange networks 200(A), 202(A), and 204(A). Using this information and information about the account holders, the payment processing network 112 can integrate this information into reports regarding any relevant statistics (e.g. which product are sold more often, which consumers purchase certain items, etc.).

Clearing and Settlement Services

In some embodiments, the payment processing network 112 can receive the transaction information for the transactions that occurred for that day via one of the exchange networks 200(A), 202(A), and 204(A). The payment processing network 112 can then compile that information and send it to the acquirer computer 111 on behalf of the merchant computer 108 for clearing and settling.

Payment Token Processing

In some embodiments, the payment processing network 112 can receive transaction information associated with a payment account via one of the exchange networks 200(A), 202(A), and 204(A). The payment processing network 112 can then authenticate the consumer 102 directly via one of the exchange networks 200(A), 202(A), and 204(A), without having to go through the acquirer. Once the consumer 102 is authenticated, the payment processing network 112 can alert the merchant computer 108 of the authentication via one of the exchange networks 200(A), 202(A), and 204(A).

B. Methods

Figure 9:
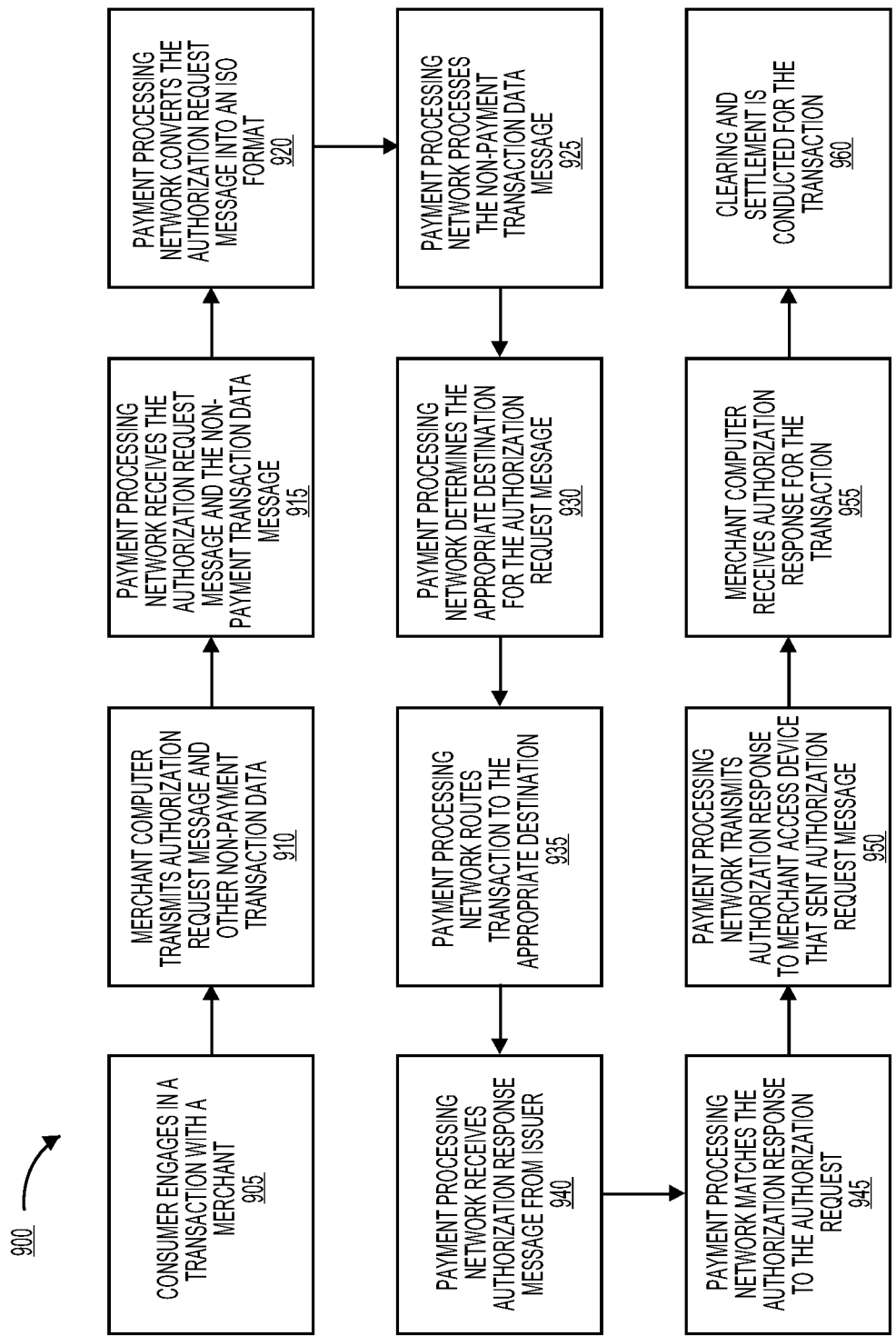
FIG. 9 illustrates a flowchart describing the operation of the system, according to an embodiment of the invention.

Methods according to embodiments of the invention can be described with respect to FIGS. 3 and 9. FIG. 9 is a flowchart of a method 900 for processing authorization request messages and authorization response messages through the system 300.

In step 905, the consumer engages in a transaction with a merchant. In a typical transaction, the consumer 102 purchases a good or service at a merchant access device 210/212 associated with a merchant using a portable consumer device such as a credit card or mobile phone. The consumer's portable consumer device can interact with the merchant access device 210/212 such as a POS (point of sale) terminal communicatively coupled to the merchant computer 108. For example, the consumer 102 may swipe the credit card through a POS terminal or, in another embodiment, may take a wireless phone and may pass it near a contactless reader in a POS terminal. In other embodiments, the consumer 102 may conduct a transaction over the Internet via a personal computer or internet-enabled portable consumer device.

In step 910, the merchant access device 210/212 transmits an authorization request message and a non-payment transaction data message to the payment processing network 112. In embodiments of the invention, the authorization request message and non-payment transaction data are transmitted to a server computer 112(H) in the payment processing network 112 where an acquirer computer is not present between the server computer and the merchant computer. The authorization request message may be transmitted in any suitable format. In embodiments of the invention, the authorization request message and the non-payment transaction data message are in an XML format, or other human and machine readable data format. In some embodiments, the authorization request message and the non-payment transaction data message are sent by a merchant's host system 214 over a high capacity direct exchange network 200(A), or in other embodiments, by a payment gateway over a medium capacity direct exchange network 202(A), or by an electronic commerce exchange network 204(A). In some embodiments of the invention, the authorization request messages do not pass through an acquirer, but are transmitted from a merchant through one of the direct exchange networks 200(A), 202(A), or 204(A), directly to the payment processing network 112. In embodiments of the invention, the authorization request message and the non-payment transaction data message can be sent either simultaneously or at different points of time from the merchant computer 108 to the payment processing network 112. Whether they are sent simultaneously or at different times, both the authorization request message and the non-payment transaction data message include a transaction identifier. The transaction identifier allows for the two messages to be identified as being related to the same transaction.

In step 915, the payment processing network 112 receives a first communication comprising an authorization request message and a second communication comprising non-payment transaction data at a server computer. In embodiments of the invention, the first communication and the second communication are received at approximately the same time. In other embodiments of the invention, the first communication and the second communication are received at different times. The payment processing network 112 receives the authorization request message and the non-payment transaction data message over the Internet 218/220. In embodiments of the invention, the authorization request message and the non-payment transaction data message can be received either simultaneously or at different points of time by the payment processing network 112. In some embodiments, the authorization request message and the non-payment transaction data message are transmitted to the payment processing network 112 via a second communication path 226 that is part of a high capacity direct exchange network 200(A). As described previously, in some embodiments, the second authorization communication 226(A) and the first non-payment transaction data communication 226 (B) can pass through the first communication path 226.

In step 920, a server computer 112(H) in the payment processing network 112 receives and processes the authorization request message. Processing the authorization request message can include determining whether the authorization request message is to be formatted into a different file format prior to transmission out to an issuer computer 114 or gateway computer 116. A data conversion module 112(J) in the payment processing network 112 formats the authorization request message from its original file format (e.g. XML) into an ISO format (e.g. ISO 8583) and passes the authorization request message to the authorization module 112(D)

which is also in the payment processing network 112. In some embodiments of the invention, the authorization request message may be converted to an ISO format prior to being received by the payment processing network 112.

In step 925, the server computer 112(H) in the payment processing network 112 receives and processes the non-payment transaction data message. For example, the non-payment transaction data message may include information about the transaction that is not related to the payment (e.g. item purchased was a blue shirt, etc.). In some embodiments, the payment processing network 112 can use the data contained in the non-payment transaction data message to modify the authorization request message. For example, if the payment processing network 112 is offering a $10 discount for the purchase of a blue shirt and it receives the exemplary non-payment transaction data message described above, the payment processing network 112 can adjust the total in the authorization request message by $10 before transmitting it to an issuer computer 114.

In step 930, the authorization module 112(D) processes the authorization request message and determines the appropriate destination for the authorization request message. For example, the authorization request message may need to be routed to either an issuer computer 114 associated with the payment processing network 112, or to a gateway computer 116 to other payment networks 142 or debit gateways 144 for processing.

In step 935, the payment processing network 112 transmits the formatted authorization request message to the appropriate destination. In embodiments of the invention, the authorization request message can be sent to an issuer computer 114 or if the message is for a different payment network 142 or debit gateway 144, the authorization request message is routed through a gateway computer 116 to the appropriate payment network 142 or debit gateway 144.

In step 940, the payment processing network 112 receives an authorization response message from the issuer computer 114. The authorization response message can provide an approval or denial of the authorization request sent in the authorization request message.

In step 945, the payment processing network 112 matches the authorization response message to the associated authorization request message by matching the transaction identifier for the two messages.

In step 950, the payment processing network 112 transmits the authorization response message to the merchant access device 210 or 212 from which it received the authorization request message and non-payment transaction data message. Prior to being transmitted, the data conversion module 112(J) in the payment processing network 112 formats the authorization request message from an ISO format into an XML format. The authorization response message is transmitted back along the first communication path 224. In embodiments where the high capacity direct exchange network 200(A) was used to transmit the authorization request message, the payment processing network 112 transmits the authorization response message back along the second communication path 226.

In step 955, the merchant computer 108 receives the authorization response for the transaction. If the authorization response message states that the transaction is approved, the merchant computer 108 continues with the transaction. If the authorization response message states that the transaction is declined, the transaction ends.

In step 960, clearing and settlement is conducted for transactions. In some embodiments of the invention, the clearing and settlement process is conducted at the end-of-day. In other embodiments, the clearing and settlement process can occur multiple times throughout the day. For a more detailed explanation of the clearing and settlement process, see below.

In other embodiments of the invention, a merchant computer 108 transmits, by an access device associated with the merchant computer, an authorization request message and a merchant data message through a merchant processor computer, and receives at the access device, an authorization response messages from the merchant processor computer.

In other embodiments of the invention, encryption is used to protect sensitive data. For example, transaction data can be encrypted at a merchant access device or merchant computer and decrypted by a payment processing computer.

C. Additional Message Embodiments

In order for access devices 210 and 212 to function within the system 300, the access devices 210 and 212 can be configured to recognize the messaging system used by the system 300. The following are examples of a messaging system used in some embodiments of the invention.

1. Requesting an Authorization

In embodiments of the invention, the system limits authorization and capture amounts to 999999999999 (twelve 9s). To request an authorization, set the ccAuthService_run field to true. As an example, to request an authorization in a card present authorization, the following fields can be presented in an authorization request message:

card_accountNumber—This field contains the customer's credit card number.

card_cardType—This field contains a value indicating the type of card to authorize. For example, "001" for Visa, "002" for MasterCard, "003" for Amex, etc.

card_expirationMonth—This field contains a two-digit value for the month that the credit card expires in.

card_expirationYear—This field contains a four-digit value for the year that the credit card expires in.

ccAuthService_run—This field contains a value of "true" or "false" indicating whether to include ccAuthService in the request.

commerceIndicator—This field contains a value indicating the type of transaction.

merchantID—This field contains a merchant ID value that is required for all credit card services.

merchantReferenceCode—This field contains a merchant-generated order reference number or tracking number.

pos_EntryMode—This field indicates the entry method of credit card information into the POS terminal (e.g. "keyed" or "swiped").

pos_cardPresent—This field indicates if the card was present at the time of the retail POS transaction.

pos_terminalCapability—This field indicates the capabilities of the POS terminal (e.g. terminal has a magnetic stripe reader, manual entry capability, or both).

pos_trackData—This field can contain track 1 data, track 2 data, or a combination of track 1 and track 2 data.

purchaseTotals_currency—This field indicates the currency used for the order.

purchaseTotals_grandTotalAmount—This field indicates the grand total for the order.

As another example, to request an authorization in a card-not-present authorization, the following fields can be presented in an authorization request message:

billTo_city—This field contains the city of the billing address.

billTo_country—This field contains the country of the billing address.

billTo_email—This field contains the customer's email address.

billTo_firstName—This field contains the customer's first name.

billTo_lastName—This field contains the customer's last name.

billTo_postalCode—This field contains the postal code of the billing address. This field is required only for transactions in the U.S. and Canada.

billTo_state—This field contains the state or province of the billing address. This field is required only for transactions in the U.S. and Canada.

billTo_street1—This field contains the first line of the billing street address as it appears on the credit card issuer's records.

card_accountNumber—This field contains the customer's credit card number.

card_cardType—This field contains a value indicating the type of card to authorize. For example, "001" for Visa, "002" for MasterCard, "003" for Amex, etc.

card_expirationMonth—This field contains a two-digit value for the month that the credit card expires in.

card_expirationYear—This field contains a four-digit value for the year that the credit card expires in.

ccAuthService_run—This field contains a value of "true" or "false" indicating whether to include ccAuthService in the request.

merchantID—This field contains a merchant ID value that is required for all credit card services.

merchantReferenceCode—This field contains a merchant-generated order reference number or tracking number.

purchaseTotals_currency—This field indicates the currency used for the order.

purchaseTotals_grandTotalAmount—This field indicates the grand total for the order.

2. Reversing an Authorization

In embodiments of the invention, the full authorization reversal service releases the hold that the authorization placed on the customer's credit card funds. This service is used to reverse an unnecessary or undesired authorization. Full authorization reversal can be used only for an authorization that has not been captured and settled. A full authorization reversal is a follow-on transaction that uses the request ID returned from a previous authorization. The system uses the request ID to look up the customer's billing and account information from the original authorization, which means you are not required to include those fields in your full authorization reversal request. As an example, the following fields can be presented in an authorization reversal request message:

ccAuthReversalService_run—To request a full authorization reversal, this field is set to "true".

ccAuthReversalService_authRequestID—This field contains the request ID value. The request ID links the full authorization reversal to the authorization.

merchantID—This field contains a merchant ID value that is required for all credit card services.

merchantReferenceCode—This field contains a merchant-generated order reference number or tracking number.

purchaseTotals_currency—This field indicates the currency used for the order.

purchaseTotals_grandTotalAmount—This field indicates the grand total for the order.

3. Capturing an Authorization

In embodiments of the invention, when the merchant is ready to fulfill a customer's order and transfer funds from the customer's bank to merchant bank, the authorization for the order must be captured. If the merchant fulfills only part of a customer's order, the full amount of the authorization is not captured; only the cost of the items that are being fulfilled. When the remaining items are shipped, a new authorization is requested and a new authorization is captured.

A capture is a follow-on transaction that uses the request ID returned from a previous authorization. The request ID links the capture to the authorization. The system uses the request ID to look up the customer's billing and account information from the original authorization, which means you are not required to include those fields in your capture request. As an example, the following fields can be presented in a capture request message:

ccCaptureService_run—To request a capture, this field is set to "true".

ccCaptureService_authRequestID—This field contains the request ID value. The request ID links the capture to the authorization.

merchantID—This field contains a merchant ID value that is required for all credit card services.

merchantReferenceCode—This field contains a merchant-generated order reference number or tracking number.

purchaseTotals_currency—This field indicates the currency used for the order.

purchaseTotals_grandTotalAmount—This field indicates the grand total for the order.

4. Crediting a Payment

In embodiments, when a request for a credit is successful, the issuing bank for the credit card takes money out of the merchant bank account and returns it to the customer. As an example, the following fields can be presented in a credit request message:

ccCreditService_run—To request a credit, this field is set to "true".

ccCreditService_captureRequestID—This field contains the request ID value.

merchantID—This field contains a merchant ID value that is required for all credit card services.

merchantReferenceCode—This field contains a merchant-generated order reference number or tracking number.

purchaseTotals_currency—This field indicates the currency used for the order.

purchaseTotals_grandTotalAmount—This field indicates the grand total for the order.

billTo_city—This field contains the city of the billing address.

billTo_country—This field contains the country of the billing address.

billTo_email—This field contains the customer's email address.

billTo_firstName—This field contains the customer's first name.

billTo_lastName—This field contains the customer's last name.

billTo_postalCode—This field contains the postal code of the billing address. This field is required only for transactions in the U.S. and Canada.

billTo_state—This field contains the state or province of the billing address. This field is required only for transactions in the U.S. and Canada.

card_accountNumber—This field contains the customer's credit card number.

card_cardType—This field contains a value indicating the type of card to authorize. For example, "001" for Visa, "002" for MasterCard, "003" for Amex, etc.

card_expirationMonth—This field contains a two-digit value for the month that the credit card expires in.

card_expirationYear—This field contains a four-digit value for the year that the credit card expires in.

5. Voiding a Capture or Credit

In embodiments, a void cancels a capture or credit request that was submitted to the system. A transaction can be voided only if the system has not already submitted the capture or credit request. The system usually submits capture and credit requests once a day. The system will decline a void request if the capture or credit request has already been sent. As an example, the following fields can be presented in a void request message:

voidService_run—To request to void a capture or credit, this field is set to "true".

voidService_voidRequestID—This field contains the request ID value.

merchantID—This field contains a merchant ID value that is required for all credit card services.

merchantReferenceCode—This field contains a merchant-generated order reference number or tracking number.

6. Partial Authorizations

For debit cards and prepaid cards, the issuer can approve a partial amount if the balance on the card is less than the requested authorization amount. Partial authorizations are supported for a plurality of payment networks (e.g. Visa, MasterCard, Diners Club, American Express, Discover, and JCB). As an example, the following fields can be presented in authorization reply message where there is a partial authorization:

ccAuthReply_requestAmount—This field indicates the amount of the authorization request requested.

ccAuthReply_requestCurrency—This field indicates the currency of the amount of the authorization request requested.

ccAuthReply_amount—This field indicates the amount of the authorization request authorized.

purchaseTotals_currency—This field indicates the currency of the amount of the authorization request authorized.

requestID—This field contains the request ID value.

7. Balance Responses

In embodiments of the invention, if there is a balance remaining on a prepaid card after an authorization, the authorization reply can include the balance amount. Balance responses are supported for a plurality of payment networks (e.g. Visa, MasterCard, Diners Club, American Express, Discover, and JCB). As an example, the following fields can be presented in balance response message:

ccAuthReply_accountBalance—This field contains the balance amount remaining on the prepaid card after an authorization.

ccAuthReply_accountBalanceCurrency—This field contains the currency of the balance amount.

ccAuthReply_accountBalanceSign—This field contains the sign for the balance amount 8. Level II Data In embodiments of the invention, Level II data is applicable to capture and credit services. As an example, Authorization API Order-Level Fields and Authorization API Item-Level Fields, such as the following, may be included in a message:

| Authorization API Order-Level Fields | | | |
| --- | --- | --- | --- |
| Field Name | Direct Connection Field Name | Description | Data Type & Length |
| invoiceHeader_taxable | localTaxIncluded | This field contains a flag that indicates whether an order is taxable. | String (5) |
| invoiceHeader_userPO | customerCode | This field contains a value that identifies a customer. | String (17) |
| otherTax_nationalTaxIndicator | nationalTaxInclude | This field contains a flag that indicates whether a national tax is included in the order total. | String (1) |

| Authorization API Item-Level Fields | | | |
| --- | --- | --- | --- |
| Field Name | Direct Connection Field Name | Description | Data Type & Length |
| item_#_nationalTax | nationalTaxAmount | This field contains the amount of national tax. | String (12) |
| item_#_taxAmount | localTaxAmount | This field contains a value of the amount of state or provincial tax included in the transaction amount. | String (12) |

9. Merchant Descriptors

In embodiments of the invention, merchant descriptors are applicable to authorization, capture and credit services. As an example, merchant descriptors for authorizations, capture, and credit services, such as the following, may be included in a message:

| Merchant Descriptor Fields for Authorizations | | |
|---|---|---|
| Field Name | Description | Data Type & Length |
| invoiceHeader_merchantDescriptor | This field contains the merchant's business name. | String (23) |
| invoiceHeader_merchantDescriptorContact | This field contains the merchant's business telephone number | String (14) |
| invoiceHeader_merchantDescriptorCountry | This field contains the country code for the merchant's business location. | String (2) |

| Merchant Descriptor Fields for Captures and Credits | | |
|---|---|---|
| Field Name | Description | Data Type & Length |
| invoiceHeader_merchantDescriptor | This field contains the merchant's business name. | String (23) |
| invoiceHeader_merchantDescriptorAlternate | This field contains alternate contact information for the merchant's business (e.g. email address or URL). | String (13) |
| invoiceHeader_merchantDescriptorCity | This field contains the city for the merchant's business location. | String (13) |
| invoiceHeader_merchantDescriptorContact | This field contains the merchant's business telephone number | String (14) |
| invoiceHeader_merchantDescriptorCountry | This field contains the country code for the merchant's business location. | String (2) |
| invoiceHeader_merchantDescriptorPostalCode | This field contains the postal code for the merchant's business location. | String (14) |
| invoiceHeader_merchantDescriptorStreet | This field contains the street address for the merchant's business location. | String (60) |

10. Request Fields for the Authorization API

In embodiments of the invention, the following fields are applicable some or all of authorization, capture and credit services. As an example, combinations of the following fields may be included in an authorization, capture or credit request message:

| Field Name | Description | Data Type & Length |
|---|---|---|
| billTo_buildingNumber | This field contains the building number in the street address. | String (256) |
| billTo_city | This field contains the city of the billing address. | String (50) |
| billTo_company | This field contains the name of the customer's company. | String (40) |
| billTo_country | This field contains the country of the billing address. | String (2) |

-continued

| Field Name | Description | Data Type & Length |
|---|---|---|
| billTo_customerID | This field contains the identifier for the customer. | String (50) |
| billTo_email | This field contains the customer's email address. | String (255) |
| billTo_firstName | This field contains the customer's first name. | String (60) |
| billTo_hostname | This field contains the DNS resolved hostname. | String (60) |
| billTo_httpBrowserType | This field contains the customer's browser type. | String (40) |
| billTo_ipAddress | This field contains the customer's IP address. | String (15) |
| billTo_lastName | This field contains the customer's last name. | String (60) |
| billTo_personalID | This field contains the personal identifier for the customer. | String (26) |
| billTo_phoneNumber | This field contains the customer's phone number. | String (15) |
| billTo_postalCode | This field contains the customer's postal code. | String (10) |
| billTo_state | This field contains the state or province of the customer's billing address. | String (2) |
| billTo_street1 | This field contains the first line of the billing street address. | String (40) |
| billTo_street2 | This field contains the second line of the billing street address. | String (40) |
| businessRules_declineAVSFlags | This field contains a list of AVS flags that cause the request to be declined for AVS reasons. | String (255) |
| businessRules_ignoreAVSResult | This field is used when calling ccAuthService and ccCaptureService together. This field enables you to use ccCaptureService even when the authorization receives an AVS decline. | String (5) |
| businessRules_ignoreCVResult | This field indicates whether to allow ccCaptureService to run if the value of the reply field ccAuthReply_cvCode is D or N. This field is used only when both ccAuthService and ccCaptureService are requested at the same time. | String (5) |
| card_accountNumber | This field contains the customer's credit card number | String with numbers only (20) |
| card_cardType | This field contains the type of card to authorize. | String (3) |
| card_cvindicator | This field contains a flag indicating whether a CVN code was sent. | String with numbers only (1) |
| card_cvNumber | This field contains the CVN number. | String with numbers only (4) |
| card_expirationMonth | This field indicates the two-digit month that the credit card expires in. | String (2) |
| card_expirationYear | This field indicates the four-digit year that the credit card expires in. | String (4) |

-continued

| Field Name | Description | Data Type & Length |
|---|---|---|
| ccAuthReversalService_authRequestID | This field contains the request ID for the authorization that is being requested to be reversed. | String (26) |
| ccAuthReversalService_run | This field indicates whether to include ccAuthReversalService in the request. | String (5) |
| ccAuthService_captureDate | This field indicates the date on which the capture will occur. | String (4) |
| ccAuthService_cavv | This field contains the cardholder authentication verification value. | String (40) |
| ccAuthService_commerceIndicator | This field indicates the type of transaction (e.g. install, internet, moto, recurring, and retail). | String (13) |
| ccAuthService_eciRaw | This field indicates the raw electronic commerce indicator (ECI). | String (2) |
| ccAuthService_partialAuthIndicator | This field contains a flag that indicates whether the transaction is enabled for partial authorization. | String (5) |
| ccAuthService_run | This field indicates whether include ccAuthService in the request | String (5) |
| ccAuthService_xid | This field contains a transaction identifier. | String (40) |
| ccCaptureService_authRequestID | This field contains the value of requestID returned from a previous ccAuthReply. | String (26) |
| ccCaptureService_authType | This field indicates the authorization type. For example, "verbal" for a verbally authorized transaction. | String (6) |
| ccCaptureService_industryDatatype | This field contains a flag that indicates that the transaction includes restaurant data. | String (10) |
| ccCaptureService_run | This field indicates whether to include ccCaptureService in the request. | String (5) |
| ccCaptureService_verbalAuthCode | This field contains a verbally received authorization code... | String (6) |
| ccCreditService_captureRequestID | This field contains the requestID returned from a previous request for capture. | String (26) |
| ccCreditService_commerceIndicator | This field indicates the type of transaction. | String (13) |
| ccCreditService_run | This field indicates Whether to include ccCreditService in the request. | String (5) |
| gratuityAmount | This field indicates the amount of gratuity. | String (12) |
| installment_amount | This field contains the amount for the current installment payment. | String (12) |
| installment_frequency | This field indicates the frequency of the installment payments | String (1) |
| installment_sequence | This field indicates the installment number when making payment in installments. | String (2) |

-continued

| Field Name | Description | Data Type & Length |
| --- | --- | --- |
| installment_totalAmount | This field indicates the total amount of the loan that is being paid for with the installment payments. | String (12) |
| Installment_totalCount | This field indicates the total number of installments when making payment in installments. | String (2) |
| invoiceHeader_merchantDescriptor | This field contains the merchant's business name. | String (23) |
| invoiceHeader_merchantDescriptorAlternate | This field contains alternate contact information for the merchant's business (e.g. email address or URL). | String (13) |
| invoiceHeader_merchantDescriptorCity | This field contains the city for the merchant's business location. | String (13) |
| invoiceHeader_merchantDescriptorContact | This field contains the merchant's business telephone number | String (14) |
| invoiceHeader_merchantDescriptorCountry | This field contains the country code for the merchant's business location. | String (2) |
| invoiceHeader_merchantDescriptorPostalCode | This field contains the postal code for the merchant's business location. | String (14) |
| invoiceHeader_merchantDescriptorStreet | This field contains the street address for the merchant's business location. | String (60) |
| invoiceHeader_taxable | This field contains a flag that indicates whether an order is taxable. | String (5) |
| invoiceHeader_userPO | This field contains a value that identifies a customer. | String (17) |
| item_#_nationalTax | This field indicates the amount of national tax | String (12) |
| item_#_productCode | This field indicates the type of product | String (255) |
| item_#_productName | This field contains the name of the product. | String (255) |
| item_#_productSKU | This field contains the SKU or the product's identifier code. | String (255) |
| item_#_quantity | This field contains the quantity of the product being purchased. | String (10) |
| item_#_taxAmount | This field indicates the total tax to apply to the product | String (15) |
| item_#_unitPrice | This field indicates the per-item price of the product. | String (15) |
| linkToRequest | This field contains a value that links the current authorization request to the original authorization request. | String (26) |
| merchantID | This field contains the merchant ID. | String (30) |
| merchantReferenceCode | This field contains a merchant-generated order reference or tracking number. | String (50) |
| otherTax_nationalTaxIndicator | This field indicates whether a national tax is included in the order total. | String (1) |

-continued

| Field Name | Description | Data Type & Length |
|---|---|---|
| pos_cardPresent | This field indicates if the card is present at the time of the retail POS transaction. | String (1) |
| pos_catLevel | This field indicates the type of card-activated terminal (e.g. automated dispensing machine, self-service terminal or limited-amount terminal). | String (1) |
| pos_entryMode | This field indicates the entry method of credit card information into the POS terminal (e.g. keyed or swiped). | String (6) |
| pos_terminalCapability | This field indicates the terminal's capability. | String (1) |
| pos_terminalID | This field indicates the terminal ID at the merchant location. | String (8) |
| pos_trackData | This field contains track 1 data, track 2 data, or a combination of both. | String (119) |
| processorID | This field contains a value that identifies the processor/acquirer to use for the transaction | String (3) |
| purchaseTotals_currency | This field indicates the currency used for the order. | String (5) |
| purchaseTotals_grandTotalAmount | This field contains the grand total for the order. | String (15) |
| shipFrom_postalCode | This field contains the postal code for the address from which the goods are shipped. | String (10) |
| shipTo_city | This field contains the name of the city to ship the product to. | String (50) |
| shipTo_country | This field contains the country to ship the product two using two-character country codes. | String (14) |
| shipTo_firstName | This field contains the first name for the person receiving the product. | String (60) |
| shipTo_lastName | This field contains the last name for the person receiving the product. | String (2) |
| shipTo_postalCode_ | This field contains the postal code for the shipping address. | String (14) |
| shipTo_shippingMethod | This field contains the shipping method for the product. | String (10) |
| shipTo_state | This field contains the state for the shipping address. | String (2) |
| shipTo_street1 | This field contains the first line of the address to ship the product to. | String (60) |
| shipTo_street2 | This field contains the second line of the address to ship the product to. | String (60) |
| thirdPartyCertificationNumber | This field contains, for third party gateways, a unique value that identifies a certification with the system. | String (12) |
| ucaf_authenticationData | This field contains a universal cardholder authentication field data. | String (32) |

-continued

| Field Name | Description | Data Type & Length |
| --- | --- | --- |
| ucaf_collectionIndicator | This field contains a universal cardholder authentication field collection indicator. | String with numbers only (1) |
| voidService_run | This field indicates whether to include voidService in the request | String (5) |
| voidService_voidRequestID | This field indicates the requestID of the capture or credit you want to void. | String (26) |
| invoiceHeader_ | This field contains the street address for the merchant's business location. | String (60) |
| invoiceHeader_ | This field contains the country code for the merchant's business location. | String (2) |
| invoiceHeader_ | This field contains the postal code for the merchant's business location. | String (14) |
| invoiceHeader_ | This field contains the street address for the merchant's business location. | String (60) |
| invoiceHeader_ | This field contains the country code for the merchant's business location. | String (2) |
| invoiceHeader_ | This field contains the postal code for the merchant's business location. | String (14) |
| invoiceHeader_ | This field contains the street address for the merchant's business location. | String (60) |

11. Reply Fields for the Authorization API

In embodiments of the invention, the following fields are applicable to some or all of authorization, capture and credit services. As an example, combinations of the following fields may be included in an authorization, capture or credit response message:

| Field Name | Description | Data Type & Length |
| --- | --- | --- |
| additionalData | This field can contain information about a decline. | String (255) |
| ccAuthReply_accountBalance | This field indicates the remaining balance on the prepaid card. | String (12) |
| ccAuthReply_accountBalanceCurrency | This field indicates the currency of the remaining balance on the prepaid card. | String (5) |
| ccAuthReply_accountBalanceSign | This field contains the sign for the remaining balance on the prepaid card (e.g. "positive" or "negative"). | String (8) |
| ccAuthReply_amount | This field contains the amount that was authorized. | String (15) |
| ccAuthReply_authorizationCode | This field contains the authorization code. | String (7) |
| ccAuthReply_authorizedDateTime | This field contains the time of the authorization. | String (20) |
| ccAuthReply_aysCode | This field contains the AVS results. | String (1) |

-continued

| Field Name | Description | Data Type & Length |
|---|---|---|
| ccAuthReply_aysCodeRaw | This field contains the AVS result code sent directly from the issuer. | String (10) |
| ccAuthReply_cardCategory | This field contains the payment network product ID. | String (3) |
| ccAuthReply_cardGroup | This field indicates the type of commercial card. | String (1) |
| ccAuthReply_cavvResponseCode | This field contains the mapped response code for a verification system. | String (1) or String (3) |
| ccAuthReply_cavvResponseCodeRaw | This field contains raw response code sent directly from the issuer for a verification system: | String (1) or String (3) |
| ccAuthReply_cvCode | This field contains the CVN result code. | String (1) |
| ccAuthReply_cvCodeRaw | This field contains the CVN result code sent directly from the issuer. | String (10) |
| ccAuthReply_merchantAdviceCode | This field indicates the reason the recurring payment transaction was declined. | String (2) |
| ccAuthReply_merchantAdviceCodeRaw | This field contains the raw merchant advice code sent directly from the issuer. | String (2) |
| ccAuthReply_paymentNetworkTransactionID | This field contains the network transaction ID | |
| ccAuthReply_personalIDCode | This field contains a personal identifier result. | String (1) |
| ccAuthReply_processorResponse | This field contains an error message sent directly from the issuer. | String (10) |
| ccAuthReply_reasonCode | This field contains a numeric value corresponding to the result of the credit card authorization request. | Integer (5) |
| ccAuthReply_reconciliationID | This field contains the reference number for the transaction. | String (60) |
| ccAuthReply_requestAmount | This field contains the amount requested to be authorized. | String (15) |
| ccAuthReply_requestCurrency | This field contains the currency for the amount requested to be authorized. | String (5) |
| ccAuthReversalReply_amount | This field indicates the amount that was reversed. | String (15) |
| ccAuthReversalReply_authorizationCode | This field contains an authorization code. | String (6) |
| ccAuthReversalReply_processorResponse | This field contains a response code. | String (10) |
| ccAuthReversalReply_reasonCode | This field contains a numeric value corresponding to the result of the full authorization reversal request | Integer (5) |
| ccAuthReversalReply_requestDateTime | This field indicates the time when the full authorization reversal was requested. | String (20) |
| ccCaptureReply_amount | This field indicates the amount that was captured. | String (15) |
| ccCaptureReply_reasonCode | This field indicates the numeric value corresponding to the result of the capture request. | Integer (5) |

-continued

| Field Name | Description | Data Type & Length |
|---|---|---|
| ccCaptureReply_reconciliationID | This field contains a reference number that may be used to reconcile. | String (60) |
| ccCaptureReply_requestDateTime | This field contains the time when capture is requested. | String (20) |
| ccCreditReply_amount | This field indicates the amount that was credited. | String (15) |
| ccCreditReply_reasonCode | This field contains a numeric value corresponding to the result of the credit request. | Integer (5) |
| ccCreditReply_reconciliationID | This field contains a reference number that may be used to reconcile. | String (60) |
| ccCreditReply_requestDateTime | This field contains the time when credit is requested. | String (20) |
| decision | This field summarizes the result of the overall Request (e.g. "ACCEPT", "ERROR", "REJECT"). | String (6) |
| invalidField_0...N | This field indicates fields in the request that contained invalid data. | String (100) |
| merchantReferenceCode | This field contains the order reference or tracking number provided in the request. | String (50) |
| missingField_0...N | This field indicates required fields that were missing from the request. | String (100) |
| purchaseTotals_currency | This field indicates currency used for the order. | String (5) |
| reasonCode | This field contains a numeric value corresponding to the result of the overall request. | Integer (5) |
| receiptNumber | This field contains a system trace number that must be printed on the customer's receipt. | String (6) |
| requestID | This field contains an identifier for the request. | String (26) |
| requestToken | This field contains a request token data created by the system for each reply. | String (256) |
| voidReply_amount | This field indicates the amount that was voided | String (15) |
| voidReply_currency | This field indicates the currency used for the order. | String (5) |
| voidReply_reasonCode | This field contains a numeric value corresponding to the result of the void request. | Integer (5) |
| voidReply_requestDateTime | This field indicates the time when the void was requested. | String (20) |

12. Redemptions

In embodiments of the invention, a redemption platform will enable merchants to offer a scalable redemption platform to power offers, coupons and loyalty. The redemption occurs during authorizations when a payment processing network receives the request making the needed adjustments to the authorization amount prior to sending out the issuer. The payment processing network sends messaging in the response back to the merchants for reconciliation and consumer messaging.

This solution can be utilized by payment processing networks and third parties to conduct real-time redemption of offers and loyalty. It will create a standard process for consumers to redeem offers and assist merchants in simplifying the business processes and reconciliation. Finally it can drive value to all participants; consumers an easier to use enroll in programs and redeem, for retailers/advertisers by providing new channels to reach consumers with a simple redemption process, and lastly payment processing network participants through the ability to offer next generation programs driving value to their clients.

For example, a consumer purchases $100 of goods from a merchant. The merchant computer transmits the authorization request to a payment processing network. The payment processing network matches the transaction with an offer qualification (e.g. $10 off a $100 or more purchase), and adjusts the amount in the authorization request to $90. The adjusted authorization request is transmitted to an issuer for approval. An authorization response is sent back to the payment processing network and through to the merchant computer. The receipt created by the merchant computer for the transaction reflects the real-time redemption and the shopper is notified (e.g. by, for example, SMS) of the offer redemption.

13. XML Examples for the Authorization API

In embodiments of the invention, the following is an example XML code for a credit card authorization request:

```
<requestMessage xmlns="urn:schemas-TBD:transaction-data-1.23">
    <merchantID>infodev</merchantID>
    <merchantReferenceCode>482046C3A7E94F5
    </merchantReferenceCode>
    <billTo>
        <firstName>John</firstName>
        <lastName>Doe</lastName>
        <street1>1295 Charleston Rd.</street1>
        <city>Mountain View</city>
        <state>CA</state>
        <postalCode>94043</postalCode>
        <country>US</country>
        <phoneNumber>650-965-6000</phoneNumber>
        <email>jdoe@example.com</email>
    </billTo>
    <item id="0">
        <unitPrice>49.95</unitPrice>
        <quantity>1</quantity>
    </item>
    <purchaseTotals>
        <currency>USD</currency>
    </purchaseTotals>
    <card>
        <accountNumber>4111111111111111</accountNumber>
        <expirationMonth>12</expirationMonth>
        <expirationYear>2015</expirationYear>
    </card>
    <ccAuthService run="true"/>
</requestMessage>
```

In embodiments of the invention, the following is an example XML code for a credit card authorization reply:

```
<c:replyMessage xmlns:c="urn:schemas-TBD:transaction-data-1.23">
    <c:merchantReferenceCode>482046C3A7E94F5
    </c:merchantReferenceCode>
    <c:requestID>0305782650000167905080</c:requestID>
    <c:decision>ACCEPT</c:decision>
    <c:reasonCode>100</c:reasonCode>
    <c:purchaseTotals>
        <c:currency>USD</c:currency>
    </c:purchaseTotals>
    <c:ccAuthReply>
        <c:reasonCode>100</c:reasonCode>
        <c:amount>49.95</c:amount>
        <c:authorizationCode>123456</c:authorizationCode>
        <c:avsCode>Y</c:avsCode>
        <c:avsCodeRaw>YYY</c:avsCodeRaw>
        <c:processorResponse>A</c:processorResponse>
        <c:accountBalance>50.05</c:accountBalance>
    </c:ccAuthReply>
</c:replyMessage>
```

In embodiments of the invention, the following is an example XML code for a credit card capture request:

```
<requestMessage xmlns="urn:schemas-TBD:transaction-data-1.37">
    <merchantID>infodev</merchantID>
    <merchantReferenceCode>482046C3A7E94F5BD1FE3C66C
    </merchantReferenceCode>
    <item id="0">
        <unitPrice>49.95</unitPrice>
        <quantity>1</quantity>
    </item>
    <purchaseTotals>
        <currency>USD</currency>
    </purchaseTotals>
    <ccCaptureService run="true">
        <authRequestID>0305782650000167905080
        </authRequestID>
    </ccCaptureService>
</requestMessage>
```

In embodiments of the invention, the following is an example XML code for a credit card capture reply:

```
<c:replyMessage xmlns:c="urn:schemas-TBD:transaction-data-1.37">
    <c:merchantReferenceCode>482046C3A7E94F5BD1FE3C66C
    </c:merchantReferenceCode>
    <c:requestID>1019827520348290570293</c:requestID>
    <c:decision>ACCEPT</c:decision>
    <c:reasonCode>100</c:reasonCode>
    <c:purchaseTotals>
        <c:currency>USD</c:currency>
    </c:purchaseTotals>
    <c:ccCaptureReply>
        <c:reasonCode>100</c:reasonCode>
        <c:amount>49.95</c:amount>
        <c:reconciliationID>1094820975023470
        </c:reconciliationID>
    </c:ccCaptureReply>
</c:replyMessage>
```

In embodiments of the invention, the following is an example XML code for a fully approved authorization request.

```
<requestMessage xmlns="urn:schemas-TBD:transaction-data-1.52">
    <merchantID>OkGo</merchantID>
    <merchantReferenceCode>AB1234.1-
1</merchantReferenceCode>
    <billTo>
        <firstName>John</firstName>
        <lastName>Smith</lastName>
        <street1>201 S. Division St.</street1>
        <street2>Suite 500</street2>
        <city>Ann Arbor</city>
        <state>MI</state>
        <postalCode>48104-2201</postalCode>
        <country>US</country>
        <phoneNumber>123-456-7890</phoneNumber>
        <email>okgo@example.com</email>
    </billTo>
    <purchaseTotals>
        <currency>usd</currency>
        <grandTotalAmount>1500.00</grandTotalAmount>
    </purchaseTotals>
    <card>
        <accountNumber>5555555555554444</accountNumber>
```

```
            <expirationMonth>12</expirationMonth>
            <expirationYear>2015</expirationYear>
            <cvNumber>xxx</cvNumber>
            <cardType>002</cardType>
        </card>
        <ccAuthService run="true"/>
</requestMessage>
```

In embodiments of the invention, the following is an example XML code for a fully approved authorization reply.

```
<c:replyMessage xmlns:c="urn:schemas-TBD:transaction-data-1.52">
        <c:merchantReferenceCode>AB1234.1-
1</c:merchantReferenceCode>
        <c:requestID>2688497722340000852964</c:requestID>
        <c:decision>ACCEPT</c:decision>
        <c:reasonCode>100</c:reasonCode>
        <c:purchaseTotals><c:currency>usd
        </c:currency></c:purchaseTotals>
        <c:ccAuthReply>
                <c:reasonCode>100</c:reasonCode>
                <c:amount>1500.00</c:amount>
                <c:authorizationCode>831000</c:authorizationCode>
                <c:avsCode>A</c:avsCode>
                <c:avsCodeRaw>A</c:avsCodeRaw>
                <c:cvCode>3</c:cvCode>
                <c:processorResponse>000</c:processorResponse>
                <c:merchantAdviceCode>00</c:merchantAdviceCode>
                <c:accountBalance>23.62</c:accountBalance>
                <c:cardCategory>MCC</c:cardCategory>
                <c:accountBalanceCurrency>usd
                </c:accountBalanceCurrency>
                <c:accountBalanceSign>positive
                </c:accountBalanceSign>
        </c:ccAuthReply>
</c:replyMessage>
```

In embodiments of the invention, the following is an example XML code for a partially approved authorization request where the original request amount is $1401 USD.

```
<requestMessage xmlns="urn:schemas-TBD:transaction-data-1.52">
        <merchantID>OkGo</merchantID>
        <merchantReferenceCode>AB1234.1-
1</merchantReferenceCode>
        <billTo>
                <firstName>John</firstName>
                <lastName>Smith</lastName>
                <street1>201 S. Division St.</street1>
                <street2>Suite 500</street2>
                <city>Ann Arbor</city>
                <state>MI</state>
                <postalCode>48104-2201</postalCode>
                <country>US</country>
                <phoneNumber>123-456-7890</phoneNumber>
                <email>okgo@example.com</email>
        </billTo>
        <purchaseTotals>
                <currency>usd</currency>
                <grandTotalAmount>1401.00</grandTotalAmount>
        </purchaseTotals>
        <card>
                <accountNumber>5555555555554444</accountNumber>
                <expirationMonth>12</expirationMonth>
                <expirationYear>2015</expirationYear>
                <cvNumber>xxx</cvNumber>
                <cardType>002</cardType>
        </card>
        <ccAuthService run="true"/>
</requestMessage>
```

In embodiments of the invention, the following is an example XML code for a partially approved authorization reply where the approved amount is $500 USD.

```
<c:replyMessage xmlns:c="urn:schemas-TBD:transaction-data-1.52">
        <c:merchantReferenceCode>AB1234.1-
1</c:merchantReferenceCode>
        <c:requestID>2688497722340000852964</c:requestID>
        <c:decision>REJECT</c:decision>
        <c:reasonCode>110</c:reasonCode>
        <c:purchaseTotals><c:currency>usd
        </c:currency></c:purchaseTotals>
        <c:ccAuthReply>
                <c:reasonCode>110</c:reasonCode>
                <c:amount>500.00</c:amount>
                <c:authorizationCode>831000</c:authorizationCode>
                <c:avsCode>A</c:avsCode>
                <c:avsCodeRaw>A</c:avsCodeRaw>
                <c:cvCode>3</c:cvCode>
                <c:processorResponse>010</c:processorResponse>
                <c:merchantAdviceCode>00</c:merchantAdviceCode>
                <c:cardCategory>MCC</c:cardCategory>
                <c:requestAmount>1401.00</c:requestAmount>
                <c:requestCurrency>usd</c:requestCurrency>
        </c:ccAuthReply>
</c:replyMessage>
```

D. Technical Benefits

Embodiments of the invention provide the technical benefits of efficiency and conserving resources. As merchant systems are connected directly to a payment processing network, which facilitates communications in the authorization process between the merchant and a plurality of issuers, payment networks, and debit gateways, merchants do not have to establish multiple connections to multiple payment networks. This creates greater efficiency as the payment processing network can conduct file translation to a plurality of destinations, where in the past, the merchant systems would have to be able to do so. Further, as data conversion can be conducted by the payment processing network on behalf of the merchant, the merchant requires less data storage for acquirer rules and requirement for data files and saves resources by not having to do file conversions to meet different requirements. Furthermore, computing and network resources of acquirer systems are not utilized at all prior to clearing and settlement, with no or relatively little increase in the use of computing and network resources of merchants and payment networks. In some cases, fewer network resources are used since acquirer computers are not used in many areas (e.g. authorization), where they have been traditionally used.

II. Flexible File Format

Embodiments of the invention disclosed herein include systems and methods for utilizing the capabilities of a payment processing network to customize the format of capture files for different acquirers on behalf of merchant computers in communication with the payment processing network.

Payment processing networks can provide their customers (merchants) with value-added services, such as, e.g., connecting the merchants to their acquirer and performing authorization message processing and clearing and settlement services on behalf of the merchant by creating and sending clearing and settlement files to the merchant's acquirer. In order to do this, the payment processing network must connect to the merchant's acquires. This can require the payment processing network to connect to several acquirers.

In embodiments of the invention, the merchant can connect to the payment processing network (e.g. VisaNet) via an application programming interface (API) in order to receive merchant services. The payment processing network (e.g.

VisaNet) is used as a gateway to the appropriate acquirer when sending data such as authorization request messages or capture files for clearing and settlement. This process flow is beneficial because it eliminates the need for the merchant access device or merchant computer to connect to each individual acquirer. Since the data transfer paths to different acquirers are already set up for the payment processing network, using it as a gateway allows the merchant computer to manage fewer connections.

In addition, a flexible file format can be used for clearing and settlement files, in which the file format can be more easily configured depending on the acquirer's needs. The flexible file format is formatted in a manner that allows certain data to be added or omitted before sending to an acquirer based on that acquirer's needs. For example, an acquirer may decide which data the acquirer wishes to receive. The flexible file format allows for easy reconfiguration of the data file based on those needs.

A. Systems

Figure 10:
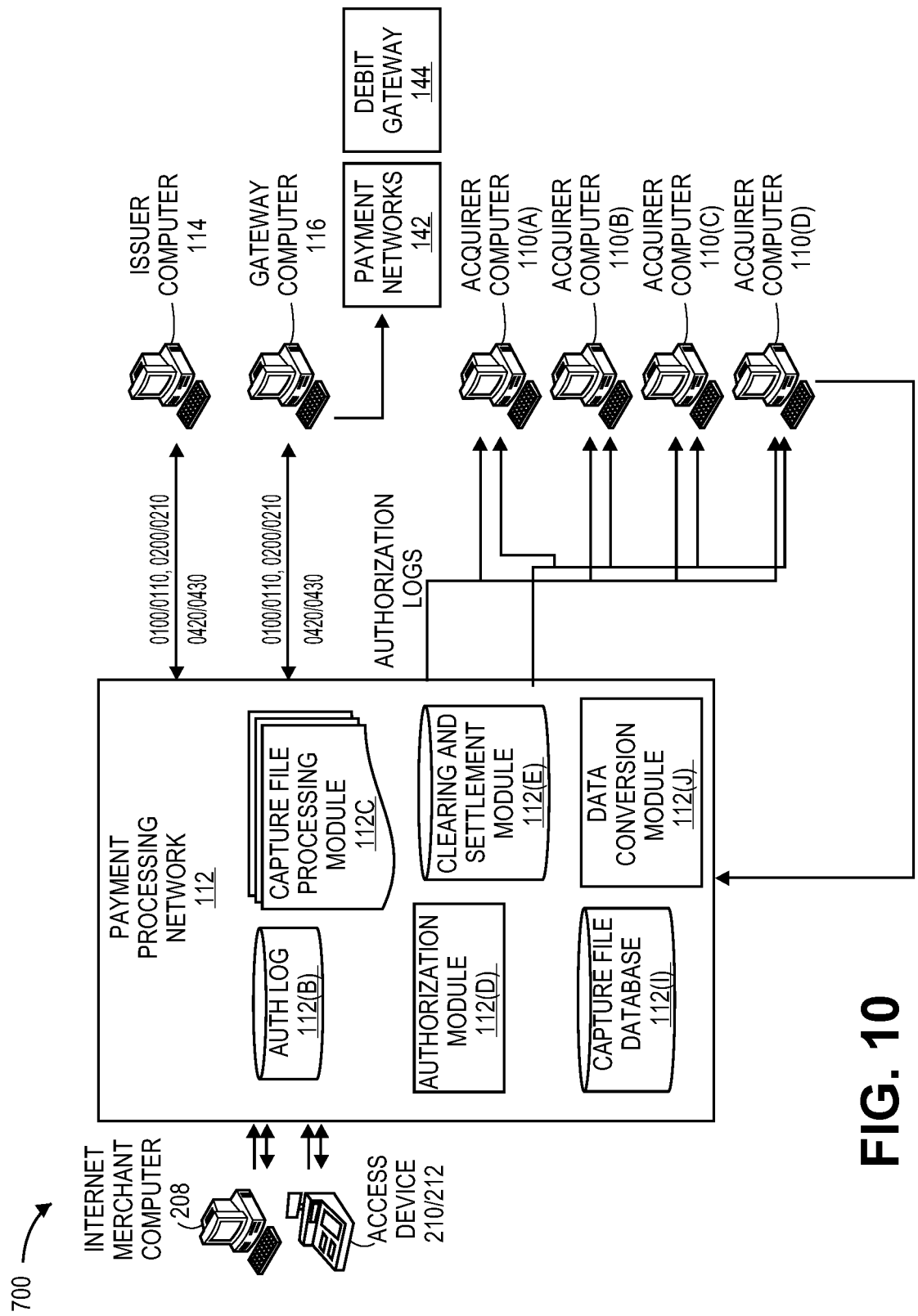
FIG. 10 is another system diagram illustrating one embodiment of a system in accordance with the invention. This system can be used to perform a capture process.

An exemplary system 700 for processing a transaction and transmitting capture file data utilizing the present invention can be seen in FIG. 10. For simplicity of discussion, only one of each component is shown. It is understood, however, that embodiments of the invention may include more than one of each component. In addition, some embodiments of the invention may include fewer than all of the components shown in FIG. 10. Also, the components in FIG. 10 may communicate via any suitable communication medium (including the internet), using any suitable communication protocol.

The system 700 includes an internet merchant computer 208, a plurality of acquirer computers 110(A-D), a payment processing network 112, an issuer computer 114, a gateway computer 116, and merchant access devices 210 or 212. In a typical transaction, a consumer may purchase goods or services at a merchant through a merchant access device merchant 210 or 212, or through an internet merchant computer 208. The acquirer computer 110 can communicate with an issuer computer 114 via a payment processing network 112.

The payment processing network 112 is comprised of at least an authorization log database 112(B), a capture file processing module 112(C), an authorization module 112(D), a clearing and settlement module 112(E), a capture file database 112(I), and a data conversion module 112(J). Additional components are depicted in FIG. 4.

The authorization log database 112(B) contains records of authorization. The data contained in the authorization log database 112(B) can be transmitted to participating acquirers by subscription. The data contained in the authorization log database 112(B) can be in a plurality of file formats (e.g. TC33 POS Data, Raw Data, and POSA files).

The capture file processing module 112(C) generates capture files from the data sent from the merchant computer 108 to the payment processing network 112 in the authorization request message. In embodiments of the invention, the capture files are in a flexible file format (e.g. XML). The capture file processing module 112(C) accumulates the capture files in the capture file database 112(I) until a batch cut-off is met. In other embodiments, the capture file processing module 112(C) accumulates the capture files in the capture file database 112(I) until a pre-determined scheduled time, or at the end of the day.

The authorization module 112(D) processes the authorization request message and determines the appropriate destination for the authorization request message.

The clearing and settlement module 112(E) handles the clearing and settlement of transaction made on payment processing network cards. An example of the clearing and settlement module is Base II, which provides clearing, settlement, and other interchange-related services to members.

The capture file database 112(I) is a database that accumulates and stores capture files prior to clearing and settlement.

The data conversion module 112(J) converts the authorization request message from one format to another format. In embodiments of the invention, the authorization request message is generated and processed in XML and the data conversion module 112(J) converts the message into an ISO format (e.g. ISO 8583).

B. Methods

Figure 18:
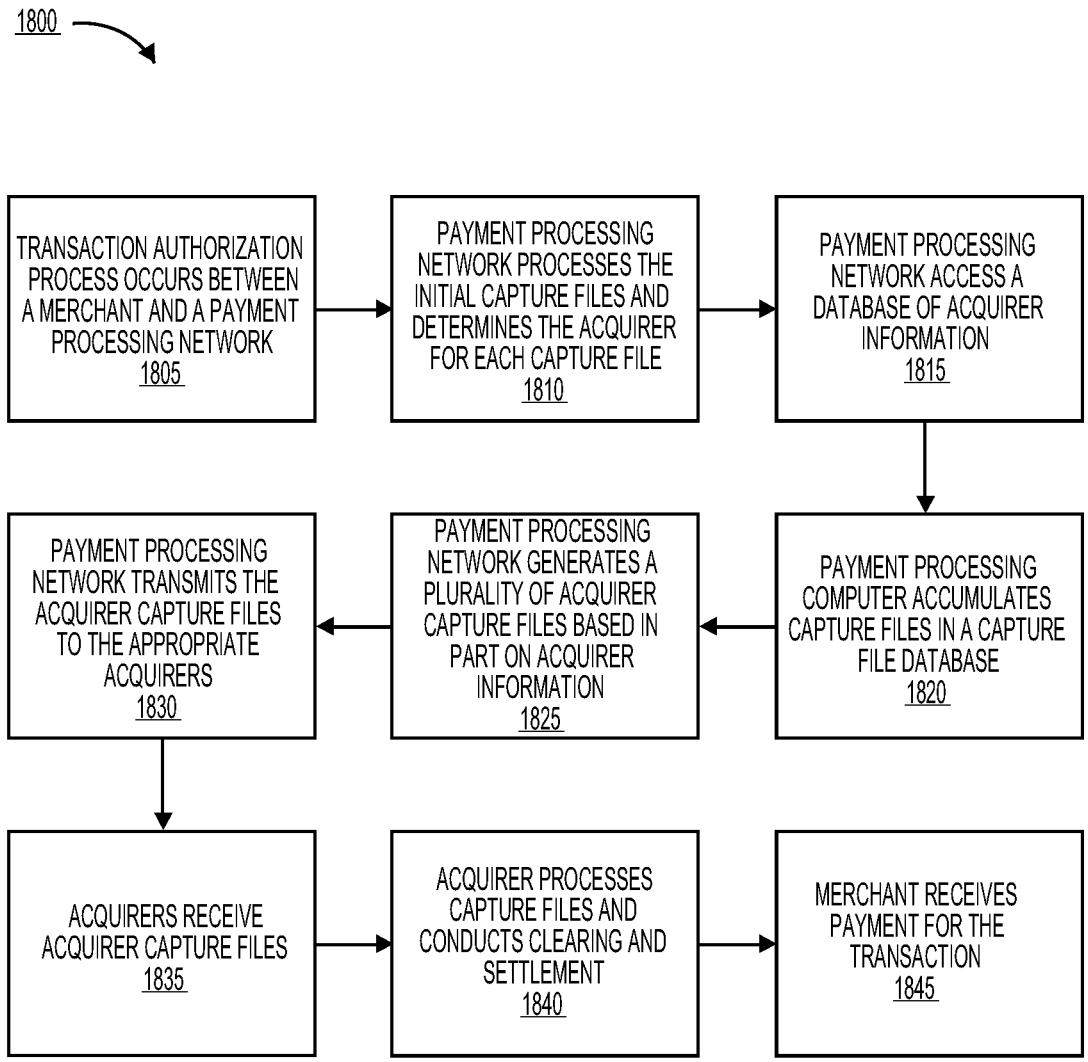
FIG. 18 illustrates a flowchart describing the operation of the system, according to an embodiment of the invention.

FIG. 10 and the flowchart in FIG. 18 illustrate some of the steps involved in the capture process according to an embodiment of the invention.

In step 1805, in a typical transaction, a consumer engages in a transaction with a merchant using a portable consumer device. A merchant access device 210 and 212, or an internet merchant computer 208 can transmits authorization request messages and non-payment transaction data to a payment processing network 112 to conduct authorization processing. The payment processing network 112 processes the messages and transmits the authorization request message to either an issuer computer 114 or a gateway computer 116 to one of a plurality of payment networks 142 and debit gateways 144. In embodiments of the invention, the payment processing network 112 captures the data contained in the authorization request message for clearing and settlement processing. The payment processing network 112 receives an authorization response, either approving or denying the transaction, and transmits this message back to the merchant access device 210 or 212, or the internet merchant computer 208.

In step 1810, the payment processing network 112 then processes the initial capture files and determines the acquirer computer 110(A-D) for each capture file. The capture files are generated from the authorization request messages that pass through the payment processing network 112.

In step 1815, the payment processing network 112 accesses a master log database 112(G), which is a database of acquirer information. The acquirer information can include rules and requirements for capture files. For example, the payment processing network 112 can support file customization by allowing pre-selection of data elements for each participating acquirer computer 110(A-D).

In step 1820, the payment processing network 112 stores capture files in a capture file database 112(I). In embodiments of the invention, the capture files in the database can be in an XML format. In other embodiments of the invention, the capture files in the database can be in an ISO format. In yet other embodiments, the capture files in the database can be in a text file format (e.g. a payment processing network-defined flat text file format). An example of a text file format is the TC33 format. In embodiments of the invention, the capture files in the database can be either initial capture files or formatted acquirer capture files.

In step 1825, based on rules and requirements established by acquirer computers 110(A-D) for the reception of capture files contained in the master log database 112(G), the payment processing network 112 generates a plurality of acquirer capture files for a plurality of different acquirer computers 110(A-D). In some embodiments of the invention, the acquirer capture files can be in a payment processing network-defined flat text file format (e.g. TC33, as described below). In other embodiments, the acquirer capture files can be in a plurality of data formats based on acquirer computer 110(A-D) specifications.

In step 1830, the payment processing network 112 then transmits the acquirer capture files to the appropriate acquirer computers 110(A-D). The acquirer capture files can be transmitted by the payment processing network 112 to the acquirer computers 110(A-D) multiple times a day or based on pre-determined criteria for delivery (e.g. end-of-day delivery, delivery based upon threshold volume being reached, etc.).

In step 1835, the appropriate acquirer computers 110(A-D) receive the acquirer capture files from the payment processing network 112.

In step 1840, the acquirer computers 110(A-D) process the capture files that is received and conducts clearing and settlement processing. In embodiments of the invention, this process involves sending the capture files to the payment networks 142 or debit gateways 144 associated with each of the acquirer computers 110(A-D). Clearing involves the process of collecting a transaction from an acquirer in the merchant's currency and delivering it to the issuer in the consumer's currency. Settlement involves the actual transfer of funds from the issuer computer to the acquirer computer through, for example, a wire transfer.

In step 1845, the merchant is then paid by the acquirer computer 110(A-D) following the clearing and settlement of each transaction.

In some embodiments of the invention, the plurality of initial capture files are generated by the merchant access device 210 or 212, or the internet merchant computer 208, prior to being transmitted to the payment processing network 112. In some embodiments of the invention, the initial capture files are generated in an XML format by the merchant access device 210 or 212, or the internet merchant computer 208.

C. Exemplary Message Flows

Figure 11:
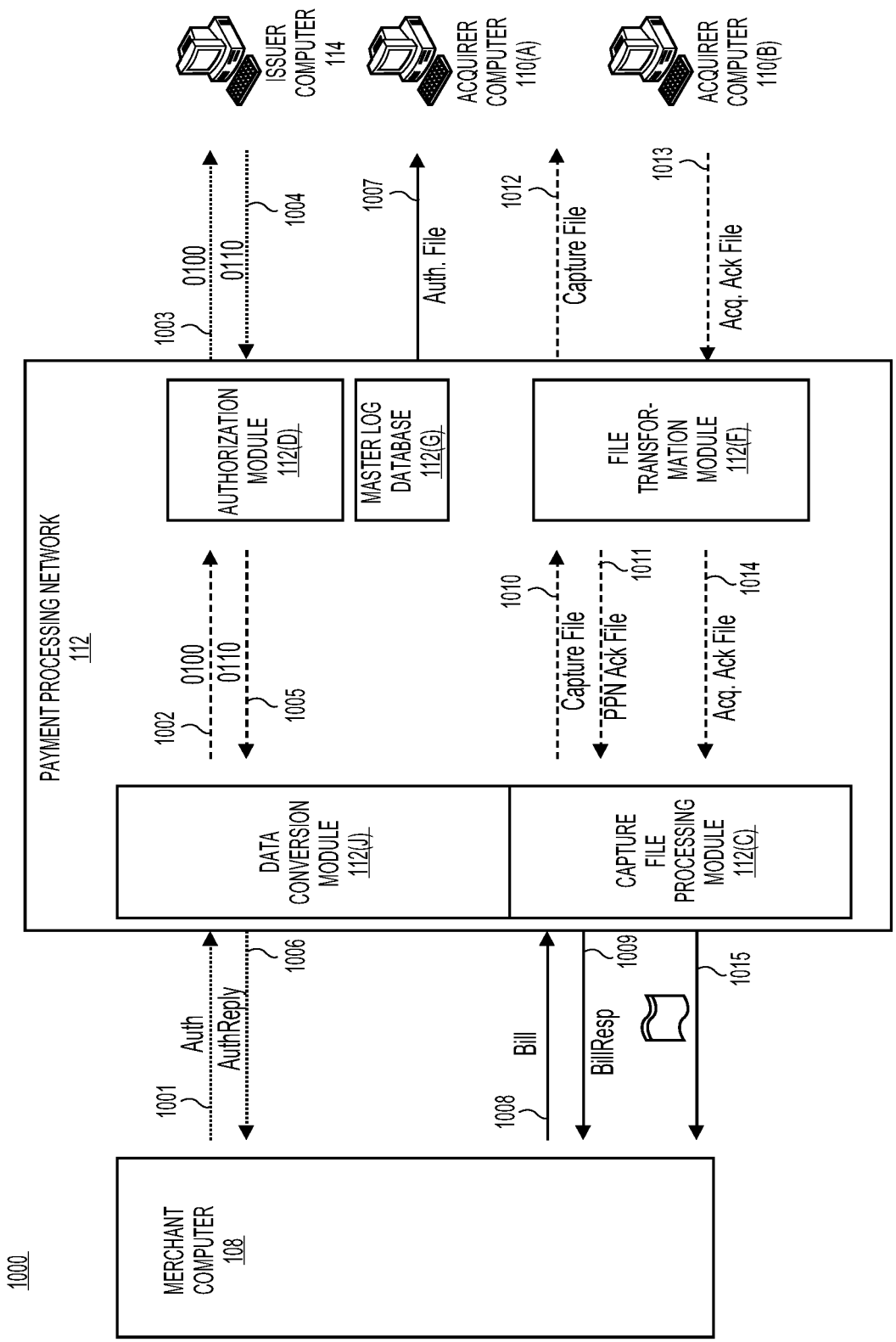
FIGS. 11-17 show example message flows in an authorization and capture process using a system according to an embodiment of the invention.

FIG. 11 depicts authorization processing and capture file processing according to an embodiment of the invention.

At step 1001, merchant computer 108 submits an authorization request message to the data conversion module 112(J) in the payment processing network 112. The merchant computer 108 may include a merchant access device or an Internet merchant computer. The data conversion module 112(J) converts the authorization request message from one format to another format. In embodiments of the invention, the authorization request message is transmitted by the merchant in XML and the data conversion module 112(J) converts the message into an ISO format (e.g. ISO 8583). At step 1002, the converted authorization request message is passed to the authorization module 112(D) in the payment processing network 112. The authorization module 112(D) determines the transaction destination. At step 1003, the authorization module 112(D) transmits the authorization request message to the appropriate destination. In embodiments of the invention, the authorization request message is transmitted to an issuer computer 114. In embodiments of the invention, the authorization request message can be transmitted through a gateway computer to one of a plurality of payment networks and debit gateways. At step 1004, the issuer computer 114 transmits an authorization response message to the payment processing network 112, either approving or denying the authorization request. At step 1005, the authorization module 112(D) matches the authorization response to the original authorization request and passes the authorization response message to the data conversion module 112(J). The data conversion module 112(J) converts the authorization response message. In embodiments of the invention, the authorization response message is transmitted to the data conversion module 112(J) in ISO format and the data conversion module 112(J) converts the message into an XML format. At step 1006, the data conversion module 112(J) transmits the XML-formatted authorization response message to the merchant computer 108. At step 1007, the acquirer computer 110(A) or 110(B) may optionally subscribe to and receive an authorization file. At step 1008, the merchant computer 108 submits a capture request (Bill) to the capture file processing module 112(C) in the payment processing network 112. The capture file processing module 112(C) accumulates capture files until a pre-determined batch cutoff is met. At step 1009, the capture file processing module 112(C) transmits a BillResp message acknowledging successful receipt of the Bill request. At step 1010, the capture file processing module 112(C) generates and submits a capture files to the file transformation module 112(F) in XML format. In some embodiments, at step 1011, if there are file integrity issues or a duplicate capture file the payment processing network 112 submits an acknowledgment file to the capture file processing module 112(C) rejecting the file. At step 1012, the file transformation module 112(F) transforms the XML capture file into an ISO format and transmits the capture file to the appropriate acquirer computer 110(A) or 110(B). In some embodiments, optional steps 1013 and 1014 are conducted. At step 1013, the acquirer computer 110(A) or 110(B) responds with an acquirer acknowledgement file. At step 1014, the file transformation module 112(F) transforms the file from an ISO format to an XML format. At step 1015, capture errors are transmitted to the merchant computer 108.

Figure 12:
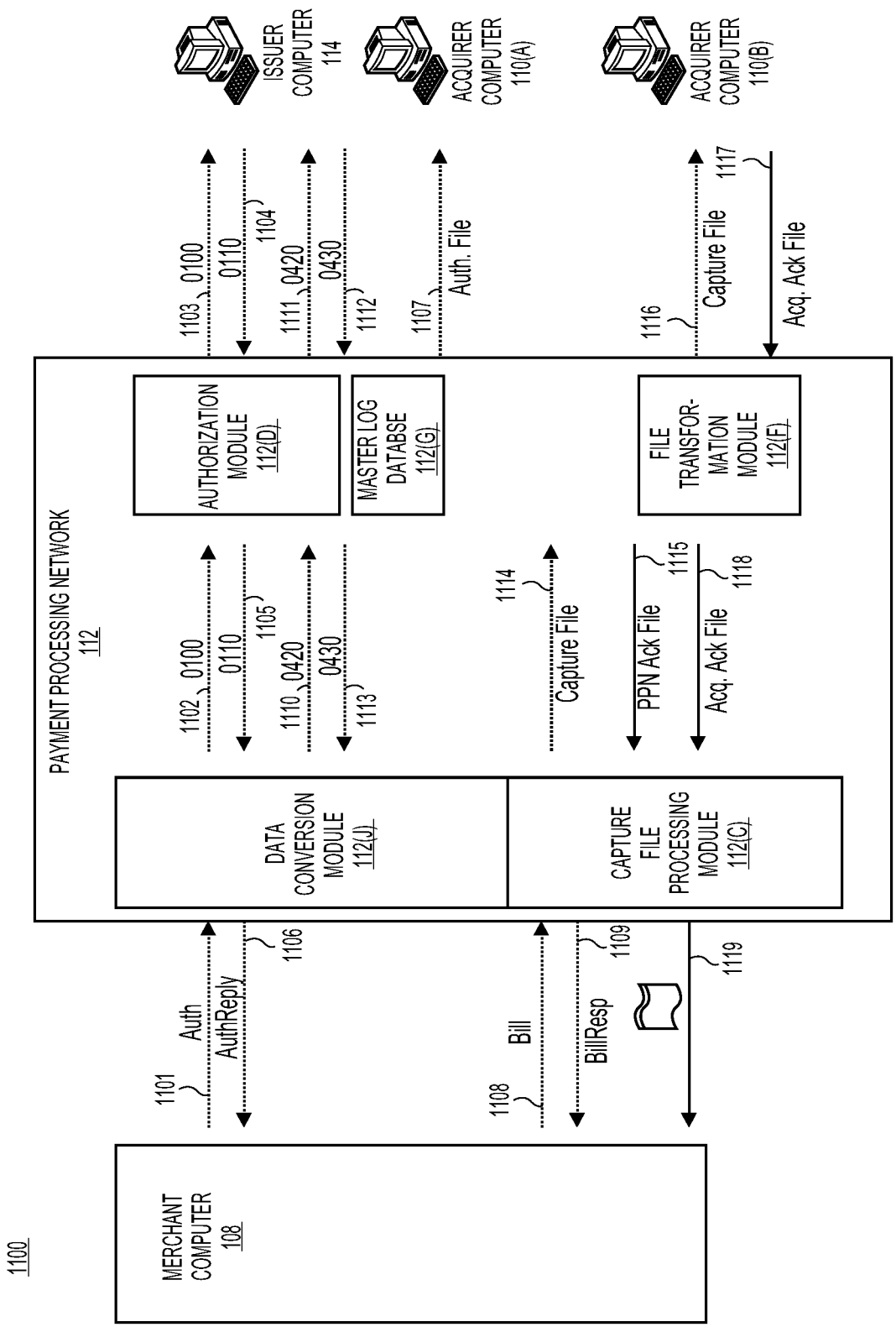

FIG. 12 depicts an exemplary flow of messages where there is an authorization followed by a partial reversal, according to an embodiment of the invention.

At step 1101, merchant computer 108 submits an authorization request message for $100 to the data conversion module 112(J) in the payment processing network 112. At step 1102, the converted authorization request message is passed to the authorization module 112(D) in the payment processing network 112. The authorization module 112(D) determines the transaction destination. At step 1103, the authorization module 112(D) transmits the authorization request message to the appropriate destination. In embodiments of the invention, the authorization request message is transmitted to an issuer computer 114. At step 1104, the issuer computer 114 transmits an authorization response message to the payment processing network 112, either approving or denying the authorization request. At step 1105, the authorization module 112(D) matches the authorization response to the original authorization request and passes the authorization response message to the data conversion module 112(J). The data conversion module 112(J) converts the authorization response message. In embodiments of the invention, the authorization response message is transmitted to the data conversion module 112(J) in ISO format and the data conversion module 112(J) converts the message into an XML format. At step 1106, the data conversion module 112(J) transmits the XML-formatted authorization response message to the merchant computer 108. At step 1107, the acquirer computer 110(A) or 110(B) may optionally subscribe to and receive an authorization file. At step 1108, the merchant computer 108 submits a capture request (Bill) to the capture file processing module 112(C) in the payment processing network 112 for $80. At step 1109, the capture file processing module 112(C) transmits a BillResp message acknowledging successful receipt of the Bill request. At step 1110, $20 partial reversal is submitted to the authorization module 112(D). At step 1111, the payment processing network 112 transmits the $20 partial reversal to the issuer computer 114. At step 1112, the issuer computer 114 transmits its response to the reversal. At step 1113, the reversal response is passed to the capture file processing module 112(C). At step 1114, the capture file processing module 112(C) generates and submits a capture file to the file transformation module 112(F) with a record for $80. In some embodiments, at step 1115, if there are file integrity issues or a duplicate capture file the payment processing network 112 submits an acknowledgment file to the capture file processing module 112(C) rejecting the file. At step 1116, the file transformation module 112(F) transforms the XML capture file into an acquirer target format and transmits the file to the acquirer computer 110(A) or 110(B). In some embodiments, optional steps 1117 and 1118 are conducted. At step 1117, the acquirer computer 110(A) or 110(B) submits an acknowledgement file to the payment processing network 112 identifying exception records. At step 1118, the acquirer acknowledgment file is passed to the data conversion module 112(J). Finally, at step 1119, the payment processing network 112 generates a merchant report qualifying transaction status.

Figure 13:
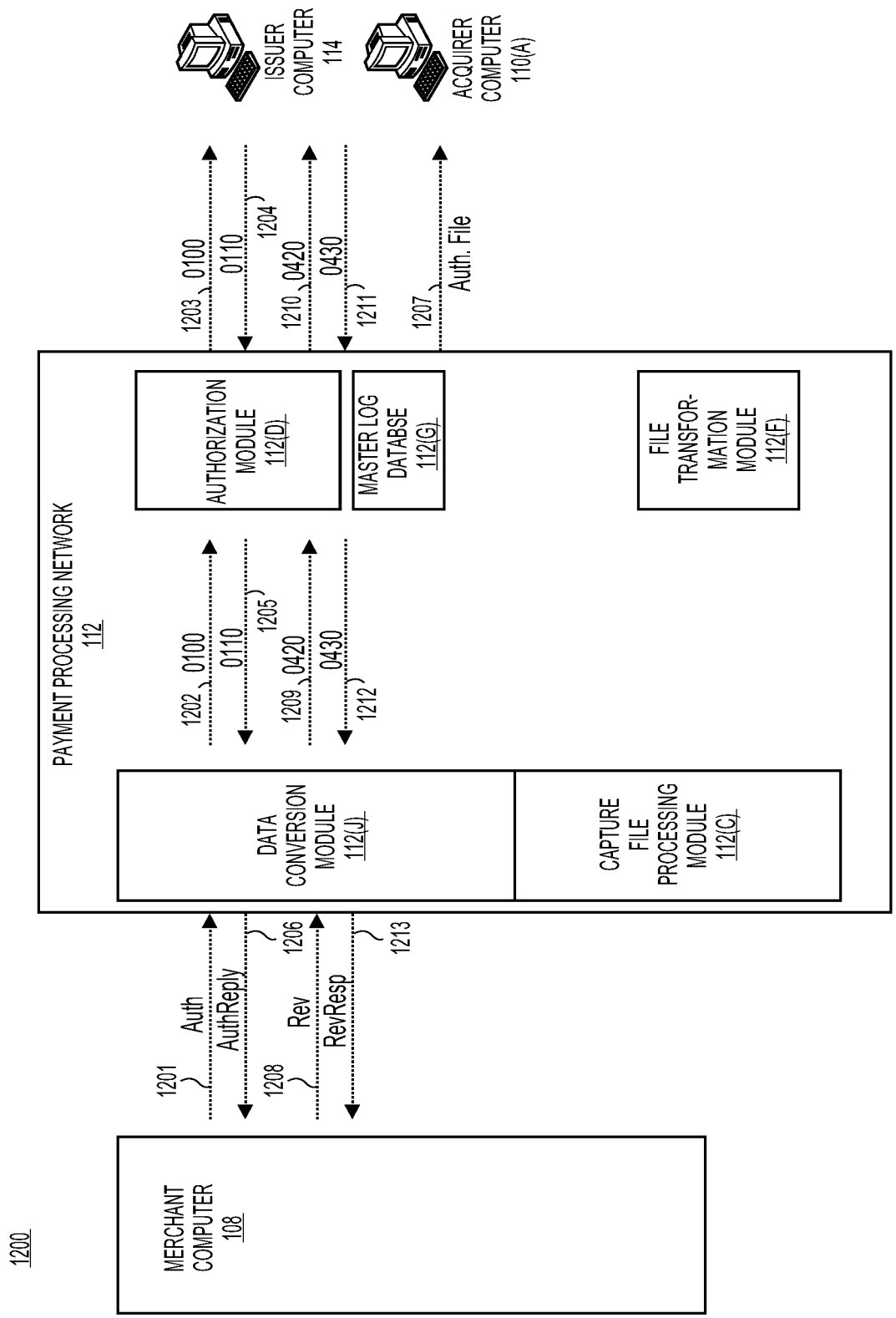

FIG. 13 depicts an exemplary flow of messages where there is an authorization followed by a full reversal prior to being captured, according to an embodiment of the invention.

At step 1201, merchant computer 108 submits an authorization request message for $100 to the data conversion module 112(J) in the payment processing network 112. At step 1202, the converted authorization request message is passed to the authorization module 112(D) in the payment processing network 112. The authorization module 112(D) determines the transaction destination. At step 1203, the authorization module 112(D) transmits the authorization request message to the appropriate destination. In embodiments of the invention, the authorization request message is transmitted to an issuer computer 114. At step 1204, the issuer computer 114 transmits an authorization response message to the payment processing network 112, either approving or denying the authorization request. At step 1205, the authorization module 112(D) matches the authorization response to the original authorization request and passes the authorization response message to the data conversion module 112(J). The data conversion module 112(J) converts the authorization response message. In embodiments of the invention, the authorization response message is transmitted to the data conversion module 112(J) in ISO format and the data conversion module 112(J) converts the message into an XML format. At step 1206, the data conversion module 112(J) transmits the XML-formatted authorization response message to the merchant computer 108. At step 1207, an acquirer computer 110(A) may optionally subscribe to and receive an authorization file. At step 1208, the merchant computer 108 submits a full reversal (Rev) to the capture file processing module 112(C) in the payment processing network 112 for $100. At step 1209, full reversal is submitted to the authorization module 112(D). At step 1210, the payment processing network 112 transmits the $20 partial reversal to the issuer computer 114. At step 1211, the issuer computer 114 transmits its response to the reversal request. At step 1212, the response is passed to the data conversion module 112(J). At step 1213, the response is passed to the merchant computer 108.

Figure 14:
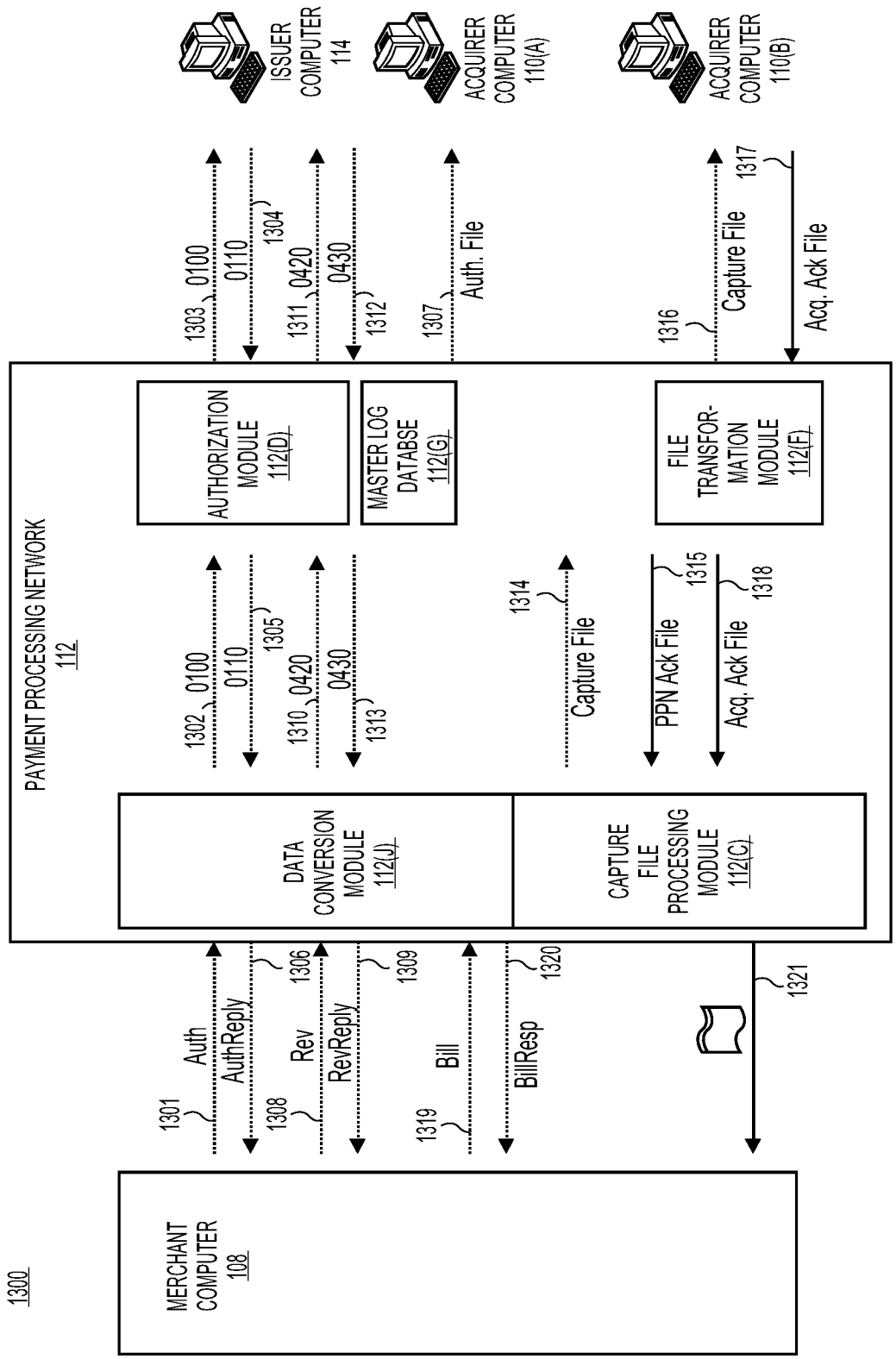

FIG. 14 depicts an exemplary flow of messages where there is an authorization followed by a full reversal prior to being captured and a capture is submitted after reversal, according to an embodiment of the invention.

At step 1301, merchant computer 108 submits an authorization request message for $100 to the data conversion module 112(J) in the payment processing network 112. At step 1302, the converted authorization request message is passed to the authorization module 112(D) in the payment processing network 112. The authorization module 112(D) determines the transaction destination. At step 1303, the authorization module 112(D) transmits the authorization request message to the appropriate destination. In embodiments of the invention, the authorization request message is transmitted to an issuer computer 114. At step 1304, the issuer computer 114 transmits an authorization response message to the payment processing network 112, either approving or denying the authorization request. At step 1305, the authorization module 112(D) matches the authorization response to the original authorization request and passes the authorization response message to the data conversion module 112(J). The data conversion module 112(J) converts the authorization response message. In embodiments of the invention, the authorization response message is transmitted to the data conversion module 112(J) in ISO format and the data conversion module 112(J) converts the message into an XML format. At step 1306, the data conversion module 112(J) transmits the XML-formatted authorization response message to the merchant computer 108. At step 1307, an acquirer computer 110(A) or 110(B) may optionally subscribe to and receive an authorization file. At step 1308, the merchant computer 108 submits a full reversal (Rev) to the capture file processing module 112(C) in the payment processing network 112 for $100. At step 1309, full reversal is submitted to the authorization module 112(D). At step 1310, the payment processing network 112 transmits the $20 partial reversal to the issuer computer 114. At step 1311, the issuer computer 114 transmits its response to the reversal. At step 1312, the response is passed to the data conversion module 112(J). At step 1313, the response is passed to the merchant computer 108. At step 1314, the capture file processing module 112(C) generates and submits a capture file to the file transformation module 112(F) without a record. In some embodiments, at step 1315, if there are file integrity issues or a duplicate capture file the payment processing network 112 submits an acknowledgment file to the capture file processing module 112(C) rejecting the file. At step 1316, the file transformation module 112(F) transforms the XML capture file into an acquirer target format and transmits the file to the acquirer computer 110(A) or 110(B). In some embodiments, optional steps 1317 and 1318 are conducted. At step 1317, the acquirer computer 110(A) or 110(B) submits an acknowledgement file to the payment processing network 112 identifying exception records. At step 1318, the acquirer acknowledgment file is passed to the data conversion module 112(J). At step 1319, the merchant computer 108 submits a capture request (Bill) to the capture file processing module 112(C) in the payment processing network 112. At step 1320, the Bill request is declined due to the previously submitted full reversal. Finally, at step 1321, the payment processing network 112 generates a merchant report qualifying transaction status.

Figure 15:
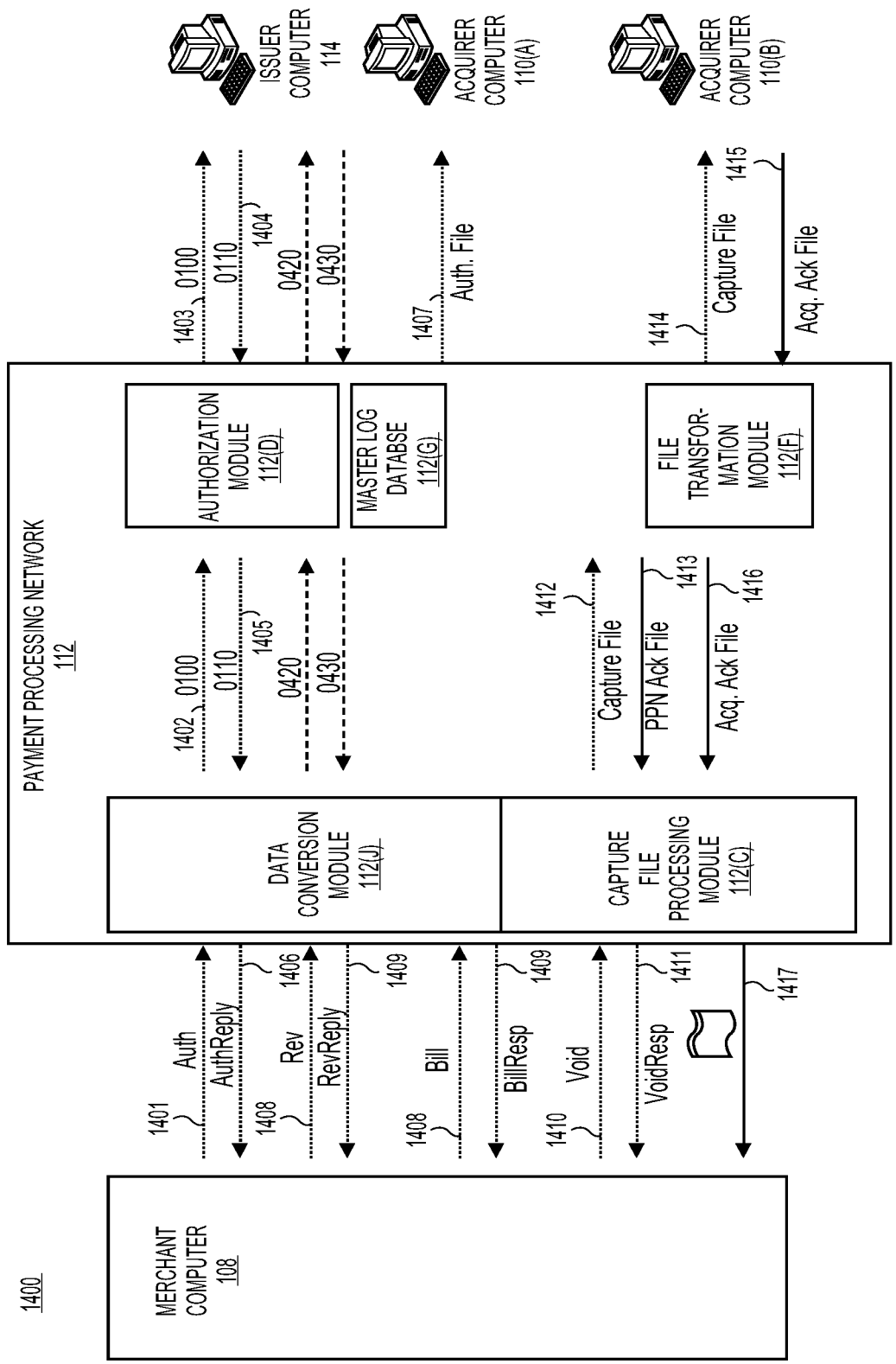

FIG. 15 depicts an exemplary flow of messages where the merchant requests to void a transaction, according to an embodiment of the invention.

At step 1401, merchant computer 108 submits an authorization request message for $100 to the data conversion module 112(J) in the payment processing network 112. At step 1402, the converted authorization request message is passed to the authorization module 112(D) in the payment processing network 112. The authorization module 112(D) determines the transaction destination. At step 1403, the authorization module 112(D) transmits the authorization request message to the appropriate destination. In embodiments of the invention, the authorization request message is transmitted to an issuer computer 114. At step 1404, the issuer computer 114 transmits an authorization response message to the payment processing network 112, either approving or denying the authorization request. At step 1405, the authorization module 112(D) matches the authorization response to the original authorization request and passes the authorization response message to the data conversion module 112(J). The data conversion module 112(J) converts the authorization response message. In embodiments of the invention, the authorization response message is transmitted to the data conversion module 112(J) in ISO format and the data conversion module 112(J) converts the message into an XML format. At step 1406, the data conversion module 112(J) transmits the XML-formatted authorization response message to the merchant computer 108. At step 1407, an acquirer computer 110(A) or 110(B) may optionally subscribe to and receive an authorization file. At step 1408, the merchant computer 108 submits a capture request (Bill) to the capture file processing module 112(C) in the payment processing network 112 for $100. At step 1409, the capture file processing module 112(C) transmits a BillResp message acknowledging successful receipt of the Bill request. At step 1410, merchant computer 108 submits a Void request to void the previous BillResp. At step 1411, the payment processing network 112 responds to merchant with VoidResp. At step 1412, the capture file processing module 112(C) generates and submits a capture file to the file transformation module 112(F). In some embodiments, at step 1413, if there are file integrity issues or a duplicate capture file the payment processing network 112 submits an acknowledgment file to the capture file processing module 112(C) rejecting the file. At step 1414, the file transformation module 112(F) transforms the XML capture file into an ISO format and transmits the capture file to the appropriate acquirer computer 110(A) or 110(B). In some embodiments, optional steps 1415 and 1416 are conducted. At step 1415, the acquirer computer 110(A) or 110(B) responds with an acquirer acknowledgement file. At step 1416, the file transformation module 112(F) transforms the file from an ISO format to an XML format. Finally, at step 1417, the payment processing network 112 generates a merchant report qualifying transaction status.

Figure 16:
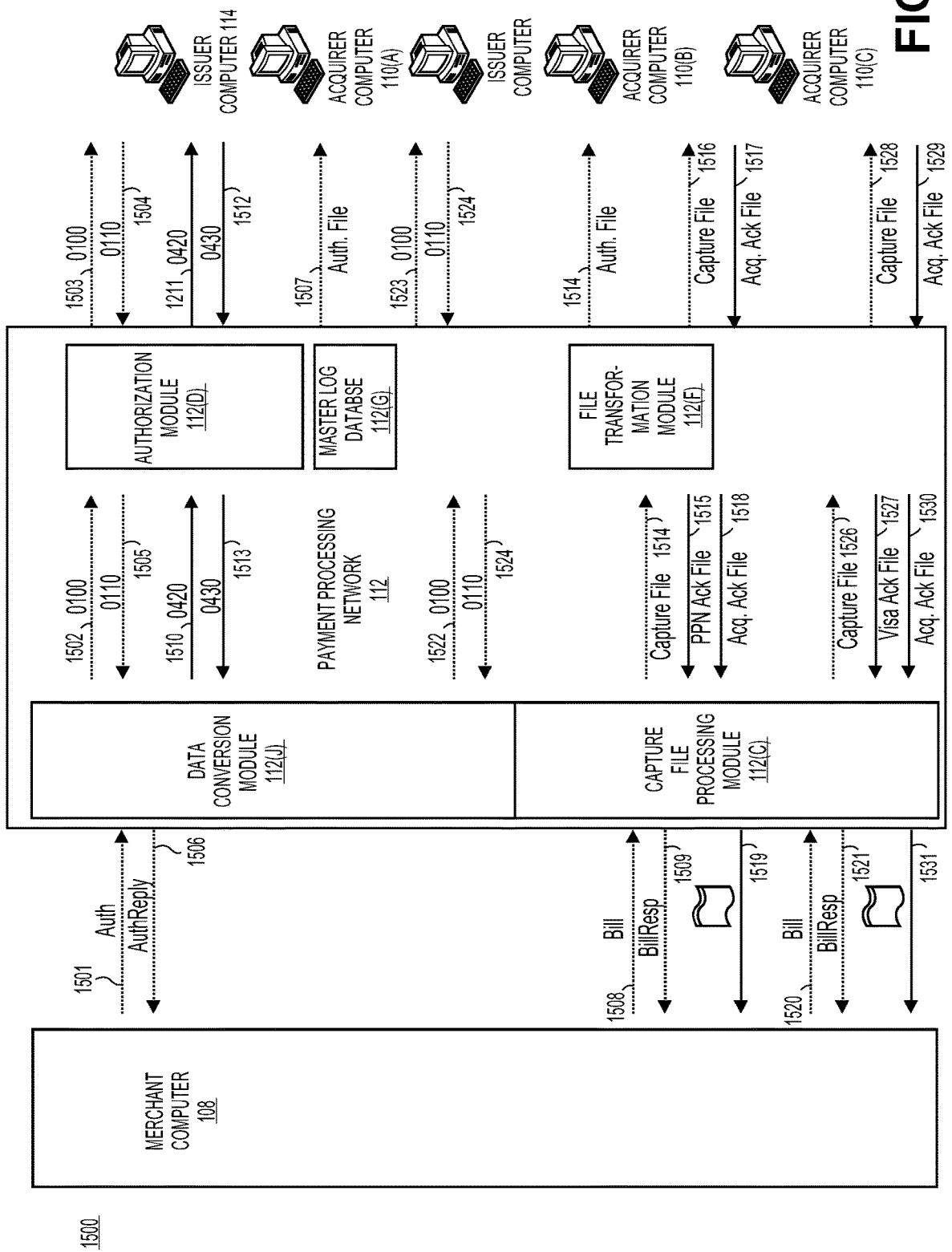

FIG. 16 depicts an exemplary flow of messages where the merchant ships two items separately resulting in the initial authorization being split into two captures.

At step 1501, merchant computer 108 submits an authorization request message for $100 to the data conversion module 112(J) in the payment processing network 112. At step 1502, the converted authorization request message is passed to the authorization module 112(D) in the payment processing network 112. The authorization module 112(D) determines the transaction destination. At step 1503, the authorization module 112(D) transmits the authorization request message to the appropriate destination. In embodiments of the invention, the authorization request message is transmitted to an issuer computer 114. At step 1504, the issuer computer 114 transmits an authorization response message to the payment processing network 112, either approving or denying the authorization request. At step 1505, the authorization module 112(D) matches the authorization response to the original authorization request and passes the authorization response message to the data conversion module 112(J). The data conversion module 112(J) converts the authorization response message. In embodiments of the invention, the authorization response message is transmitted to the data conversion module 112(J) in ISO format and the data conversion module 112(J) converts the message into an XML format. At step 1506, the data conversion module 112(J) transmits the XML-formatted authorization response message to the merchant computer 108. At step 1507, an acquirer computer 110(A) or 110(B) may optionally subscribe to and receive an authorization file. At step 1508, the merchant computer 108 submits a capture request (Bill) to the capture file processing module 112(C) in the payment processing network 112 for $60 as only the first of two items has shipped. At step 1509, the capture file processing module 112(C) transmits a BillResp message acknowledging successful receipt of the Bill request. At step 1510, $40 partial reversal is submitted to the authorization module 112(D). At step 1511, the payment processing network 112 transmits the $40 partial reversal to the issuer computer 114. At step 1512, the issuer computer 114 transmits its response to the reversal. At step 1513, the reversal response is passed to the capture file processing module 112(C). At step 1514, the capture file processing module 112(C) generates and submits a capture file to the file transformation module 112(F) with a record for $60. In some embodiments, at step 1515, if there are file integrity issues or a duplicate capture file the payment processing network 112 submits an acknowledgment file to the capture file processing module 112(C) rejecting the file. At step 1516, the file transformation module 112(F) transforms the XML capture file into an acquirer target format and transmits the file to the acquirer computer 110(A), 110(B), or 110(C). In some embodiments, optional steps 1517 and 1518 are conducted. At step 1517, the acquirer computer 110(A), 110(B), or 110(C) submits an acknowledgement file to the payment processing network 112 identifying exception records. At step 1518, the acquirer acknowledgment file is passed to the data conversion module 112(J). At step 1519, the payment processing network 112 generates a merchant report qualifying transaction status. At step 1520, the merchant computer 108 submits a capture request (Bill) to the capture file processing module 112(C) in the payment processing network 112 for $40 as the second items has shipped. At step 1521, the capture file processing module 112(C) transmits a BillResp message acknowledging successful receipt of the Bill request. At step 1522, a $40 authorization request is passed to the authorization module 112(D) in the payment processing network 112. At step 1523, the authorization module 112(D) transmits the authorization request message to the appropriate destination, such an issuer computer 114. At step 1524, the issuer computer 114 transmits an authorization response message to the payment processing network 112, either approving or denying the authorization request. At step 1525, the authorization module 112(D) matches the authorization response to the original authorization request and passes the authorization response message to the data conversion module 112(J). The data conversion module 112(J) converts the authorization response message into an XML format. At step 1526, the capture file processing module 112(C) generates and submits a capture file to the file transformation module 112(F) with a record for $40. In some embodiments, at step 1527, if there are file integrity issues or a duplicate capture file the payment processing network 112 submits an acknowledgment file to the capture file processing module 112(C) rejecting the file. At step 1528, the file transformation module 112(F) transforms the XML capture file into an acquirer target format and transmits the file to the acquirer computer 110(A), 110(B), or 110(C). In some embodiments, optional steps 1529 and 1530 are conducted. At step 1529, the acquirer computer 110(A), 110(B), or 110(C) submits an acknowledgement file to the payment processing network 112 identifying exception records. At step 1530, the acquirer acknowledgment file is passed to the data conversion module 112(J). Finally, at step 1531, the payment processing network 112 generates a merchant report qualifying transaction status.

Figure 17:
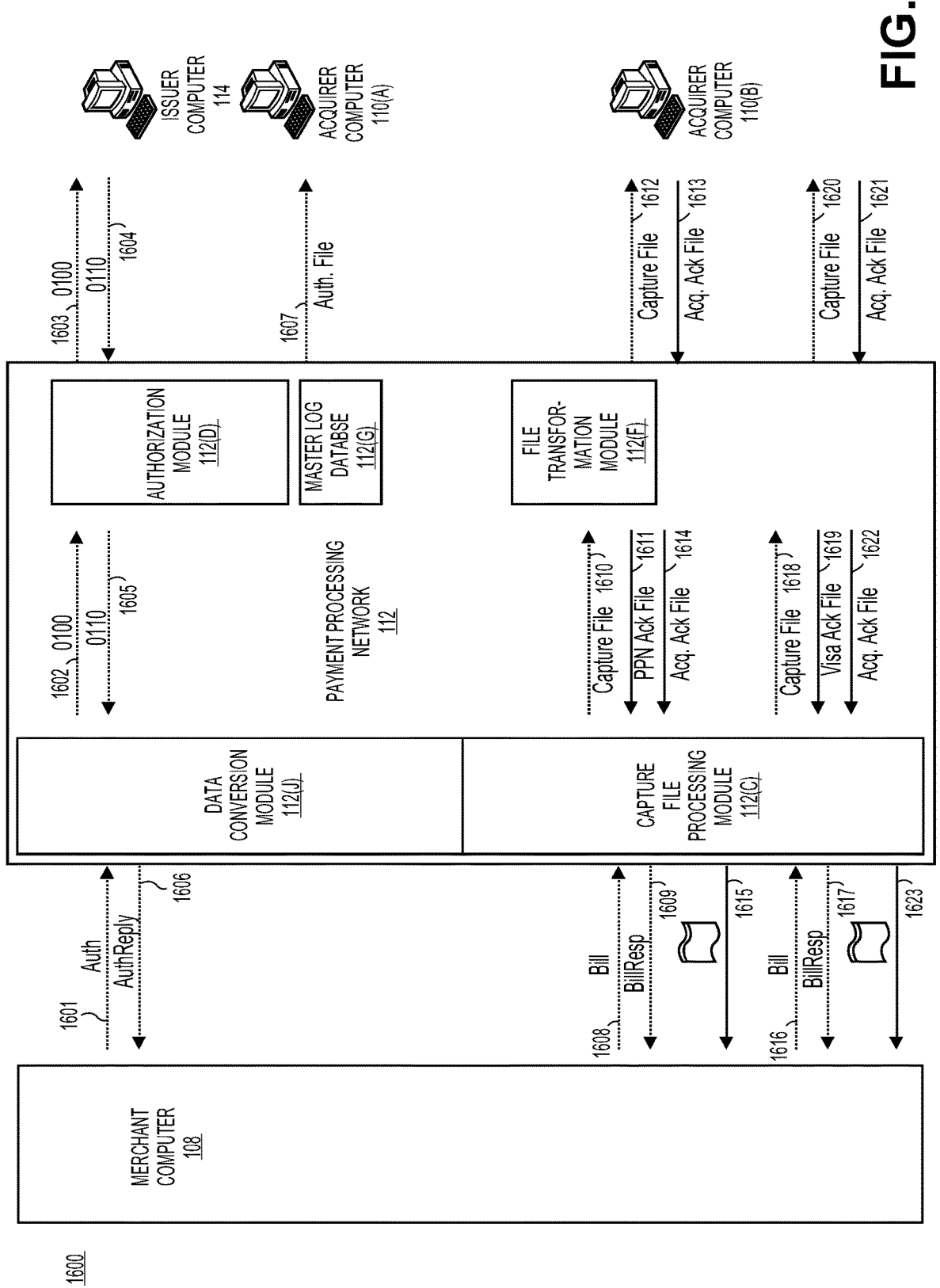

FIG. 17 depicts an exemplary flow of messages where the merchant ships two items separately resulting in the initial authorization being split into two captures.

At step 1601, merchant computer 108 submits an authorization request message for $100 to the data conversion module 112(J) in the payment processing network 112. At step 1602, the converted authorization request message is passed to the authorization module 112(D) in the payment processing network 112. The authorization module 112(D) determines the transaction destination. At step 1603, the authorization module 112(D) transmits the authorization request message to the appropriate destination. In embodiments of the invention, the authorization request message is transmitted to an issuer computer 114. At step 1604, the issuer computer 114 transmits an authorization response message to the payment processing network 112, either approving or denying the authorization request. At step 1605, the authorization module 112(D) matches the authorization response to the original authorization request and passes the authorization response message to the data conversion module 112(J). The data conversion module 112(J) converts the authorization response message. In embodiments of the invention, the authorization response message is transmitted to the data conversion module 112(J) in ISO format and the data conversion module 112(J) converts the message into an XML format. At step 1606, the data conversion module 112(J) transmits the XML-formatted authorization response message to the merchant computer 108. At step 1607, an acquirer computer 110(A) or 110(B) may optionally subscribe to and receive an authorization file. At step 1608, the merchant computer 108 submits a capture request (Bill) to the capture file processing module 112(C) in the payment processing network 112 for $100. At step 1609, the capture file processing module 112(C) transmits a BillResp message acknowledging successful receipt of the Bill request. At step 1610, the capture file processing module 112(C) generates and submits a capture file to the file transformation module 112(F) with a record for $100. In some embodiments, at step 1611, if there are file integrity issues or a duplicate capture file the payment processing network 112 submits an acknowledgment file to the capture file processing module 112(C) rejecting the file. At step 1612, the file transformation module 112(F) transforms the XML capture file into an acquirer target format and transmits the file to the acquirer computer 110(A) or 110(B). In some embodiments, optional steps 1613 and 1614 are conducted. At step 1613, the acquirer submits an acknowledgement file to the payment processing network 112 identifying exception records. At step 1614, the acquirer acknowledgment file is passed to the data conversion module 112(J). At step 1615, the payment processing network 112 generates a merchant report qualifying transaction status. At step 1616, the merchant computer 108 submits a $20 Credit request to the payment processing network 112. At step 1617, the capture file processing module 112(C) transmits a CreditResp message acknowledging successful receipt of the Credit request. At step 1618, the capture file processing module 112(C) generates and submits a capture file to the file transformation module 112(F) with a record for $100. In some embodiments, at step 1619, if there are file integrity issues or a duplicate capture file the payment processing network 112 submits an acknowledgment file to the capture file processing module 112(C) rejecting the file. At step 1620, the file transformation module 112(F) transforms the XML capture file into an acquirer target format and transmits the file to the acquirer computer 110(A) or 110(B). In some embodiments, optional steps 1621 and 1622 are conducted. At step 1621, the acquirer computer 110(A) or 110(B) submits an acknowledgement file to the payment processing network 112 identifying exception records. At step 1622, the acquirer acknowledgment file is passed to the data conversion module 112(J). Finally, at step 1623, the payment processing network 112 generates a merchant report qualifying transaction status.

D. Capture File Embodiments

As noted above, the payment processing network 112 transmits payment processing network capture files to participating acquirers. In some embodiments of the invention, the payment processing network optionally receives acknowledgement files from participating acquirers. In embodiments of the invention, the payment processing network capture files and acknowledgement files are formatted in a standard TC-33 record format. The files can be sequential, fixed block files. Each file contains one or more logical transaction, each of which is defined by a transaction code (TC) and comprised of one or more transaction component records (TCR). Each TCR can be of any suitable length including 168-bytes in length.

The following tables contain the TCR record layouts for TC 33 Capture Records as follows:
  TCR 0—Transaction Data
  TCR 1—Transaction Data, Additional Information
  TCR 2—Passenger Itinerary Data
  TCR A—Passenger Itinerary Data Continued
  TCR B—Passenger Itinerary Data Continued
  TCR 3—Installment Payment Data
  TCR 4—Gateway Data
  TCR 5—Payment Service Data
  TCR 6—Limited Use Data
  TCR 7—Shipping/Billing Data
  TCR 8—Shipping/Billing Data, Continued
  TCR 0—The following table shows the layout of the Capture TC 33, TCR 0 record.

| Field Position | Length | Contents | Comments |
|---|---|---|---|
| 1-2 | 2 | Transaction Code | This field contains a numeric value indicating the transaction code. For example, for TC33, the value is "33". |

| Position | Field Length | Contents | Comments |
|---|---|---|---|
| 3 | 1 | Transaction Code Qualifier | This field contains a numeric value indicating the transaction code qualifier. |
| 4 | 1 | Transaction Component Sequence Number | This field contains a numerical value indicating the type of data contained in the record. |
| 5-10 | 6 | Destination BIN | This field contains the value of the receiving acquirer BIN. |
| 11-16 | 6 | Source BIN | This field always contains the value 481222. |
| 17-20 | 4 | TC33 Application Code | This field contains the value CPTR. |
| 21-36 | 16 | Account Number | This field contains an issuer-assigned number that identifies a cardholder's account. The entry must be a 16-digit numeric value. |
| 37-39 | 3 | Account Number Extension | This field always contains a three-digit extension of the account number that allows account numbers up to 19 digits. |
| 40-45 | 6 | BIN | This field always contains acquirer BIN used in authorization. |
| 46-56 | 11 | Film Locator | This field always contains number used to identify film records of the transaction |
| 57-60 | 4 | Purchase Date | This field contains the date the purchase transaction was made (MMDD) based on Greenwich Mean Time (GMT) |
| 61-72 | 12 | Source Amount | This field contains the purchase value in transaction currency formatted based on currency exponent |
| 73-75 | 3 | Source Currency Code | This field contains the currency code used in the transaction (ISO currency code) |
| 76-100 | 25 | Merchant Name | This field contains the name of the merchant in the original transaction |
| 101-113 | 13 | Merchant City | This field contains the merchant city |
| 114-116 | 3 | Merchant Count | This field contains the code indicating the country where the transaction occurred |
| 117-120 | 4 | Merchant Category Code | This field indicates merchant's type of business product or service |
| 121-123 | 3 | Merchant State/ Province Code | If the Merchant Country Code is US or CA, this field must contain a valid U.S. State Code or Canadian Province Code, respectively |
| 124 | 1 | Authorization Characteristics Indicator | This field contains the code used by the acquirer to request CPS qualification. |
| 125-130 | 6 | Authorization Code | This field contains the code that an issuer, its authorizing processor, or Stand-In Processing (STIP) provides to indicate approval of a transaction |
| 131 | 1 | POS Terminal Capability | This field indicates the capability of the point-of-sale (POS) terminal |
| 132 | 1 | Cardholder ID Method | This field indicates method used to identify cardholder (e.g., signature, Personal Identification Number (PIN), etc.). |
| 133-134 | 2 | POS Entry Mode | This field indicates the method by which a point-of-transaction terminal obtains and transmits the cardholder information |
| 135-136 | 2 | Action Code | This field contains the code used to identify the type of record. Valid values: 01-Capture 02-Merchandise Credit 03-Reserved 04-Reserved For PPN (payment processing network) transactions, Capture and Merchandise Credit records will be transformed into TC 05 and TC 06 clearing records respectively. |
| 137-145 | 9 | Total Transaction Count | This field contains the Total Transaction Count for the entire capture file |
| 146-165 | 20 | Total Transaction Amount | This field contains the hash total of all transaction amounts within the file |
| 166-167 | 2 | Service Identifier | This field contains the code used to identify the type of service. (e.g. "01"-VPOS and "02"-Reserved) |

TCR 1—The following table shows the layout of the Capture TC 33, TCR 1 record.

| Position | Field Length | Contents | Comments |
|---|---|---|---|
| 1-2 | 2 | Transaction Code | This field contains a numeric value indicating the transaction code. For example, for TC33, the value is "33". |

-continued

| Position | Field Length | Contents | Comments |
|---|---|---|---|
| 3 | 1 | Transaction Code Qualifier | This field contains a numeric value indicating the transaction code qualifier. |
| 4 | 1 | Transaction Component Sequence Number | This field contains a numerical value indicating the type of data contained in the record. |
| 5-7 | 3 | Fee Program Indicator | This field contains an interchange reimbursement fee program indicator (FPI). |
| 8-22 | 15 | Card Acceptor ID | This field contains code that identifies the card acceptor operating the POS terminal. |
| 23-30 | 8 | Terminal ID | This field contains code that identifies the card acceptor terminal. |
| 31 | 1 | Mail/Phone/Electronic Commerce and Payment Indicator | This field indicates transaction performed by mail order, telephone, or electronic commerce. |
| 32 | 1 | Unattended Acceptance Terminal Indicator | This field indicates type of unattended terminal. |
| 33 | 1 | Service Development Field | This field indicates type of commerce. |
| 34 | 1 | AVS Response Code | This field contains the response to an Address Verification Service (AVS) request. |
| 35 | 1 | Authorization Source Code | This field indicates whether or not card present at authorization and type of commerce or service requested. |
| 36 | 1 | Purchase Identifier Format | This field indicates the format of additional identifying information for purchases, such as order number or invoice number, etc. |
| 37 | 1 | Account Selection | This field indicates type of account (savings, checking, etc.). |
| 38-62 | 25 | Purchase Identifier | This field identifies the purchase to the issuer and cardholder. |
| 63 | 1 | POS Environment | This field contains a recurring transaction indicator. |
| 64-65 | 2 | Card ID/Method of Payment | This field contains code indicating method of payment. For example, "VI"-Visa, "MC"-MasterCard, etc. |
| 66-71 | 6 | Processing Code | This field contains code used to identify the type of transaction. |
| 72-73 | 2 | Decimal Positions Indicator | This field indicates decimal positions of all amount fields |
| 74-77 | 4 | Capture Date Field | This field contains a Merchant Capture Date (MMDD). |
| 78-89 | 12 | Retrieval Reference Number | This field contains a number that is used to identify and track all messages related to a given cardholder transaction. |
| 90-93 | 4 | Expiration Date | This field contains the expiration date (YYMM). |
| 94-119 | 26 | PPN Request Record ID | This field contains a Unique Request Record ID assigned by the PPN for each transaction |
| 120-145 | 26 | Batch Request ID | This field contains a Batch Request ID |
| 146-149 | 4 | Capture File Number | This field contains a unique ID assigned to the capture file. |
| 150-157 | 8 | Capture Creation Date | This field indicates the capture file creation date (YYYYMMDD). |
| 158-161 | 4 | Authorization Date | This field indicates the authorization Date of the transaction (MMDD) |
| 162-163 | 2 | Point-of-Service Condition Code | This field contains the Point-of-Service Condition Code. |
| 164-167 | 4 | Network ID | This field contains a code that specifies the network used for transmission of the transaction. |

TCR 2—The following table shows the layout of the Capture TC 33, TCR 2 record.

| Position | Field Length | Contents | Comments |
|---|---|---|---|
| 1-2 | 2 | Transaction Code | This field contains a numeric value indicating the transaction code. For example, for TC33, the value is "33". |
| 3 | 1 | Transaction Code Qualifier | This field contains a numeric value indicating the transaction code qualifier. |
| 4 | 1 | Transaction Component Sequence Number | This field contains a numerical value indicating the type of data contained in the record. |
| 5-24 | 20 | Passenger Name | This field contains the name of passenger |
| 25-30 | 6 | Departure Date | This field contains the date of passenger's departure in the MMDDYY format (month, day, year). |
| 31-33 | 3 | Origination City/Airport Code | This field contains a code indicating the city and/or airport where the trip originates |
| 34-41 | 8 | Travel Agency Code | This field contains a code identifying travel agency if the ticket was issued by a travel agency |
| 42-66 | 25 | Travel Agency Name | This field contains the name of travel agency if the ticket was issued by a travel agency |

| Position | Field Length | Contents | Comments |
|---|---|---|---|
| 67 | 1 | Restricted Ticket Indicator | This field contains indicates whether this ticket is non-refundable |
| 68-71 | 4 | Computerized Reservation System | This field contains indicates the computerized reservation system used to make the reservation and purchase the ticket |
| 72-86 | 15 | Ticket Number | This field contains the ticket Number. |
| 87-106 | 20 | Total Clearing Amount | This field contains the total Clearing Amount. |
| 107-131 | 25 | Customer Code | This field contains the reference number or code that identifies the customer or consumer. |
| 132-133 | 2 | Multiple Clearing Sequence Number | This field contains a sequence number that distinguishes a specific clearing message among multiple clearing messages. |
| 134-135 | 2 | Multiple Clearing Sequence Count | This field contains a count of the multiple clearing sequence. |

TCR A—The following table shows the layout of the Capture TC 33, TCR A record.

| Position | Field Length | Contents | Comments |
|---|---|---|---|
| 1-2 | 2 | Transaction Code | This field contains a numeric value indicating the transaction code. For example, for TC33, the value is "33". |
| 3 | 1 | Transaction Code Qualifier | This field contains a numeric value indicating the transaction code qualifier. |
| 4 | 1 | Transaction Component Sequence Number | This field contains a numerical value indicating the type of data contained in the record. |
| 5-23 | 19 | Total Fare amount | This field contains the total Fare amount |
| 24-42 | 19 | Total Taxes amount | This field contains the total Taxes amount |
| 43-62 | 20 | Total Fee amount | This field contains the total Fee amount |

TCR B—The following table shows the layout of the Capture TC 33, TCR B record.

| Position | Field Length | Contents | Comments |
|---|---|---|---|
| 1-2 | 2 | Transaction Code | This field contains a numeric value indicating the transaction code. For example, for TC33, the value is "33". |
| 3 | 1 | Transaction Code Qualifier | This field contains a numeric value indicating the transaction code qualifier. |
| 4 | 1 | Transaction Component Sequence Number | This field contains a numerical value indicating the type of data contained in the record. |
| 5-11 | 7 | Trip Leg 1 Information | This field contains a description of the first leg of trip |
| 5-6 | 2 | Carrier Code | This field contains indicates carrier code |
| 7 | 1 | Service Class | This field contains indicates service class (first class, business class, etc.) |
| 8 | 1 | Stop-over Code | This field contains indicates whether a stopover is allowed on this ticket |
| 9-11 | 3 | Destination City/Airport | This field contains indicates destination city's airport code |
| 12-17 | 6 | Fare Basis Code_Leg 1 | This field contains fare basis code used for Leg 1 of the trip |
| 18-22 | 5 | Flight Number_Leg 1 | This field contains number of the airline flight to be taken on Leg 1 of the trip |
| 23-28 | 6 | Departure Date_Leg 1 | This field contains date of passenger's departure (MMDDYY) on Leg 1 of the trip |
| 29-32 | 4 | Departure Time_Leg 1 | This field contains time of passenger's departure on Leg 1 of the trip (HHMM). |
| 33 | 1 | Departure Time Segment_leg 1 | This field contains time of passenger's departure on Segment Leg 1 of the trip |
| 34-37 | 4 | Arrival Time_leg 1 | This field contains time of passenger's arrival on Leg 1 of the trip (HHMM) |
| 38 | 1 | Arrival Time Segment leg_1 | This field contains time of passenger's arrival on Segment Leg 1 of the trip |
| 39-58 | 20 | Endorsement/Restrictions_leg 1 | This field contains indicates endorsement/restrictions for the first leg of trip. |
| 59-83 | 25 | Conjunction Ticket_leg 1 | This field contains conjunction ticket information for the first leg of trip. |
| 84-108 | 25 | Exchange Ticket_leg 1 | This field contains exchange ticket information for the first leg of trip |
| 109 | 1 | Coupon Number_leg 1 | This field contains coupon number for the first leg of trip |

TCR 3—The following table shows the layout of the Capture TC 33, TCR 3 record.

| Position | Field Length | Contents | Comments |
|---|---|---|---|
| 1-2 | 2 | Transaction Code | This field contains a numeric value indicating the transaction code. For example, for TC33, the value is "33". |
| 3 | 1 | Transaction Code Qualifier | This field contains a numeric value indicating the transaction code qualifier. |
| 4 | 1 | Transaction Component Sequence Number | This field contains a numerical value indicating the type of data contained in the record. |
| 5-16 | 12 | Installment Payment Total Amount | This field contains indicates the total amount of the installment payments formatted based on currency exponent |
| 17-19 | 3 | Installment Payment Currency Code | Indicates an installment payment currency code (ISO numeric value) |
| 20-22 | 3 | Number of Installments | This field contains indicates the number of installment payments |
| 23-34 | 12 | Amount of Each Installment | This field contains indicates the amount of each installment payment formatted based on currency exponent |
| 35-37 | 3 | Installment Payment Number | This field contains indicates the current number of payment |
| 38 | 1 | Frequency of Installments | This field contains indicates the frequency of installment payments |

TCR 4—The following table shows the layout of the Capture TC 33, TCR 4 record.

| Position | Field Length | Contents | Comments |
|---|---|---|---|
| 1-2 | 2 | Transaction Code | This field contains a numeric value indicating the transaction code. For example, for TC33, the value is "33". |
| 3 | 1 | Transaction Code Qualifier | This field contains a numeric value indicating the transaction code qualifier. |
| 4 | 1 | Transaction Component Sequence Number | This field contains a numerical value indicating the type of data contained in the record. |
| 5-8 | 4 | MasterCard Merchant SIC Code | This field contains the Merchant SIC Code as assigned by the acquirer |
| 9-11 | 3 | MasterCard POS Entry Mode | This field contains a POS Entry Mode value as submitted by MasterCard network |
| 12-13 | 2 | MasterCard POS PIN Capture Code | This field contains a POS PIN Capture Code value as submitted by MasterCard network |
| 14-39 | 26 | MasterCard/American Express POS Data | This field contains a POS Data value as submitted by MasterCard/American Express network |
| 40-49 | 10 | MasterCard Date and Time | This field contains a Date and Time value as mapped from a MasterCard response (MMDDHHMMSS) |
| 50-55 | 6 | MasterCard ICA | This field contains the MasterCard ICA field as provided by the acquirer |
| 56-84 | 29 | Diners Club/Discover Network Information | This field contains Diners Club's/Discover clearing reference information |
| 85-130 | 46 | Diners Club/Discover Transaction Qualifier | This field contains Diners Club's/Discover Transaction Qualifier information Note: Space filled for credits |
| 131-145 | 15 | Gateway Transaction Identifier | This field contains a transaction Identifier assigned by Gateway Network |
| 146-149 | 4 | MasterCard Merchant Advice Code | This field contains a Merchant Advice Code received from MasterCard |
| 150 | 1 | MasterCard UCAF Collection Indicator | This field indicates that MasterCard Universal Cardholder Authentication Field (UCAF) data is included in the message |

TCR 5—The following table shows the layout of the Capture TC 33, TCR 5 record.

| Position | Field Length | Contents | Comments |
|---|---|---|---|
| 1-2 | 2 | Transaction Code | This field contains a numeric value indicating the transaction code. For example, for TC33, the value is "33". |
| 3 | 1 | Transaction Code Qualifier | This field contains a numeric value indicating the transaction code qualifier. |
| 4 | 1 | Transaction Component Sequence Number | This field contains a numerica lvalue indicating the type of data contained in the record. |
| 5-19 | 15 | Transaction Identifier | This field contains a unique value that the PPN assigns to each transaction and returns to the acquirer in the authorization response |
| 20-31 | 12 | Authorized Amount | This field contains an amount the issuer originally authorized (Formatted based on currency exponent) |

-continued

| Position | Field Length | Contents | Comments |
|---|---|---|---|
| 32-34 | 3 | Authorization Currency Code | This field contains a currency code (ISO numeric code) of the authorized source amount |
| 35-36 | 2 | Authorization Response Code | This field contains the authorization code provided by the issuer |
| 37-40 | 4 | Validation Code | This field contains a unique value that the PPN includes in each authorization response |
| 41 | 1 | Market-Specific Authorization Data Indicator | This field contains a code indicating the industry for which market-specific authorization data was included in the transaction |
| 42-53 | 12 | Total Authorized Amount | This field contains the total amount of the transaction including taxes and miscellaneous fees less reversals |
| 54-67 | 14 | Merchant Telephone Number | This field contains the merchant or customer service telephone number |
| 68-69 | 2 | Electronic Commerce Goods Indicator | This field indicates the type of goods that were purchased on the Internet |
| 70-79 | 10 | Merchant Verification Value | This field contains a Merchant Verification Value |
| 80-81 | 2 | Product ID | This field contains a product identifier code |
| 82-87 | 6 | Program ID | This field contains a program identifier |
| 88 | 1 | CVV2 Result Code | This field contains the Card Verification Value 2 (CVV2) verification result |

TCR 6—The following table shows the layout of the Capture TC 33, TCR 6 record.

| Position | Field Length | Contents | Comments |
|---|---|---|---|
| 1-2 | 2 | Transaction Code | This field contains a numeric value indicating the transaction code. For example, for TC33, the value is "33". |
| 3 | 1 | Transaction Code Qualifier | This field contains a numeric value indicating the transaction code qualifier. |
| 4 | 1 | Transaction Component Sequence Number | This field contains a numerical value indicating the type of data contained in the record. |
| 5-16 | 12 | Local Tax | This field indicates the amount of state or provincial tax included in the transaction amount (Formatted based on currency exponent) |

-continued

| Position | Field Length | Contents | Comments |
|---|---|---|---|
| 17 | 1 | Local Tax Included | This field indicates if local tax is included or not |
| 18-29 | 12 | National Tax | This field indicates the amount of National Tax included in the transaction amount (Formatted based on currency exponent) |
| 30 | 1 | National Tax Included | This field indicates if national tax is included or not |
| 31-34 | 4 | Time of Purchase | This field indicates time the purchase was made (HHMM) based on Greenwich Mean Time GMT |
| 35-51 | 17 | Customer Code/ Customer Reference Identifier CRI | This field contains a reference number or code that identifies the customer or consumer |
| 52-65 | 14 | Merchant Postal Code | This field contains the postal code to identify the merchant location of commercial card Transactions |
| 66-78 | 13 | Merchant URL/ email | This field contains a merchant URL/email |
| 79-138 | 60 | Merchant Street Address | This field contains a merchant Street Address |
| 139-150 | 12 | Tip Amount | This field contains amount of tip |

TCR 7—The following table shows the layout of the Capture TC 33, TCR 7 record.

| Position | Field Length | Contents | Comments |
|---|---|---|---|
| 1-2 | 2 | Transaction Code | This field contains a numeric value indicating the transaction code. For example, for TC33, the value is "33". |
| 3 | 1 | Transaction Code Qualifier | This field contains a numeric value indicating the transaction code qualifier. |
| 4 | 1 | Transaction Component Sequence Number | This field contains a numerical value indicating the type of data contained in the record. |
| 5-24 | 20 | Ship to Postal Code | This field contains a postal code of the location being shipped to |
| 25-84 | 60 | Bill to Last Name | This field contains the Bill to Last Name |
| 85-144 | 60 | Bill to First Name | This field contains the Bill to First Name |
| 145-155 | 11 | Bill to Postal Code | This field contains the Bill to Postal Code |

TCR 8—The following table shows the layout of the Capture TC 33, TCR 8 record.

| Position | Field Length | Contents | Comments |
|---|---|---|---|
| 1-2 | 2 | Transaction Code | This field contains a numeri cvalue indicating the transaction code. For example, for TC33, the value is "33". |

-continued

| Position | Field Length | Contents | Comments |
|---|---|---|---|
| 3 | 1 | Transaction Code Qualifier | This field contains a numeric value indicating the transaction code qualifier. |
| 4 | 1 | Transaction Component Sequence Number | This field contains a numerical value indicating the type of data contained in the record. |
| 5-7 | 3 | Ship to Count Code | This field contains Ship to Country Code |
| 8-47 | 40 | Address Line 1 | This field contains Address Line 1 |
| 48-87 | 40 | Address Line 2 | This field contains Address Line 2 |
| 88-137 | 50 | Bill to City | This field contains the Bill to City |
| 138-157 | 20 | Bill to State | This field contains the Bill to State |
| 158-160 | 3 | Bill to Country Code | This field contains the Bill to Count Code |

Acknowledgment TC 33 Record Formats

The following tables contain the TCR record layouts for TC 33 Acknowledgement Records as follows:

TCR 0—Acknowledgement Record Data

TCR 1—Acknowledgement Record Data, Additional Information

TCR 0—The following table shows the layout of the Acknowledgment TC 33, TCR 0 record.

| Position | Field Length | Contents | Comments |
|---|---|---|---|
| 1-2 | 2 | Transaction Code | This field contains a numeric value indicating the transaction code. For example, for TC33, the value is "33". |
| 3 | 1 | Transaction Code Qualifier | This field contains a numeric value indicating the transaction code qualifier. |
| 4 | 1 | Transaction Component Sequence Number | This field contains a numerical value indicating the type of data contained in the record. |
| 5-10 | 6 | Destination BIN | 468599 |
| 11-16 | 6 | Source BIN | This field contains a submitting acquirer BIN |
| 17-23 | 7 | Report Identifier | This field identifies the report (e.g. VISAACK) |
| 24-32 | 9 | Number of error transactions | This field contains number of error transactions in the file |
| 33-44 | 12 | Total Error Transactions Amount | This field contains the hash total of error transaction amounts within the file |
| 45-52 | 8 | Capture Creation Date | This field contains the date the capture file was created. Note: This is the same value as in Capture File TCR 1 record |
| 53-56 | 4 | Capture File Number | This field contains the file number assigned by the PPN. Used to reconcile the Capture file. Note: This is the same value as in Capture File TCR 1 record |
| 57-60 | 4 | File status response code | This field indicates a file status response code |
| 61-64 | 4 | Record status response code | This field indicates a record status response code |
| 65-90 | 26 | PPN Request Record ID | This field indicates a PPN Request Record ID for a record in error |
| 91-98 | 8 | Terminal ID | This field indicates a Terminal ID for the transaction with a record level error |
| 99-113 | 15 | Card Acceptor ID | This field indicates a Card Acceptor ID for the transaction with a record level error |
| 114-138 | 25 | Purchase Identifier | This field indicates a Purchase Identifier for the transaction with a record level error |
| 139-153 | 15 | Transaction ID | This field indicates a Transaction ID for the transaction with a record level error |

TCR 1—The following table shows the layout of the Acknowledgment TC 33, TCR 1 record.

| Position | Field Length | Contents | Comments |
|---|---|---|---|
| 1-2 | 2 | Transaction Code | This field contains a numeric value indicating the transaction code. For example, for TC33, the value is "33". |
| 3 | 1 | Transaction Code Qualifier | This field contains a numeric value indicating the transaction code qualifier. |
| 4 | 1 | Transaction Component Sequence Number | This field contains a numerical value indicating the type of data contained in the record. |
| 25-30 | 26 | Acquirer Transaction ID or Transaction ID | This field contains an acquirer-assigned unique tracking value or Transaction ID |
| 31-130 | 100 | Miscellaneous message | This field contains a miscellaneous message. For example: "Cannot process message due to bad merchant address and missing BIN" |

E. Technical Benefits

Embodiments of the invention provide the technical benefits of efficiency and conserving resources. As merchant systems are connected directly to a payment processing network, which facilitates communications in the capture file and clearing and settlement process between the merchant and a plurality of acquirers, merchants do not have to establish multiple connections to multiple acquirer computers. This creates greater efficiency as the payment processing network can conduct file translation to a plurality of destinations, where in the past, the merchant systems would have to be able to do so. Further, as data conversion can be conducted by the payment processing network on behalf of the merchant, the merchant requires less data storage for acquirer rules and requirement for data files and saves resources by not having to do file conversions to meet different requirements.

F. Additional Embodiments

In other embodiments, an electronic wallet may be used to conduct a transaction. An electronic wallet may be used in a variety of transactions, including but not limited to eCommerce, social networks, money transfer/personal payments, mobile commerce, proximity payments, gaming, and/or the like. For example, users may engage in eCommerce via the electronic wallet for retail purchases, digital goods purchases, and utility payments. Users may also, for example, use the electronic wallet to purchase games or gaming credits from gaming websites, and transfer funds to friends via social networks. Further, for example, users may also use the electronic wallet on a smart phone for retail purchases, buying digital goods, NFC/RF payments at point of sale (POS) terminals.

In an exemplary transaction involving an electronic wallet, a consumer may submit an indication to purchase or transfer funds. For example, the consumer may visit a merchant website (e.g., Facebook.com, Amazon.com, etc.), and request to purchase an item from the website, transfer funds to a friend, and/or the like. The merchant website may determine whether the electronic wallet is authorized on its website, and may provide a list of payment options. If the merchant is registered with a electronic wallet server, the electronic wallet server may authorize the merchant to collect consumer credentials for login to the electronic wallet, and the merchant website may prompt the consumer to login to the electronic wallet. Otherwise, the merchant website may request the consumer to provide payment details for alternative payment options (e.g., credit card, debit card, PayPal account).

The consumer may authorize submission of their wallet consumer credentials, such as, but not limited to a Wallet/User ID, a password, and/or the like. For example, the consumer may enter the Wallet/User ID and password into a pop-up window provided from the merchant website and/or electronic wallet server. In another example, the consumer may authorize the merchant website to provide the consumer credentials (e.g., previously stored in HTML5, cookies, etc.), to the electronic wallet server. In yet another example, the consumer may authorize the electronic wallet server, via a remote component running on the merchant website (e.g., a Java applet, etc.) to provide consumer credentials to the electronic wallet server for verification.

When the consumer submits consumer credentials to log into the electronic wallet, the merchant website may forward the consumer credentials and transaction details to the electronic wallet server, which may determine the validity of the consumer credentials. If the consumer's credentials are not valid, the electronic wallet server may deny the payment request and send a notification of denial to the merchant website. In other embodiments, if the consumer provided credentials are valid, the electronic wallet server may process payment from the electronic wallet. For example, the electronic wallet server communicates with the consumer's bank account associated with the electronic wallet and requests a fund transfer of an indicated amount. The electronic wallet server may then store a transaction record.

In some embodiments, after processing the payment, the electronic wallet server sends a payment confirmation notice to the merchant website, which in turn completes the order and stores the transaction record in the database. The merchant website may provide a confirmation page comprising transaction confirmation to the consumer.

Other embodiments of the invention include a method comprising, generating, at a merchant computer, an authorization request message and a non-payment transaction data message, and transmitting, by the merchant computer, the authorization request message and non-payment transaction data message.

Other embodiments of the invention further include a computer comprising: a processor and a non-transitory computer-readable storage medium, comprising code executable by the processor for implementing a method comprising: generating an authorization request message and a non-payment transaction data message, and transmitting the authorization request message and non-payment transaction data message.

Other embodiments of the invention include a method comprising: sending a communication comprising non-payment transaction data to a server computer, wherein non-payment transaction data is sent through a communication channel that is present between a merchant computer and the server computer, wherein the communication channel does not pass through an acquirer, and wherein the server computer performs further processing.

Figure 19:
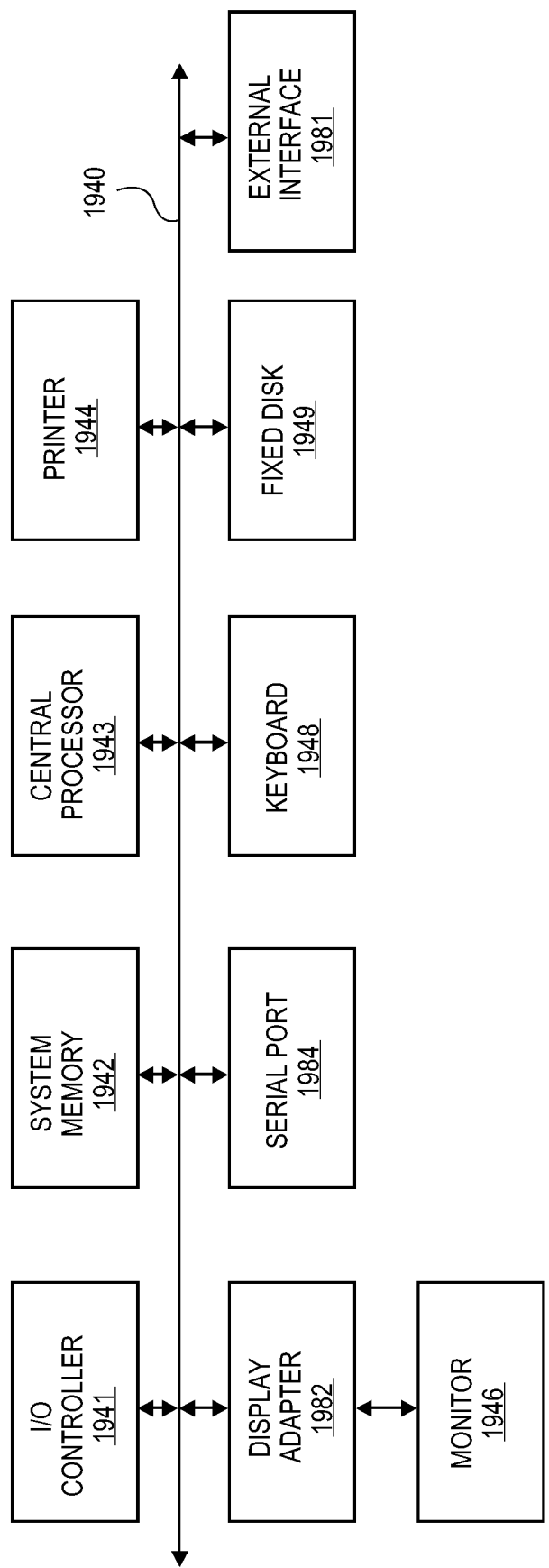
FIG. 19 shows a block diagram of an exemplary computer apparatus that may be used in accordance with embodiments of the invention.

The various participants and elements of the embodiments may operate one or more computer apparatuses to facilitate the functions described herein. Any of the elements in FIGS. 1-8 and 9-17 may use any suitable number of subsystems to facilitate the functions described herein. Examples of such subsystems or components are shown in FIG. 19. The subsystems shown in FIG. 19 are interconnected via a system bus 1940. Additional subsystems such as a printer 1944, keyboard 1948, fixed disk 1949 (or other memory comprising computer readable media), monitor 1946, which is coupled to display adapter 1982, and others are shown. Peripherals and input/output (I/O) devices, which couple to I/O controller 1941, can be connected to the computer system by any number of means known in the art, such as serial port 1984. For example, serial port 1984 or external interface 1981 can be used to connect the computer apparatus to a wide area network such as the Internet, a mouse input device, or a scanner. The interconnection via system bus allows the central processor 1943 to communicate with each subsystem and to control the execution of instructions from system memory 1942 or the fixed disk 1949, as well as the exchange of information between subsystems. The system memory 1942 and/or the fixed disk 1949 may embody a computer readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
   transmitting, by a merchant computer to a payment processor server computer, a first communication over a first communication channel adapted to communicate with the payment processor server computer without passing through an acquirer computer, the first communication including an authorization request message for a payment transaction with a consumer that includes a transaction identifier;
   transmitting, by the merchant computer to the payment processor server computer, a second communication for the same payment transaction over a second communication channel, the second communication comprising non-payment transaction data and the transaction identifier;
   causing the payment processor server computer to process the authorization request message, wherein processing the authorization request message includes:
      correlating the non-payment transaction data received in the second communication with the authorization request message based on the transaction identifier,
      determining a discount for the payment transaction based on product data contained in the non-payment transaction data;
      modifying a transaction amount contained in the authorization request message by a discount amount associated with the discount prior to transmitting the authorization request message to an authorization computer that is capable of approving the payment transaction; and
      based on an authorization response message received responsive to the authorization request message, transmitting the authorization response message containing the modified transaction amount to the merchant computer;
   receiving, by the merchant computer from the payment processor server computer over the first communication channel, the authorization response message containing the modified transaction amount; and
   based on determining that the authorization response message indicates that the transaction is authorized, completing, by the merchant computer, the payment transaction with the consumer for the modified transaction amount.

2. The method of claim 1, wherein the payment processor server computer further provides at least one value added service to a communication device operated by the consumer in real-time.

3. The method of claim 2, wherein providing the at least one value added service comprises:
   generating a coupon; and
   transmitting the coupon to the communication device operated by the consumer.

4. The method of claim 1, wherein processing the authorization request message further comprises
   analyzing the transaction data in the authorization request message and the non-payment transaction data; and
   determining a risk level associated with the payment transaction based on the analysis of the transaction data and the non-payment transaction data.

5. The method of claim 1, wherein processing the authorization request message further comprises:
   parsing the authorization request message to determine whether to route the authorization request message to the authorization computer or to a payment gateway computer.

6. The method of claim 1, wherein processing the authorization request message further comprises:
   converting the first communication from a first file format to a second file format used by the authorization computer that is capable of approving the payment transaction; and
   transmitting the converted first communication to the authorization computer capable of approving the payment transaction.

7. The method of claim 1, wherein the transaction amount in the authorization request message sent by the merchant computer is different from the modified transaction amount in the authorization response message received by the merchant computer.

8. The method of claim 1, wherein the first communication channel and the second communication are part of a direct exchange network connecting the merchant computer directly to the payment processor server computer.

9. The method of claim 1, wherein the merchant computer transmits the first communication and the second communication without message format conversion by the merchant computer.

10. The method of claim 1, wherein the authorization request message comprises payment transaction data, the method further comprising encrypting, by the merchant computer, the payment transaction data.

11. The method of claim 1, further comprising providing, by the merchant computer in the course of the transaction, an indication of the modified transaction amount to the consumer.

12. A merchant computer comprising:
    a processor; and
    a non-transitory computer-readable storage medium, comprising code executable by the processor, wherein the processor upon execution of the code is configured to:

transmit, to a payment processor server computer, a first communication over a first communication channel adapted to communicate with the payment processor server computer without passing through an acquirer computer, the first communication including an authorization request message for a payment transaction with a consumer that includes a transaction identifier; and transmit, to the payment processor server computer, a second communication for the same payment transaction over a second communication channel, the second communication comprising non-payment transaction data and the transaction identifier;

thereby cause the payment processor server computer to process the authorization request message, wherein processing the authorization request message includes:
- correlating the non-payment transaction data received in the second communication with the authorization request message based on the transaction identifier,
- determining a discount for the payment transaction based on product data contained in the non-payment transaction data;
- modifying a transaction amount contained in the authorization request message by a discount amount associated with the discount prior to transmitting the authorization request message to an authorization computer that is capable of approving the payment transaction; and
- based on an authorization response message received responsive to the authorization request message, transmitting the authorization response message containing the modified transaction amount to the merchant computer;

receive, from the payment processor server computer over the first communication channel, the authorization response message containing the modified transaction amount; and based on determining that the authorization response message indicates that the transaction is authorized, complete the payment transaction with the consumer for the modified transaction amount.

13. The merchant computer of claim 12, wherein the payment processor server computer provides at least one value added service to a communication device operated by the consumer in real-time.

14. The merchant computer of claim 13, wherein providing the at least one value added service comprises:
generating a coupon; and
transmitting the coupon to the communication device operated by the consumer.

15. The merchant computer of claim 13, wherein providing the at least one value added service comprises:
determining the discount for the payment transaction based on product data contained in the non-payment transaction data; and
applying the discount to the payment transaction.

16. The merchant computer of claim 12, wherein processing the authorization request message further comprises:
analyzing the transaction data in the authorization request message and the non-payment transaction data; and
determining a risk level associated with the payment transaction.

17. The merchant computer of claim 12, wherein processing the authorization request message further comprises parsing the authorization request message to determine whether to route the authorization request message to the authorization computer or to a payment gateway computer.

18. The merchant computer of claim 12, wherein processing the authorization request message further comprises:
converting the first communication from a first file format to a second file format used by the authorization computer that is capable of approving the payment transaction; and
transmitting the converted first communication to the authorization computer that is capable of approving the payment transaction.

* * * * *